United States Patent [19]

Kumano et al.

[11] Patent Number: 5,321,080

[45] Date of Patent: Jun. 14, 1994

[54] OLEFIN RESIN COMPOSITION

[75] Inventors: Yuta Kumano; Sadao Kitagawa; Mitsushige Baba; Shiroh Gotoh, all of Yokkaichi, Japan

[73] Assignee: Mitsubishi Petrochemical Company, Ltd., Tokyo, Japan

[21] Appl. No.: 921,530

[22] Filed: Jul. 29, 1992

[30] Foreign Application Priority Data

Aug. 1, 1991 [JP] Japan .................. 3-193144
Aug. 14, 1991 [JP] Japan .................. 3-204323
Aug. 14, 1991 [JP] Japan .................. 3-204324
Sep. 19, 1991 [JP] Japan .................. 3-239884

[51] Int. Cl.$^5$ .............. C08L 51/06; C08L 53/02; C08L 23/00; C08L 31/00
[52] U.S. Cl. .......................... 525/79; 525/70; 525/71; 525/11; 525/80; 525/88; 525/222; 525/223; 525/231; 525/232; 525/240; 525/299; 525/302; 525/303; 525/313; 524/178; 524/146; 524/147
[58] Field of Search .............. 525/71, 70, 79, 98, 525/88, 95, 314, 74, 77, 78

[56] References Cited

U.S. PATENT DOCUMENTS

| 4,210,579 | 7/1980 | Grigo et al. | 525/88 |
| 4,366,296 | 12/1982 | Kitagawa et al. | 525/314 |
| 4,480,065 | 10/1984 | Kawai et al. | 525/88 |
| 4,735,988 | 4/1988 | Takada et al. | 525/79 |
| 4,762,882 | 8/1988 | Okano et al. | 525/71 |
| 4,863,995 | 9/1989 | Murakami et al. | 525/71 |
| 4,957,968 | 9/1990 | Adur et al. | 525/74 |
| 4,987,193 | 1/1991 | Gotoh | 525/314 |

FOREIGN PATENT DOCUMENTS

| 0248543 | 10/1987 | European Pat. Off. . |
| 0299486 | 1/1989 | European Pat. Off. . |
| 0429236 | 5/1991 | European Pat. Off. . |
| 0458731 | 11/1991 | European Pat. Off. . |
| 4-93330 | 3/1992 | Japan . |
| 4-103640 | 4/1992 | Japan . |

OTHER PUBLICATIONS

Database WPIL, Derwent Publications Ltd., AN 90-102226, & JP-A-2 051 512, Feb. 21, 1990, "Random Coplymer with Improved Curing Properties–Obtd. from Ethylene!, Olefin! and Non-Conjugated Diene!".
Database WPIL, Derwent Publications Ltd., AN 85-113504, & JP-A-60 055 012, Mar. 29, 1985, "Propyelne! Polymer Compsn. having Excellent Adhesiveness–Prepd. from Propylene! Polymer, Unsatd. Organic Hydroxy CPD., Organic Peroxide and Crosslinking Agent".

Primary Examiner—James J. Seidleck
Assistant Examiner—M. L. Warzel
Attorney, Agent, or Firm—Oblon, Spivak, McClelland, Maier & Neustadt

[57] ABSTRACT

A resin composition comprising an olefin resin (A), a copolymer of olefin with non-conjugated diene (B) and at least one polymer (C) selected from the group consisting of the following polymers;

C1: diene polymer containing a hydroxyl group or the hydrogenation product thereof,
C2: polymer containing a hydroxyl group,
C3: polymer containing a carboxyl group (including an acid anhydride group),
C4: polymer containing an amino group and/or imino group, and
C5: polymer containing an epoxy group; and optionally an elastomer (D), filler (E) and at least one compound (F) selected from the group consisting of the following compounds;

F1: organotin compound,
F2: tertiary amine compound, and
F3: phosphorus oxy compound.

The moldings prepared from this resin composition have remarkable adhesive properties for paints, adhesives and printing inks. Thus, paints, etc. may be applied directly to the moldings, without surface treatment or washing thereof.

21 Claims, No Drawings

OLEFIN RESIN COMPOSITION

BACKGROUND OF INVENTION (i) Field of the Invention

The present invention relates to a resin composition. More specifically, the present invention relates to an olefin resin composition having a surface suitable for the application of coating, bonding and printing.

(ii) Description of the Related Art

In order to wash off and remove hand dirt, machine oil and the like adhered to the surface of a resin molding, prior to the coating of the surface thereof, vapor washing is generally carried out by employing halogen containing organic solvents.

Further, as olefin resins do not contain polar groups in the structure thereof and additionally because such resins have a higher degree of crystallinity, they show extremely poor adhesive property for paints, adhesives, printing inks and the like; in other words, the coating, adhesive and printing properties thereof are insufficient. Therefore, the surface is primarily coated with primers or is subjected to plasma treatment, whereby the surface is modified to improve the adhesive property. Thereafter, paints and adhesives are applied thereto or printing inks are used thereon for printing.

However, such methods have conventionally involved the following problems.

That is, concern has been shown about the vapor washing process using halogen containing organic solvents in the coating and adhesion of resin moldings, because the atmospheric diffusion of halogen containing organic solvents may cause possible damage to the ozone layer. From the standpoint of protecting the global environment, an early switch to alternate methods has been sought.

Also, in accordance with the primer coating method, expensive primer must be used and it involves a great number of processes. Therefore, this method has defects in that it is costly and deteriorates the working environment because of the requirement to evaporate the primer solvents which might also lead to the risk of fire, a safety problem.

On the other hand, the plasma treatment process requires a costly apparatus because it needs a high degree of vacuum and also inevitably involves an escalation of cost because of the batch system. Furthermore, the surface after the plasma treatment is instable and decreases the adhesive properties thereof for coatings, adhesives and printing inks when in contact with foreign matter. Accordingly, the adhesion strength may sometimes vary, which is very inconvenient for the handling thereof. If such primer coating or plasma treatment processes can be omitted, simplification of the coating process, improvement of working environment and cost reduction should be achievable and therefore a great deal of research has been carried out towards solving these problems.

However, this objective has not yet been achieved and currently, such primer coating and plasma treatment process cannot be omitted in the case of olefin resin materials. In many cases, coating, bonding and printing are effected after such processes.

There are reports describing that the adhesive property for coatings, adhesives, printing inks and the like are improved by compounding a copolymer resin containing non-conjugated dienes with an olefin resin, thereby effecting specific surface treatment. For example, a method of surface treatment with cationic halogen compounds (Japanese Patent Laid-Open No. 63-64460), a method of surface treatment with an aqueous saturated potassium permanganate solution acidified with sulfuric acid and an aqueous 3% sodium hydrogensulfite solution acidified with sulfuric acid (Japanese Patent Laid-Open No. 57-44639), a method of surface treatment with an oxidant (Japanese Patent Laid-Open No. 57-59934), a method of surface treatment with ozone (Japanese Patent Laid-Open No. 61-197640) and the like are known.

There are also known methods using a specific coating or coated compositions or the like illustrated for example by a method for coating olefin resin moldings using a radical-polymerization cured-type coating (Japanese Patent Laid-Open Nos. 57-38825 and 57-59933), a method using a resin-coated composition having a hydrazine group (Japanese Patent Publication No. 3-22896), and the like.

However, these methods have disadvantages in that their application is extremely limited to a very narrow field because they use certain chemical reagents, they require environmental counter measure to counter the toxicity of sulfuric acid, their complex procedures, they are very inconvenient to handle, and they are limited to certain types of paints, coated compositions and the like. It has also been proposed to impart excellent Coating and paint adhesive properties to a polyolefin resin compound, by adding a phosphate compound having a specific structure to the polyolefin resin (Japanese Patent Laid-Open No. 3-26537). However, such paint adhesive properties cannot be imparted to the resin if the process of surface modification such as primer coating or plasma treatment process is omitted.

In order to modify adhesive properties with metal, glass and the like, a proposal has been presented such that a hydrocarbon polymer having at least one hydroxyl group is compounded with a polyolefin (Japanese Patent Laid-Open No. 53-123452). However, the publication only contains an embodiment disclosing ethylene/propylene rubber as the polyolefin.

EP-A 0429236 discloses that a coated resin molding comprising a molding composed of a resin composition comprising a substrate resin comprising at least one propylene polymer selected from the group consisting of propylene/ethylene block copolymers and propylene/ethylene random copolymers and an elastomer, at least one member selected from the group consisting of (A) a 1,3-diene polymer having at least one terminal hydroxyl group or a hydrogenation product thereof, (B) a copolymer of ethylene with an unsaturated compound containing a carboxyl group (including an acid anhydride group) and (C) a copolymer of ethylene with an unsaturated compound containing a hydroxyl group, and a coating formed directly on the surface of said molded body.

According to the proposal immediately described above, however, the molding should be washed preliminarily with trichloroethane and the like in order to produce a resin molding with satisfactory paint adhesive property.

SUMMARY OF THE INVENTION

The present inventors have carried out investigations with respect to the problems described above. Consequently, the inventors have found that the problems above can be solved by using a specific resin composition, thus, achieving the present invention.

Specifically, the present invention relates to a resin composition containing the following components A, B, C and optionally the following components D, E and/or F, wherein the contents of the components B, C, D, E and F are 0.1 to 900 parts by weight, 0.01 to 500 parts by weight, 1 to 900 parts by weight, 0.1 to 300 parts by weight and 0.01 to 450 parts by weight to 100 parts by weight of the component A, sequentially in this order;

Component A:
Olefin resin;
Component B:
Block and/or random copolymer resin of at least one member selected from the group consisting of α-olefins containing 2 to 12 carbon atoms with at least one member of the non-conjugated dienes represented by the following general formula (I);

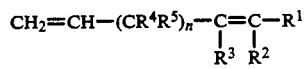

(wherein $R^1$, $R^2$, $R^3$, $R^4$ and $R^5$ independently represent hydrogen atom or an alkyl group having 1 to 8 carbon atoms; and n represents an integer of 1 to 10);

Components C:
at least one polymer selected from the group consisting of the following polymers;
C1: diene polymer containing a hydroxyl group or the hydrogenation product thereof;
C2: polymer containing a hydroxyl group;
C3: polymer containing a carboxyl group (including an acid anhydride group);
C4: polymer containing an amino group and/or imino group; and
C5: polymer containing an epoxy group;
Component D:
elastomer;
Component E:
filler;
Component F:
at least one compound selected from the group consisting of the following compounds;
F1: organotin compound,
F2: tertiary amine compound, and
F3: phosphorus oxy compound.

DETAILED DESCRIPTION OF THE INVENTION

[I] Resin Composition (1) Constitute components

The resin composition of the present invention is essentially composed of the constitute components shown hereinbelow.

Component A: olefin resin

The olefin resin to be used in the present invention includes a homopolymer of α-olefin, representatively illustrated by ethylene, propylene, 1-butene, 3-methyl-1-butene, 4-methyl-1-pentene, 1-hexene, 1-pentene and the like; a copolymer of one of these α-olefins with another α-olefin; a copolymer of the α-olefins with organosilicon compound and the like; and a graft polymer of organosilicon compound and the like onto the olefin resin.

These polymers have a flexural elasticity modulus measured according to JIS-K7203 in a range of 1,000 to 30,000 kg/cm², preferably 2,000 to 20,000 kg/cm², more preferably 3,000 to 15,000 kg/cm². There is no specific limitation on the melt flow rate (MFR) of the polymers, but those having an MFR measured according to ASTM-D1238 in a range of 0.01 to 200 g/10 min are generally preferable, and those having such an MFR in a range of 0.1 to 100 g/10 min are the most preferable.

The olefin resin includes, for example, polyethylene resin including low-pressure polyethylene, moderate-pressure polyethylene, high-pressure polyethylene, linear low-density polyethylene and the like; stereoregular poly-α-olefin resin including stereoregular polypropylene, stereoregular poly-1-butene, stereoregular poly-4-methyl-1-pentene, and the like. Of these olefin resins, preference is given to stereoregular polypropylene (simply abbreviated as "polypropylene resin" hereinbelow). Among the propylene resin, copolymers of propylene with other olefins are preferable. A copolymer of propylene with ethylene is particularly preferable. The copolymer may be either a random copolymer or block copolymer. In particular, block copolymers are preferable.

These olefin resins each may be used alone or in the form of a mixture in combination with two or more of them. They are appropriately selected from commercially available resins.

Component B: copolymer resin containing non-conjugated diene

The copolymer resin containing non-conjugated dienes to be used in the present invention can be produced, by block and/or random copolymerizing at least one member selected from the group consisting of α-olefins with 2 to 12 carbon atoms and at least one member selected from non-conjugated dienes represented by the following general formula (I);

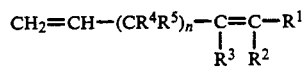

(wherein $R^1$, $R^2$, $R^3$, $R^4$ and $R^5$ independently represent a hydrogen atom or an alkyl group with 1 to 8 carbon atoms; and n is an integer from 1 to 10), using a known Ziegler catalyst and the like, according to the same known method employing the same apparatus as in the polymerization of α-olefins.

Examples of the non-conjugated dienes represented by the general formula (1) to be used in the present invention include 1,4-dienes including 1,4-hexadiene, 4-methyl-1,4-hexadiene, 5-methyl-1,4-hexadiene, 5-methyl-1,4-heptadiene and the like; 1,5-dienes including 1,5-heptadiene, 5-methyl-1,5-heptadiene, 6-methyl-1,5-heptadiene, 1,5-octadiene, 5-methyl-1,5-octadiene, 6-methyl-1,5-octadiene and the like; 1,6-dienes including 1,6-octadiene, 6-methyl-1,6-octadiene, 7-methyl-1,6-octadiene, 7-ethyl-1,6-octadiene, 1,6-nonadiene, 7-methyl-1,6-nonadiene, 4-methyl-1,6-nonadiene and the like; 1,7-dienes including 1,7-nonadiene, 8-methyl-1,7-nonadiene and the like; and various non-conjugated dienes including 1,11-dodecadiene, 1,13-tetradecadiene and the like.

From the technical respect of manufacturing copolymers, branched, non-conjugated dienes such as 4-methyl-1,4-hexadiene, 5-methyl-1,4-hexadiene, 6-methyl-1,5-heptadiene, 6-methyl-1,5-octadiene, 6-methyl-1,6-octadiene, 7-methyl-1,6-octadiene, 7-ethyl-1,6-octadiene, and 8-methyl-1,7-nonadiene are preferable, with 7-methyl-1,6-octadiene being particularly preferable.

These non-conjugated dienes each may be used in a mixture of two or more thereof.

The α-olefins having 2 to 12 carbon atoms as the other raw material of the copolymer resin containing non-conjugated dienes include ethylene, propylene, 1-butene, 1-pentene, 1-hexene, 1-octene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allylcyclopentane, allylcyclohexane, styrene, allylbenzene, 3-cyclohexyl-1-butene, vinylcyclopropane, vinylcyclopentane, vinylcyclohexane, and 2-vinylbicyclo[2,2,1]-heptane. Among them, preferable examples are ethylene, propylene, 1-butene, 3-methyl-1-butene, 4-methyl-1-pentene, and styrene. Particularly preferable examples are ethylene and propylene. These α-olefins may be used in a mixture of two or more of them.

The resin containing the copolymer of the non-conjugated diene to be used in the present invention, has a content of the non-conjugated dienes in a range of 0.1 to 30% by weight, preferably 0.5 to 25% by weight and more preferably 1 to 20% by weight. If the content of the non-conjugated dienes is less than the range described above, the adhesive property of the resin for paints, adhesives and printing inks will not show sufficient reproducibility, the adhesive strength will be lowered, etc., which is unfavorable. If above the range described above, the resin productivity will be unfavorably poor.

The copolymer resin containing the non-conjugated dienes to be appropriately used in the present invention has a melt flow rate (MFR) in a range of 0.01 to 1,000 g/10 min, preferably 0.05 to 500 g/10 min and more preferably 0.1 to 200 g/10 min.

The copolymer resin containing the non-conjugated dienes of the present invention has a flexural elasticity modulus measured according to JIS K-7203 in a range of 500 to 30,000 kg/cm$^2$, preferably 1,000 to 20,000 kg/cm$^2$, and more preferably 1,500 to 15,000 kg/cm$^2$. The heat distortion temperature imparted to the resin is insufficient, if the flexural elasticity modulus is less than 500 kg/cm$^2$.

Examples of the copolymer resin include block copolymers and random copolymers in various combinations with those selected from the non-conjugated dienes and the α-olefins. The most preferable combinations are illustrates as follows; ethylene/methyl-1,4-hexadiene random copolymer; ethylene/7-methyl-1,6-octadiene random copolymer; propylene/methyl-1,4-hexadiene random copolymer; propylene/7-methyl-1,6-octadiene random copolymer; propylene ethylene/methyl-1,4-hexadiene random copolymer; propylene/ethylene/7-methyl-1,6-octadiene random copolymer; propylene/ethylene/methyl-1,4-hexadiene block copolymer; propylene/ethylene/7-methyl-1,6-octadiene block copolymer; and the like, wherein methyl-1,4-hexadiene means a mixture of 4-methyl-1,4-hexadiene and 5-methyl-1,4-hexadiene in a ratio of 95:5 to 5:90.

The method for producing the copolymer resin is illustrated by the methods disclosed in Japanese Patent Publication Nos. 64-2127, 64-2128, and 64-9326 and Japanese Patent Laid-Open Nos. 59-155416 and 62-115008 and Japanese Patent Laid-Open No. 2-311507.

Component C:

The polymer to be used as Component C in the present invention is selected from the following components C1 to C5;

C1: diene polymer having a hydroxyl group or the hydrogenation product thereof;
C2: polymer containing a hydroxyl group;
C3: polymer containing a carboxyl group (including an acid anhydride group);
C4: polymer containing an amino group and/or imino group; and
C5: polymer containing an epoxy group.

Components C1 and C2 are preferable among them. These components are used alone or in combination of two or more of them, representatively illustrated, for example, by a combination of Components C1 and C3 and a combination of Components C2 and C3. Although these are preferable combinations, the amount of Component C3 is preferably smaller than that of Component C1 or C2.

Specific explanation will now be given concerning each of the Components.

Component C1:

Diene polymer containing a hydroxyl group or hydrogenation product thereof

Diene polymers containing a hydroxyl group or the hydrogenation product thereof to be used in the resin composition of the present invention include for example the following.

1. Diene polymers containing a hydroxyl group

Diene polymers containing a hydroxyl group to be used in the present invention include for example polyhydroxybutadiene.

Specifically, there are included polymers that are liquid, semi-solid or solid at normal temperatures, having at least one hydroxyl group within the molecule thereof and having a molecular weight of 200 to 100,000, preferably 500 to 50,000, more preferably 800 to 10,000.

The content of the hydroxyl group in the molecule is 0.5 to 650, preferably 1 to 500, more preferably 5 to 250 KOH mg/g, if represented in hydroxyl value.

The diene polymer can be produced by any of various known methods, without limitation. For example, it can be produced by radical polymerization or anion polymerization, using 1,3-dienes as the raw material. Specifically, there is illustrated the method disclosed in, for example, Japanese Patent Laid-Open No. 51-71391.

According to the radical polymerization, the diene monomer is polymerized by using hydrogen peroxide as the polymerization initiator, to readily produce the diene polymer.

According to anion polymerization, a monoepoxy compound, formaldehyde, acetoaldehyde, acetone, halogenoalkylene oxide or polyepoxide, for example, may be reacted with a living polymer of the structure containing alkaline metal bonded to at least one part of the molecular chain thereof, which living polymer is obtained by the polymerization of conjugated dienes using a catalyst for anion polymerization such as alkaline metal or organic alkaline compounds, according to well-known methods.

If hydrogen peroxide is reacted with a conjugated diene polymer produced by known polymerization methods in the presence of osmium tetraoxide (OsO$_4$), vanadium oxide (V$_2$O$_5$), tungstic acid (H$_2$WO$_4$), selenium dioxide (SeO$_2$) and the like, the hydroxyl group is bonded to the double bond in the main chain thereof.

The resulting modified conjugated diene polymer is also used in the present invention.

As the monomer of these polymers, at least one species of conjugated diene can be used. The conjugated diene monomer includes 1,3-butadiene, 1,3-pentadiene, isoprene, chloroprene, 2,3-dimethyl-1,3-butadiene, 1-phenyl-1,3-butadiene and the like.

2. Hydrogenation product of diene polymers having a hydroxyl group

The hydrogenation product of diene polymers having a hydroxyl group includes those obtained by adding hydrogen to the diene polymer according to conventional methods, for example, the method disclosed in Japanese Patent Laid-Open No. 51-71391.

The degree of hydrogenation is such that the double bonds contained in the polymer are entirely or partially hydrogenated. Generally, such hydrogenated product preferably has an iodine value of 0 to 20 g/100 g, and preferably an iodine value of to 5 g/100 g, in particular.

These diene polymers having a hydroxyl group and the hydrogenation products thereof may be used alone or in combination with several of them.

Component C2: polymer having a hydroxyl group

Polymers having a hydroxyl group to be used in the present invention include homopolymers of an unsaturated compound containing a hydroxyl group, or homopolymers of an unsaturated compound containing a polar group capable of introducing or generating a hydroxyl group based on any chemical modification after polymerization, copolymers thereof with another polymerizable monomer, and graft polymers thereof with other polymers. Generally, such polymers consequently acquire the structure wherein a hydroxyl group is irregularly or regularly pendant onto branched or linear molecular chains or the structure wherein the side chain having a hydroxyl group is grafted.

The polymer can be produced by well-known methods, for example, by the polymerization of an unsaturated compound containing a hydroxyl group, the copolymerization of an unsaturated compound containing a hydroxyl group with another copolymerizable monomer, the graft polymerization of an unsaturated compound containing a hydroxyl group to a polymer, a method comprising reacting a diol compound, a polyol compound, an epoxy-containing compound, or a bifunctional or multi-functional compound containing at least one hydroxyl group with the polar group in a polymer, and a method comprising oxidizing or hydrolyzing the polar group in a polymer, thereby generating a hydroxyl group.

Among the polymers produced by the methods described above, a copolymer of α-olefin with an unsaturated compound containing a hydroxyl group, or a graft polymer containing the Component A (olefin resin), the Component B (copolymer resin containing non-conjugated dienes), and the Component D described below (graft polymer of an unsaturated compound containing a hydroxyl group to an elastomer), and a hydrolyzed compound of a polymer containing vinyl esters.

Specific explanation will now be given hereinbelow.

1. Copolymer of α-olefin with an unsaturated compound containing a hydroxyl group From a structural viewpoint, the aforementioned term copolymer generally means those having a structure where an unsaturated compound containing a hydroxyl group is irregularly or regularly copolymerized with α-olefin in branched or linear carbon chains.

Specifically, the copolymer has a content of an unsaturated compound containing hydroxyl group in a range of 0.1 to 50% by weight, preferably in a range of 0.5 to 45% by weight, particularly preferably in a range of 1 to 40% by weight. Furthermore, the copolymer has a melt flow rate (MFR) measured according to ASTM-D1238, in a range of 0.1 to 1,000 g/10 min, preferably 0.5 to 700 g/10 min, and specifically preferably 1 to 500 g/10 min, including those polymers in liquid, semi-solid or solid state at normal temperatures.

Such copolymers of α-olefin with an unsaturated compound containing a hydroxyl group can be produced by well-known methods, for example, high-pressure radical polymerization and slurry polymerization, using α-olefin and an unsaturated compound containing a hydroxyl group as the raw materials. In the case of the production according to the high-pressure radical polymerization, for example, ethylene, an unsaturated compound containing a hydroxyl group, and a radical polymerization initiator are continuously fed, at a ratio of ethylene to the unsaturated compound containing a hydroxyl group of 1:0.0001 to 1:0.1 into a reaction zone maintained at a pressure of 1,000 to 3,000 atm and a temperature of 90° to 300° C., to produce an ethylene copolymer at a conversion rate of 3 to 20%, thereafter continuously taking out the copolymer from the reaction zone.

In the case of the production according to the slurry polymerization, the process comprises copolymerization of propylene with a complex of an unsaturated compound containing a hydroxyl group with an organic aluminum compound using known Ziegler catalysts in, for example, heptane solvent at a pressure of normal pressure to 20 atm and a temperature of 30° to 150° C., thereby producing the copolymer.

Such unsaturated compounds containing a hydroxyl group include, for example, methacrylate and acrylates such as 2-hydroxyethyl methacrylate, 2-hydroxyethyl acrylate, 2-hydroxypropyl methacrylate, 2-hydroxypropyl acrylate, 3-hydroxypropyl methacrylate, 3-hydroxypropyl acrylate, 2-hydroxybutyl methacrylate, 2-hydroxybutyl acrylate, diethylene glycol monomethacrylate, poly(ethylene glycol) monomethacrylate and the like; unsaturated alcohols such as allyl alcohol, 9-decene-1-ol, 10-undecene-1-ol, and the like; vinyl ethers such as 2-hydroxyethyl vinyl ether, diethylene glycol monovinyl ether and the like; and allyl ethers such as 2-hydroxyethyl allyl ether and the like.

Among them, methacrylates and acrylates as well as unsaturated alcohols are preferable; 2-hydroxyethyl methacrylate, 2-hydroxyethyl acrylate, 10-undecene-1-ol are specifically preferable.

The other copolymer component, α-olefin, is the one having 2 to 12 carbon atoms, specifically including ethylene, propylene, 1-butene, 1-pentene, 1-hexene, 1-octene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allylcyclopentane, allylcyclohexane, styrene, allylbenzene, 3-cyclohexyl-1-butene, vinylcyclopropane, vinylcyclopentane, vinylcyclohexane, 2-vinylbicyclo[2,2,1]-heptane and the like. Preferable examples of them are ethylene, propylene, 1-butene, 3-methyl-1-butene, 4-methyl-1-pentene, and styrene. Most preferable examples are ethylene and propylene. These α-olefins may be used in combinations of two or more.

A third copolymerizable monomer component other than the α-olefin and the component of the unsaturated compound containing a hydroxyl group, includes unsaturated carboxylates such as methyl acrylate, ethyl acrylate, butyl acrylate, methyl methacrylate and the like; vinyl aromatic compounds such as α-methyl styrene, vinyl toluene and the like; nitrile compounds such as acrylonitrile, methacrylonitrile, and the like; vinylpyridines such as 2-vinylpyridine, 4-vinylpyridine and the like; vinyl ethers such as methyl vinyl ether, 2-chloroethyl vinyl ether and the like; halogenated vinyls such as vinyl chloride, vinyl bromide and the like; vinyl esters such as vinyl acetate; acrylamides and the like. The third component may be used in the form of a terpolymer or multi-component polymer.

These copolymers each may be used alone or in combinations of two or more.

2. Graft polymer of an unsaturated compound containing a hydroxyl group

The term graft polymer is generally meant, from a structural standpoint, those having a structure where an unsaturated compound containing hydroxyl group is irregularly or regularly graft polymerized together in branched or linear molecular chains.

Specifically, the graft polymer has a content of an unsaturated compound containing hydroxyl group in a range of 0.1 to 50% by weight, preferably 0.5 to 45% by weight, particularly preferably 1 to 40% by weight. Furthermore, such polymer has a melt flow rate (MFR) measured according to ASTM-D1238 in a range of 0.1 to 1,000 g/10 min, preferably 0.5 to 700 g/10 min, and specifically preferably 1 to 500 g/10 min, including those polymers in liquid, semi-solid or solid state at normal temperatures.

The graft polymer containing a hydroxyl group can be produced by well-known methods, for example, kneading-mixing graft polymerization, solution graft polymerization and the like using the following raw materials; as the backbone polymer components the Component A olefin resin, the Component B copolymer resin containing non-conjugated dienes, and the Component D elastomer described below; and as the graft component an unsaturated compound containing a hydroxyl group. In the case of the production according to the kneading-mixing graft polymerization, the graft polymer can be produced by melting and kneading under mixing the backbone polymer components, the unsaturated compound containing a hydroxyl group and an organic peroxide as the reaction initiator if necessary, if an extruder set at a temperature of 80° to 250° C.

In the case of the production according to the solution graft polymerization, the copolymer containing non-conjugated dienes, an unsaturated compound containing a hydroxyl group, and an organic peroxide as the reaction initiator if necessary, are dissolved for example in xylene solvent, for reaction in an autoclave set at a temperature of 80° to 150° C. The unsaturated compound containing hydroxyl group as the graft component herein used includes those described above.

Among them, hydroxyl group containing methacrylates and acrylates are preferable; 2-hydroxyethyl methacrylate and 2-hydroxyethyl acrylate are specifically preferable.

The backbone polymer component as another component of the graft polymer includes the Component A olefin resin, the Component B copolymer resin containing non-conjugated dienes, and the Component D elastomer described hereinbelow. Among them, most preferable are ethylene resins, propylene resins, olefin elastomers, styrene elastomers, copolymer resins of ethylene with non-conjugated dienes, copolymer resins of propylene and non-conjugated dienes, copolymer resins of ethylene, propylene and non-conjugated dienes, and the like. Specifically preferable are propylene resins, ethylene/propylene copolymer rubber (EPM), ethylene propylene/non-conjugated diene copolymer rubber (EPDM), and hydrogenation products of styrene/conjugated diene block copolymers, propylene/7-methyl-1,6-octadiene copolymer resins, propylene/ethylene/7-methyl-1,6-octadiene copolymer resins, propylene/-methyl-1,4-hexadiene copolymer resins and the like.

In addition to the unsaturated compound containing a hydroxyl group component, those illustrated for the third copolymerizable monomer component, such as methyl acrylate and ethyl acrylate, may also be used as a second copolymerizable graft monomer component. They may be used in the form of graft copolymers or multi-component graft polymers.

These graft polymers may each be used alone or in combinations of two or more.

3. Hydrolyzed product of a polymer containing vinyl esters

By the term polymer containing vinyl esters is meant a homopolymer of vinyl ester, or copolymer of vinyl ester with another polymerizable monomer, and a graft polymer of vinyl ester with other backbone polymers.

Specifically, the polymer contains vinyl esters in a range of 0.01 to 100% by weight, preferably 0.05 to 70% by weight, particularly preferably 0.1 to 40% by weight. Furthermore, such polymer has a melt flow rate (MFR) measured according to ASTM-D1238, in a range of 0.01 to 1,000 g/10 min, preferably 0.05 to 700 g/10 min, and specifically preferably 0.1 to 500 g/10 min, including those polymers in liquid, semi-solid or solid state at normal temperatures.

The vinyl ester compounds to be used for the polymer includes vinyl formate, vinyl acetate, vinyl acrylate, vinyl crotonate, vinyl caprylate, vinyl laurate, vinyl chloroacetate, vinyl oleate, vinyl stearate and the like; among them, vinyl acetate is preferable.

if the polymer is a copolymer with another polymerizable monomer, an α-olefin having 2 to 12 carbon atoms is preferable as the copolymerizable monomer. Examples of such α-olefins are those illustrated above. Specifically, there are included ethylene, propylene, 1-butene, 1-pentene, 1-hexene, 1-octene, 3-methyl-1-butene, 3-methyl-1-pentene, and the like. Preferable examples among them are ethylene, propylene, 1-butene, 3-methyl-1-butene, 4-methyl-1-pentene, and styrene. Specifically preferable examples are ethylene and propylene. These α-olefins may be used in combinations of two or more.

The polymer containing vinyl esters can be produced by known methods. For example, there are illustrated high-pressure radical polymerization, solution polymerization, emulsion polymerization, solution graft polymerization, kneading-mixing graft polymerization.

In the case of the production according to the high-pressure polymerization, for example, vinyl ester compound, ethylene and a radical-polymerization initiator are continuously fed into a reaction zone maintained at a pressure of 1,000 to 3,000 atm and a temperature of 90° to 300° C. under the condition so as to make a conversion rate of 3 to 20%, to produce a copolymer, thereafter continuously taking out the copolymer from the reaction zone.

If the polymer is a graft polymer, the backbone polymer includes the Component A olefin resin, the Component B copolymer resin containing non-conjugated dienes, and the Component D elastomer described below. Ethylene resin and propylene resin are preferable among them.

Even if the polymer is a copolymer or graft polymer, the copolymerizable monomer component includes those illustrated hereinabove such as methyl acrylate and ethyl acrylate, which may be modified into copolymers or multi-component polymers and graft copolymers.

These (co)polymers and graft (co)polymers may be used alone or as a mixture in combination with two or more of them.

The polymer containing vinyl esters is hydrolyzed into the hydroxy group containing product thereof.

The method for hydrolyzing the polymer containing vinyl esters is illustrated by a method comprising adding a catalyst such as alkali and acid along with alcohol thereby carrying out hydrolysis.

The degree of hydrolysis of the polymer containing vinyl esters is 100 to 1%, preferably 100 to 10%, with 100 to 30% being specifically preferable. The polymer may be completely or partially hydrolyzed.

The hydrolyzed product of the polymer containing vinyl esters is preferably a hydrolyzed product of the copolymer of vinyl ester with an α-olefin, and particularly preferable is a hydrolyzed product of the copolymer of vinyl acetate with ethylene.

Among such polymers containing a hydroxyl group, preference is given to copolymers of an α-olefin with an unsaturated compound containing a hydroxyl group, and the graft polymers of an unsaturated compound containing a hydroxyl group; preference is given particularly to copolymers of ethylene with an unsaturated compound containing a hydroxyl group and the graft polymer of an unsaturated compound containing a hydroxyl group onto a copolymer resin containing non-conjugated dienes.

Component C3: polymer containing a carboxyl group (including acid anhydride group)

By the term polymer containing a carboxyl group (including acid anhydride group) used in the present invention is generally meant such polymers having a structure wherein a carboxyl group (including an acid anhydride group) is irregularly or regularly pendant onto branched or linear molecular chains or the structure wherein the side chain having a carboxyl group is graft polymerized.

The polymer can be produced by well-known methods, such as the polymerization of unsaturated compounds containing a carboxyl group (including an acid anhydride group), the copolymerization of unsaturated compounds containing a carboxyl group (including acid anhydride group) with a polymerizable monomer, the graft polymerization of unsaturated compounds containing a carboxyl group (including an acid anhydride group) to a polymer, a method comprising reacting an acid anhydride or a bifunctional compound having at least one carboxyl group with the polar group in a polymer, a method comprising oxidizing or hydrolyzing the polar group into a polymer, thereby effecting the conversion of the polar group to carboxyl group.

Among the polymers produced by the methods described above, preferable are copolymers of α-olefin with an unsaturated compound containing a carboxyl group (including an acid anhydride group), and graft polymer of an unsaturated compound containing a carboxyl group (including an acid anhydride group) to the Component A (olefin resin), the Component B (copolymer resin containing a non-conjugated diene), or the component D elastomer described below; diene polymer havings a carboxyl group or the hydrogenation product thereof, obtained by reacting an acid anhydride or a bifunctional compound having at least one carboxyl group with the aforementioned component C1, namely, diene polymers having a hydroxyl group or the hydrogenation product thereof.

Specific explanation will now be shown hereinbelow.

1. Copolymer of an α-olefin with an unsaturated compound containing a carboxyl group (including acid anhydride groups)

By the aforementioned term copolymer is generally meant, from a structural standpoint, those having a structure where an unsaturated compound containing a carboxyl group (including acid anhydride group) is irregularly or regularly copolymerized with an α-olefin in branched or linear carbon chains.

Specifically, the copolymer has a content of an unsaturated compound containing a carboxyl group (including an acid anhydride group) in a range of 0.1 to 50% by weight, preferably in a range of 0.5 to 45% by weight, particularly preferably in a range of 1 to 40% by weight. Furthermore, the copolymer has a melt flow rate (MFR) measured according to ASTM-D1238, in a range of 0.1 to 1,000 g/10 min, preferably 0.5 to 700 g/10 min, and in particular preferably 1 to 500 g/10 min, including those polymers that are in a liquid, semi-solid state at normal temperatures.

Such copolymers of an α-olefin with an unsaturated compound containing a carboxyl group (including an acid anhydride group) can be produced by well-known methods, for example, high-pressure radical polymerization and slurry polymerization, using an α-olefin and an unsaturated compound containing a carboxyl group (including an acid anhydride group).

In the case of production by high-pressure radical polymerization, ethylene, an unsaturated compound containing a carboxyl group (including an acid anhydride group), and a radical polymerization initiator if necessary are continuously fed, at a ratio of ethylene to the unsaturated compound containing a carboxyl group (including an acid anhydride group) of 1:0.0001 to 1:0.1 under conditions to achieve a conversion rate of 3 to 20 into a reaction zone maintained at a pressure of 1,000 to 3,000 atm and a temperature of 90° to 300° C., to produce an ethylene copolymer, and thereafter continuously taking out the copolymer from the reaction zone.

In the case of production by slurry polymerization, the copolymer can be produced by copolymerization of propylene with an adduct of an unsaturated compound containing a carboxyl group with an organic aluminum compound using known Ziegler catalyst in for example heptane solvent at a pressure of normal to 20 atm and a temperature of 30° to 150° C.

Such unsaturated compound containing a carboxyl group (including an acid anhydride group) includes, for example, unsaturated carboxylates and the acid anhydrides thereof, such as acrylic acid, methacrylic acid, 3-butenic acid, crotonic acid, pentenic acid, heptenic acid, octenic acid, noneic acid, decenic acid, undecenic acid, maleic acid, itaconic acid, citraconic acid, tetrahydrophthalic acid, norbornene-5,6-dicarboxylic acid, and the like. Among them, acrylic acid, methacrylic acid, and undecenic acid and the like are preferable.

The α-olefin as another copolymerizable component includes those illustrated for the Component C2 described above, such as ethylene, propylene and the like. Among them, ethylene, propylene, 1-butene, 3-methyl-1-butene, 4-methyl-1-pentene, styrene and the like are preferable. Particularly preferable examples are ethylene and propylene. These α-olefins may be used in combinations of two or more.

Other than the α-olefin and the unsaturated compound containing a carboxyl group (including an acid anhydride group), a third copolymerizable monomer includes those illustrated for the Component C2 described above, such as methyl acrylate and ethyl acrylate, which may be used possibly in terpolymer or multi-component polymers.

These copolymers each may be used alone or in combinations of two or more.

2. Graft polymer of an unsaturated compound containing a carboxyl group (including an acid anhydride group)

By the term graft polymer is generally meant, from a structural standpoint, those having a structure where an unsaturated compound containing a carboxyl group (including an acid anhydride group) is irregularly or regularly graft polymerized together in branched or linear molecular chains.

Specifically, the graft polymer includes those illustrated in item 1, including those in liquid, semi-solid or solid state at normal temperatures.

The graft polymer containing a carboxyl group (including an acid anhydride group) can be produced by well-known methods, for example, kneading-mixing graft polymerization, solution graft polymerization and the like, using the following raw materials; as the backbone polymer components, the Component A olefin resin, the Component B copolymer resin containing non-conjugated dienes, and the Component D elastomer described below; and as the graft component, an unsaturated compound containing a carboxyl group (including an acid anhydride group).

In the case of production by kneading-mixing graft polymerization, the graft polymer can be produced by melting and kneading under mixing the backbone polymer components and the unsaturated compound containing a carboxyl group (including an acid anhydride group) with an organic peroxide as the reaction initiator if necessary in an extruder set at a temperature of 80° to 250° C.

In the case of production by solution graft polymerization, the copolymer containing non-conjugated dienes, an unsaturated compound containing a carboxyl group (including an acid anhydride group), and an organic peroxide as a reaction initiator, are dissolved for example in xylene solvent, for reaction in an autoclave set at a temperature of 80° to 150° C.

The unsaturated compound containing a carboxyl group (including an acid anhydride group) as the graft component herein used includes those described in item 1 above, such as acrylic acid and methacrylic acid. Among them, acrylic acid and methacrylic acid, maleic acid, maleic anhydride and the like are preferable.

The backbone polymer component as another component of the graft polymer includes the Component A olefin resin, the Component B copolymer resin containing non-conjugated dienes, and the Component D elastomer described hereinbelow. Preferable among them are those described for the Component C2, such as ethylene resin and propylene resin.

In addition to the unsaturated compound containing a carboxyl group (including an acid anhydride group) component, those illustrated for the Component C2, such as methyl acrylate and ethyl acrylate, may be used as a second graft copolymerizable monomer. They may also be used in a graft copolymer or multi-component graft polymer.

These graft (co)polymers each may be used alone or in combinations of two or more.

3. Diene polymer having a carboxyl group (including an acid anhydride group) or hydrogenation product thereof.

By the term diene polymer having a carboxyl group (including an acid anhydride group) or a hydrogenation product thereof, is meant those obtained by reacting a diene polymer having a hydroxyl group or the hydrogenation product thereof with an acid anhydride or a bifunctional compound having at least one carboxyl group.

Specifically, there are illustrated those polymers having a molecular weight of 200 to 100,000, preferably 500 to 50,000, with 800 to 10,000 being particularly preferable and which are in a liquid, semi-solid or solid state at normal temperatures.

At least one molecule of the acid anhydride or the bifunctional compound having at least one carboxyl group should be contained in the polymer molecule, and the content thereof is in a range of 0.001 to 50% by weight, preferably 0.01 to 45% by weight, with 0.1 to 40% by weight being particularly preferable.

Using as the raw material a diene polymer containing a hydroxyl group or the hydrogenation product thereof, together with an acid anhydride or a bifunctional compound having at least one carboxyl group, the polymer can be produced by known methods, for example solution reaction.

In the case of the production according to the solution reaction, for example, the hydrogenation product of a diene polymer having a hydroxyl group and acid anhydride are dissolved and reacted in toluene solvent in a reaction vessel set at a temperature of 80° to 120° C.

A compound of acid anhydride or a bifunctional compound having at least one carboxyl group includes dicarboxylic acid such as oxalic acid, malonic acid, succinic acid, maleic acid, glutaric acid, adipic acid, citraconic acid, itaconic acid, pimeric acid, suberic acid, agelaic acid, sebacic acid, phthalic acid, tetrahydrophthalic acid, norbornene-5,6-dicarboxylic acid and the like or the acid anhydride thereof; chloropropionic acid, tartaric acid, lactic acid, iminodiacetic acid, ethylene-diaminetetraacetic acid, mercaptopropionic acid, and the like. Among them, the anhydride of dicarboxylic acid is preferable with maleic anhydride and succinic anhydride being particularly preferable.

The diene polymer having a hydroxyl group or the hydrogenation product thereof to be used in the production of the polymer includes the C1 component;

i. Diene polymer having a hydroxyl group

The diene polymer having a hydroxyl group to be used in the present invention includes for example polyhydroxybutadiene.

Specifically, there are illustrated those polymers having at least one hydroxyl group in the molecule and having a molecular weight in a range of 200 to 100,000, preferably 500 to 50,000, with 800 to 10,000, being particularly preferable and in a liquid, semi-solid, or solid state at normal temperatures.

The content of the hydroxyl group in the molecule is 0.5 to 650, preferably 1 to 500, with 5 to 50 KOH mg/g, being particularly preferable if represented in hydroxyl values.

The diene polymer can be produced, employing a variety of known methods, without limitation. Using 1,3-dienes as the raw material, for example, the polymer can be produced by radical polymerization and anion polymerization. Specifically, the method disclosed in Japanese Patent Laid-Open No. 51-71391 may be mentioned.

In the case of production by radical polymerization, the polymer can readily be produced by polymerizing diene monomers using hydrogen peroxide as the polymerization initiator.

In the case of production by anion polymerization, monoepoxide compound, formaldehyde, acetoaldehyde, acetone, halogenoalkylene oxide or polyepoxide may be reacted with a living polymer having a structure where alkaline metal is bonded to at least one portion of the molecule thereof and which is obtained by polymerizing a conjugated diene using a catalyst for anion polymerization, for example, an alkaline metal or organic alkaline metal compound, according to well-known methods.

Also, a diene polymer produced by known methods of polymerization can be reacted with hydrogen peroxide in the presence of osmium tetraoxide ($OsO_4$), vanadium oxide ($V_2O_5$), tungstic acid ($H_2WO_4$), selenium oxide ($SeO_2$) to produce a diene polymer having a hydroxyl group bonded to the double bond in the main chain thereof. The resulting diene polymer may also be used in the present invention.

The raw material monomer for these polymers includes at least one conjugated diene monomer, such as 1,3-butadiene, 1,3-pentadiene, isoprene, chloroprene, 2,3-dimethyl-1,3-butadiene, 1-phenyl-1,3 butadiene and the like.

ii. Hydrogenation product of diene polymer having a hydroxyl group

The hydrogenation product of a diene polymer having a hydroxyl group is obtained by hydrogenating the diene polymer having a hydroxyl group described above according to the methods disclosed in Japanese Patent Laid-Open No. 51-71391 and the like.

The degree of hydrogenation is such that the double bonds contained in the polymer may be entirely or partially hydrogenated. However, a polymer with an iodine value of 0 to 20 is generally preferable and one with a value of 0 to 5 (g/100 g) is particularly preferable.

The diene polymers having a hydroxyl group and the hydrogenation products thereof may each be used alone or in combination.

Up to this point, the polymer having a carboxyl group (including an acid anhydride group) used as the component C3 of the resin composition of the present invention has been described in detail. Preferable examples of the polymer include copolymers of α-olefins with an unsaturated compound containing a carboxyl group (including an acid anhydride group), and graft copolymer of an unsaturated compound containing a carboxyl group (including an acid anhydride group); and particularly preferable are copolymers of ethylene with an unsaturated compound containing a carboxyl group (including an acid anhydride group), and graft polymers of unsaturated compound containing a carboxyl group (including an acid anhydride group) onto an olefin elastomer.

Component C4: polymer containing an amino group and/or imino group

From a structural viewpoint, the term polymer containing an amino group and/or imino group to be used in the present invention generally represents a polymer having the structure wherein an amino group and/or imino group is irregularly or regularly pendant onto branched or linear molecular chains or the structure wherein the side chain having the amino group and/or imino group is grafted or the imino group is contained within the molecular chain.

The polymer can be produced by well-known methods, such as the graft polymerization of an unsaturated compound containing an amino group and/or imino group onto a polymer, the conversion of a polar group containing a nitrogen atom to an amino group and/or imino group via hydrogenation or hydrolysis, the introduction of an amino group and/or imino group into the double bond of a polymer, and the copolymerization of an unsaturated compound containing an amino group and/or imino group with a polymerizable monomer and the like.

Among the polymers produced by the methods described above, graft polymers of an unsaturated compound containing an amino group and/or imino group onto the Component A olefin resin, the Component B copolymer resin containing non-conjugated dienes, or the Component D elastomer described below are preferable; hydrogenation products of polymers having a cyano group; hydrolysis products of polymers containing N-alkenyl amides; those polymers with an amino group and/or imino group introduced in the double bond thereof, and copolymers of an α-olefin with an unsaturated compound containing an amino group and/or imino group.

These will now be explained in detail below.

1. Graft polymer of an unsaturated compound containing an amino group and/or imino group By the aforementioned term graft polymer is generally meant, in structural terms, those having a structure where an unsaturated compound containing an amino group and/or imino group is irregularly or regularly graft polymerized in branched or linear carbon chains.

Specifically, the graft polymer has a content of an unsaturated compound containing an amino group and/or imino group in a range of 0.1 to 50% by weight, preferably in a range of 0.5 to 45% by weight, with a range of 1 to 40% by weight being particularly preferable. Furthermore, the graft polymer has a melt flow rate (MFR) measured according to ASTM-D1238, in a range of 0.1 to 1,000 g/10 min, preferably 0.5 to 700 g/10 min, and 1 to 500 g/10 min being specifically preferable, including those polymers in a liquid, semi-solid or solid state at normal temperatures.

Such graft polymers of an unsaturated compound containing an amino group and/or imino group can be produced by well-known methods, for example, kneading-mixing polymerization and solution polymerization, using the following raw materials; as the backbone polymer, the Component A α-olefin resin, the Component B copolymer resin containing non-conjugated dienes, and the Component D elastomer described below, and as the graft component, an unsaturated compound containing amino group and/or imino group as the raw materials.

In the case of production according to the kneading-mixing polymerization, there is effected melting and kneading of a mixture composed of the backbone polymer components, an amino group and/or imino group-containing an unsaturated compound and a reaction initiator such as an organic peroxide, in an extruder set at 80° to 250° C.

In the case of production by solution graft polymerization, a copolymer containing non-conjugated dienes, an unsaturated compound containing an amino group and/or imino group, and a reaction initiator such as an organic peroxide are dissolved in for example xylene, for reaction in an autoclave set at a temperature of 80° to 150° C.

The unsaturated compound containing an amino group and/or imino group to be used as the graft component includes; allyl amine, 2-aminoethyl methacrylate, 2-aminoethyl acrylate, 3-aminopropyl methacrylate, 3-aminopropyl acrylate, N-methyl allyl amine, N-ethyl allyl amine, 2-(N-methylamino)ethyl methacrylate, 2-(N-methylamino)ethyl acrylate, 2-(N-ethylamino)ethyl methacrylate, 2-(N-ethylamino)ethyl acrylate, 3-(N-methylamino)propyl methacrylate, 3-(N-methylamino)propyl acrylate, 3-(N-ethylamino)propyl methacrylate, 3-(N-ethylamino)propyl acrylate, and the like.

Among them, preferable are allyl amine, N-methyl allyl amine, N-ethyl allyl amine, 2-aminoethyl methacrylate, 2-aminoethyl acrylate, and the like; specifically preferable are 2-aminoethyl methacrylate and 2-aminoethyl acrylate.

The backbone polymer as another component of the graft polymer includes the Component A olefin resin, the Component B copolymer resin containing non-conjugated dienes, and the Component D elastomer described hereinbelow. Among them, those illustrated for the Component C2, such as ethylene resin and propylene resin are preferable.

Also included are those illustrated for the Component C2, such as the unsaturated compound containing the amino group and/or imino group, which may be used in the form of a graft copolymer or multi-component graft polymer.

These graft copolymers each may be used alone or in combinations of two or more.

2. Hydrogenation product of polymer containing a cyano group

The term polymer containing a cyano group means a polymer having a structure wherein the cyano group is irregularly or regularly pendant onto branched or linear molecular chain or the structure wherein the side chain having the cyano group is grafted.

Specifically, such polymers have at least one cyano group within the molecule thereof and a molecular weight in a range of 200 to 100,000, preferably 800 to 50,000, with 1,000 to 30,000 being specifically preferable in a liquid, semi-solid or solid state at normal temperatures.

Specific examples of the polymer containing a cyano group include, for example, (i) a polymer obtained by polymerizing a monomer such as ethylene or conjugated dienes and the like by using a compound containing a cyano group as an initiator; and (ii) a copolymer of an unsaturated compound containing a cyano group with other polymerizable monomers and a graft polymer thereof onto other backbone polymers.

These polymers containing a cyano group can be produced by known methods, without any limitation. For example, there are illustrated radical polymerization, solution polymerization, emulsion polymerization, solution graft polymerization, kneading-mixing polymerization and the like.

These polymers will now be explained hereinbelow.

(i) Polymer produced by using a compound containing a cyano group as an initiator The polymer can be produced by radical polymerization, using the initiator containing a cyano group and employing a monomer described below as the raw material. There is illustrated for example the method disclosed in Japanese Patent Laid-Open No. 1-318017.

As the raw material monomer for these polymers, ethylene or at least one type of conjugated diene monomer is used. As the conjugated diene monomer, there are illustrated 1,3-butadiene, 1,3-pentadiene, isoprene, chloroprene, 2,3-dimethyl-1,3-butadiene, 1-phenyl-1,3-butadiene, and the like. Among them, ethylene, 1,3-butadiene, 1,3-pentadiene and isoprene are preferable, and 1,3-butadiene is the most preferable.

As the initiator, there are illustrated 2,2'-azobis(2-amidinopropane)dihydrochloride, azobis-isobutyronitrile (AIBN), 1,1'-azobis(cyclohexane-1-carbonitrile), 2,2'-azobis(2,4-dimethyl valeronitrile), 2,2'-azobis(4-methoxy-2,4-dimethyl valeronitrile), and the like. Among them, specifically preferable are azobis-isobutyronitrile and 1,1'-azobis(cyclohexane-1-carbonitrile).

As the monomer copolymerizable with the conjugated diene monomer, there may be used those illustrated above, such as methyl acrylate and ethyl acrylate, which may also be used in the form of a copolymer or multi-component polymer.

(ii) Copolymer of unsaturated compound containing a cyano group with other polymerizable monomers, or graft polymer onto other backbone polymers Specific examples of the copolymer and the graft polymer include ethylene/acrylonitrile copolymers, acrylonitrile/butadiene copolymers, acrylonitrile/styrene copolymers, acrylic rubber-graft/acrylonitrile/styrene copolymers, acrylonitrile/butadiene/styrene copolymers and the like. In the case of production by high-pressure radical polymerization, for example, ethylene, an unsaturated compound containing a cyano group, and an initiator are continuously fed, at a ratio of ethylene to the unsaturated compound containing a cyano group of 1:0.0001 to 1:0.1, into a reaction zone maintained at a pressure of 1,000 to 3,000 atm and a temperature of 90° to 300° C. under conditions for achieving a conversion rate of 3 to 20%, to produce an ethylene copolymer, thereafter continuously taking out the copolymer from the reaction zone.

The unsaturated compound containing a cyano group to be used herein includes acrylonitrile, methacrylonitrile, croton nitrile and the like, and preferably is acrylonitrile.

If the polymer is a copolymer with another polymerizable monomer, the copolymerizable monomer is preferably an α-olefin with 2 to 12 carbon atoms.

Specifically, there are illustrated those described for the Component C2, such as ethylene and propylene. Specific examples among them are ethylene, propylene, 1-butene, 3-methyl-1-butene, 4-methyl-1-pentene, styrene and the like; specifically preferable are ethylene and propylene. These α-olefins may be used satisfactorily in combinations of two or more.

if the polymer is a graft polymer, the backbone polymer thereof includes the Component A olefin resin, the Component B copolymer resin including non-conjugated dienes and the Component D elastomer described hereinbelow; among them, those illustrated for the Component C2, such as ethylene resin and propylene resin are preferable.

Even if the polymer is a copolymer and graft polymer, another copolymerizable monomer component other than the monomer components described above, includes those illustrated above for the Component C2, such as methyl acrylate and ethyl acrylate, which may be used in the form of a copolymer, multi-component polymer and graft copolymer.

These (co)polymers and graft polymers may each be used alone or in combinations of two or more.

The hydrogenation product of the polymer containing cyano group, to be used in the present invention, represents a product produced by hydrogenation of the polymer containing a cyano group to convert the cyano group into amino group.

For the method of hydrogenation, there may be employed conventional methods, using homogeneous or heterogeneous catalysts.

As the homogeneous catalysts, to be used as the catalysts for such general hydrogenation, cobalt octacarbonyl ($Co_2(CO)_8$) may preferably be used; whereas as the heterogeneous catalysts, there may preferably be used Raney-cobalt, Raney-nickel, palladium carbon (Pd/C), platinum oxide ($PtO_2$), and rhodium/alumina ($Rh/Al_2O_3$).

The conditions for such hydrogenation reaction is preferably at a temperature from normal temperature to 250° C. and a hydrogen pressure of normal to 200 kg/cm².

The degree of hydrogenation is such that the cyano groups contained in the polymer may be hydrogenated satisfactorily into amino groups, entirely or partially, but at least one amino group should be present per molecule thereof.

The portion thereof other than the cyano group may or may not be hydrogenated, but the portion of the double bonds of the diene polymer is preferably hydrogenated.

Among the hydrogenation products of these polymers containing a cyano group, the diene polymer containing a cyano group obtained by polymerizing a conjugated diene monomer using a compound containing a cyano group both sides of the azo group as the radical-polymerization initiator is then preferably hydrogenated. Specifically preferable is the hydrogenation product of the diene polymer containing cyano groups polymerized with 1,3-butadiene as the raw material.

These polymers each may be used alone or in combinations of two or more.

3. Hydrolyzed product of polymer containing N-alkenyl amides

By the term polymer containing N-alkenyl amides is meant those obtained by polymerization or copolymerization of N-alkenyl amides or those obtained by graft polymerization thereof onto other backbone polymers.

Specifically, such polymers have a content of N-alkenyl amide compounds in a range of 0.01 to 100% by weight, preferably 0.05 to 70% by weight, more preferably 0.1 to 40% by weight, and have a melt flow rate (MFR) measured according to ASTM-D1238, of 0.01 to 1,000 g/10 min, preferably 0.05 to 700 g/10 and more preferably 0.1 to 500 g/10 min, being liquid, semi-solid or solid at normal temperatures.

Such polymers containing N-alkenyl amides can be produced by well-known methods, for example, high-pressure radical polymerization, solution polymerization, emulsion polymerization, solution graft polymerization and kneading-mixing polymerization.

In the case of production by high-pressure radical polymerization, for example, N-vinyl acetoamide, ethylene and a radical polymerization initiator are continuously fed into a reaction zone maintained at a pressure of 1,000 to 3,000 atm and a temperature of 90° to 300° C. under conditions appropriate for a conversion rate of 3 to 20%, to produce a copolymer, thereafter continuously taking out the copolymer from the reaction zone.

Such N-alkenyl amide compounds to be used in the polymer include, for example, N-vinyl acetoamide, N-allyl acetoamide, N-vinyl propionic amide, N-allyl propionic amide and the like. Among them, N-vinyl acetoamide and N-allyl acetoamide are preferable.

If the polymer is a copolymer with other polymerizable monomers, α-olefins with 2 to 12 carbon atoms are preferable as the copolymerizable monomer.

Specifically, there are illustrated those described for the Component C2; preferable examples among them are ethylene, propylene, 1-butene, 3-methyl-1-butene, 4-methyl-1-pentene, styrene and the like. Specifically preferable examples are ethylene and propylene. These α-olefins may be used satisfactorily in combinations of two or more.

If the polymer is a graft polymer, the backbone polymer includes the Component A olefin resin, the Component B copolymer resin containing non-conjugated dienes and the Component D elastomer described hereinbelow; among them, preferable are those illustrated for the Component C2, such as ethylene resin and propylene resin.

Even if the polymer is a copolymer and graft polymer, still another copolymerizable monomer component other than the monomer components described above, includes those illustrated above for the Component C2 such as methyl acrylate and ethyl acrylate, which may be used in the form of a copolymer, multi-component polymer and graft copolymer.

These (co)polymers and graft (co)polymers may each be used alone or in combinations of two or more.

The method for hydrolyzing the polymer containing N-alkenyl amides is illustrated by a method comprising adding a catalyst such as alkali or acid along with alcohol, thereby carrying out hydrolysis.

The degree of hydrolysis of the polymer containing N-alkenyl amides is 100 to 1%, preferably 100 to 10%, with 100 to 30% being specifically preferable. The polymer may be satisfactorily hydrolyzed, completely or partially.

The hydrolyzed product of the polymer containing N-alkenyl amides is preferably a hydrolyzed product of the copolymer of N-alkenyl amide compound with an α-olefin, and particularly preferable is a hydrolyzed product of the copolymer of N-vinyl acetoamide with ethylene.

4. Polymer with amino groups introduced in double bonds thereof

The polymer with amino groups introduced in the double bond thereof, to be used in the present invention, generally represents a polymer having double bonds into which are introduced amino groups, according to well-known methods.

Specifically, the polymer contains at least one amino group within the molecule and has a melt flow rate (MFR) measured according to ASTM-D1238, in a range of 0.01 to 1,000 g/10 min, preferably 0.05 to 700 g/10 min, more preferably 0.1 to 500 g/10 min, being liquid, semi-solid or solid at normal temperatures.

There is no limitation on the method to introduce amino groups into the double bonds. Accordingly, a variety of known methods may be employed therefor. Amino groups can be introduced, by reacting the double bond contained in the polymer with a hydroboration reagent having B-H bonds, followed by the reaction with an amination reagent such as ammonia.

A polymer having double bonds, as the raw material for such polymer, includes the Component B copolymer resin containing non-conjugated dienes, diene polymers obtained by polymerizing conjugated dienes, polyolefins polymerized using known Kaminsky catalysts, and the Component D elastomer, hereinafter described, and also containing double bonds.

Among them, preferable examples are copolymer resins of ethylene with non-conjugated dienes, copolymer resins of propylene with non-conjugated dienes, copolymer resins of ethylene, propylene and non-conjugated dienes, and polypropylene resins polymerized using known Kaminsky catalysts, ethylene/propylene non conjugated diene copolymer rubber (EPDM), and copolymers of styrene/conjugated diene block copolymers. Specifically preferable examples among them are copolymer resins of ethylene/non-conjugated dienes, copolymer resins of propylene, ethylene, and non-conjugated dienes, and polypropylene resins polymerized using known Kaminsky catalysts.

Hydroboration is effected as a method for introducing an amino group into double bond, followed by amination reaction. In such cases, generally known hydroboration reagents may be used without specific limitations. Preference is given to diboran THF solution, sodium borohydride, 9-borabicyclo[3,3,1]nonene, and the like.

The amination reagent includes for example ammonia, chloramine, hydroxylamine-o-sulfonic acid, o-mesitylene sulfonylhydroxylamine and the like.

These polymers each may be used alone or in combinations of two or more.

5. Copolymer of α-olefin with unsaturated compound containing an amino group and/or imino group By the term copolymer is generally meant, from a structural standpoint, a polymer having a structure wherein an unsaturated compound containing an amino group and/or imino group is irregularly or regularly copolymerized with an α-olefin in a branched or linear carbon chain.

Specifically, there are included those polymers in liquid, semi-solid or solid state at normal temperatures.

The copolymer of an α-olefin with an unsaturated compound containing an amino group and/or imino group can be produced by well-known methods, such as high-pressure radical polymerization and slurry polymerization, using as the raw materials alpha-olfeins and an unsaturated compound containing an amino group and/or imino group.

In the case of production by high-pressure radical polymerization, for example, ethylene, an unsaturated compound containing an amino group and/or imino group and a radical-polymerization initiator are continuously fed at a ratio of ethylene to the unsaturated compound containing an amino group and/or imino group of 1:0.0001 to 1;0.1, into a reaction zone maintained at a pressure of 1,000 to 3,000 atm and a temperature of 90° to 300° C. under conditions for achieving a conversion rate of 3 to 20%, to produce an ethylene copolymer, thereafter continuously taking out the copolymer from the reaction zone.

In the case of production by slurry polymerization, such copolymers can be produced by polymerizing propylene, an unsaturated compound containing an amino group and/or imino group, both of the groups being protected with an organic aluminum compound or trialkyl silane compound or the like, in for example heptane solvent, using a known Ziegler catalyst and the like, at pressure of normal to 20 atm and a temperature of 30° to 150° C., hydrolyzing the resulting polymer, and thereafter removing the protecting groups.

The unsaturated compound containing amino group and/or imino group to be used herein includes those illustrated in item 1, such as allyl amine and 2-aminoethyl methacrylate.

Among them, allyl amine, N-methylallyl amine, N-ethylallyl amine, 2-aminoethyl methacrylate, 2-aminoethyl acrylate and the like are preferable; and specifically preferable are 2-aminoethyl methacrylate and 2-aminoethyl acrylate.

The other copolymerizable component α-olefin includes those illustrated for the Component C2, such as ethylene and propylene. Preferable examples among them are ethylene, propylene, 1-butene, 3-methyl-1-butene, 4-methyl-1-pentene, styrene and the like. Specifically preferable examples among them are ethylene and propylene. These α-olefins each may be used also in combinations of two or more.

Other than such α-olefins and the unsaturated compound containing an amino group and/or imino group, a third copolymerizable monomer includes those illustrated for the Component C2, such as methyl acrylate and ethyl acrylate, which may be used as a terpolymer or multi-component polymer.

These copolymers may each be used alone or in combinations of two or more.

Among these polymers containing an amino group and/or imino group, graft polymers of the unsaturated compound containing an amino group and/or imino group and the hydrogenation product of the polymer containing a cyano group are preferable; and specifically preferable are graft polymers of the unsaturated compound containing an amino group and or imino group onto a copolymer resin including non-conjugated dienes and the hydrogenation product of the diene polymer containing a cyano group.

Component C5: polymer containing an epoxy group

From a structural standpoint, the polymer containing an epoxy group to be used in the present invention generally represents those having a structure where the epoxy group is irregularly or regularly pendant in branched or linear molecular chains or the structure where the side chain containing epoxy group is grafted.

The polymers can be produced by well-known methods. For example, there are illustrated copolymerization of an unsaturated compound containing an epoxy group and a polymerizable monomer; graft polymerization of an unsaturated compound containing an epoxy group onto a polymer; a method comprising reacting, epichlorohydrin or the like with the polar group having active hydrogen in a polymer; a method comprising oxidizing the double bond in a polymer thereby generating an epoxy group; and a method comprising addition polymerizing a bi- or multi-functional compound containing active hydrogen with epichlorohydrin.

Among the polymers to be produced according to these methods, copolymers of α-olefins with an unsaturated compound containing an epoxy group, graft polymers of an unsaturated compound containing an epoxy group onto the Component A olefin resin, the Component B copolymer resin containing non-conjugated diene and the Component D elastomer described hereinbelow, a product containing an epoxy group produced by the oxidation of the double bonds in a polymer and addition polymer of epichlorohydrin and polyhydric alcohol, and the like. These will now be explained hereinbelow in detail.

1. Copolymer of an α-olefin with an unsaturate compound containing an epoxy group From a structural standpoint, the copolymer generally represents those having the structure where the unsaturated compound containing an epoxy group is irregularly or regularly copolymerized with α-olefins in branched or linear molecular chains.

Specifically, the polymer has a content of the unsaturated compound containing an epoxy group in a range of 0.1 to 50% by weight, preferably 0.5 to 45% by weight, and specifically 1 to 40% by weight being preferable and has a melt flow rate (MFR) measured according to ASTM-D1238, in a range of 0.01 to 1,000 g/10 min, preferably 0.1 to 700 g/10 min, specifically preferably 0.5 to 500 g/10 min, being liquid, semi-solid or solid at normal temperatures.

Such copolymers of α-olefins with an unsaturated compound containing an epoxy group can be produced by well-known methods, for example by high-pressure radical polymerization, using α-olefins and an unsaturated compound containing an epoxy group as the raw materials.

In the case of production by high-pressure radical polymerization, for example, ethylene, an unsaturated compound containing an epoxy group and a radical-polymerization initiator are continuously fed into are reaction zone maintained at a pressure of 1,000 to 3,000 atm and a temperature of 90° to 300° C. under conditions to achieve a conversion rate of 3 to 20%, to produce an ethylene copolymer, thereafter continuously taking out the copolymer from the reaction zone.

The unsaturated compound containing an epoxy group to be used herein includes glycidyl acrylate, glycidyl methacrylate, allyl glycidyl acrylate and the like. Among them, glycidyl acrylate and glycidyl methacrylate are preferable.

The other copolymerizable component α-olefin includes those illustrated for the Component C2, such as ethylene and propylene. Preferable examples among them are ethylene, propylene, 1-butene, 3-methyl-1-butene, 4-methyl-1-pentene, styrene and the like. Specifically preferable examples are ethylene and propylene. These α-olefins each may be used also in combinations of two or more.

Other than such α-olefins and the unsaturated compounds containing an epoxy group, a third copolymerizable monomer includes those illustrated for the Component C2, such as methyl acrylate and ethyl acrylate, which may be used in the form of copolymers or multi-component polymers.

These copolymers each may be used alone or in combinations of two or more.

2. Graft polymer of unsaturated compound containing an epoxy group

From a structural standpoint, the graft polymer generally represents those having a structure where the unsaturated compound containing an epoxy group is irregularly or regularly graft polymerized in branched or linear molecular chains.

Specifically, the polymer includes those in liquid, semi-solid or solid state at normal temperatures.

Such graft polymers of the unsaturated compound containing an epoxy group can be produced by well-known methods, for example by kneading-mixing graft polymerization and solution graft polymerization, using the following raw materials; as the backbone polymer, the Component A olefin resin, the Component B copolymer resin containing non-conjugated dienes and the Component D elastomer; and as the graft polymer, the unsaturated compound containing an epoxy group.

In the case of production by kneading-mixing graft polymerization, the backbone polymer components, the unsaturated compound containing an epoxy group, and an organic peroxide as a reaction initiator are continuously fed into an extruder set at 80° to 250° C.

In the case of solution graft polymerization, a copolymer containing non-conjugated dienes, an unsaturated compound containing an epoxy group, and an organic peroxide as reaction initiator are dissolved in for example xylene, for reaction in an autoclave set at a temperature of 80° to 150° C., to produce the graft polymer. The unsaturated compound containing an epoxy group as the graft component to be used herein includes glycidyl acrylate, glycidyl methacrylate, allyl glycidyl ether and the like. Among them, preference is given to glycidyl acrylate and glycidyl methacrylate.

The backbone polymer as the other component of the graft polymer includes the Component A olefin polymer, the Component B copolymer resin containing non-conjugated dienes, and the Component D elastomer described below; preferable examples among them are illustrated for the Component C2, such as ethylene resin and propylene resin.

Other than the component of such unsaturated compound containing an epoxy group, a second graft copolymerizable monomer includes those illustrated for the Component C2, such as methyl acrylate and ethyl acrylate, which may be used in graft copolymer or multi-component graft polymer.

These graft copolymers each may be used alone or in combinations of two or more.

3. Product containing an epoxy group produced by oxidation of double bond in polymer By the term product containing an epoxy group produced by the oxidation of the double bond in a polymer is meant a compound wherein an epoxy group is generated by the oxidation of the double bond in the polymer.

Specifically, such product has a molecular weight in a range of 200 to 200,000, preferably 500 to 100,000, with 800 to 70,000 being specifically preferable, including polymers that are in liquid, semi-solid, or solid state at normal temperatures.

The epoxy group is produced at an amount of 1% or more, preferably at 5% or more, specifically preferably 10% or more of the double bond contained in the polymer.

The method to produce an epoxy group through the oxidation of the double bond in a polymer is no way limited, and there are illustrated oxidation with peracid such as performic acid, peracetic acid, perbenzoic acid, and the like; oxidation with hydrogen peroxide or hydroperoxide in the presence or absence of a catalyst such as compounds of vanadium, tungsten, molybdenum and the like; oxidation by alkaline hydrogen peroxide; and oxidation by sodium hypochlorite in the presence or absence of porphyrin complex or a phase transfer catalyst.

Among them, oxidation with peracid and oxidation with hydrogen peroxide or hydroperoxide in the presence or absence of a catalyst such as compounds of vanadium, tungsten, molybdenum and the like are preferable.

The polymer having a double bond to be used herein includes the Component B copolymer resin containing non-conjugated dienes, diene polymers obtained by polymerization of conjugated dienes, polyolefins polymerized using known Kaminsky catalysts, and the Component D elastomer containing a double bond, hereinbelow described.

Among them, preferable are copolymer resins of ethylene/non-conjugated dienes, copolymer resins of propylene and non-conjugated dienes, copolymer resins of ethylene/propylene/non-conjugated diene, polypropylene resins obtained by using known Kaminsky catalysts, copolymer rubber of ethylenes, propylene and non-conjugated dienes (EPDM), and block copolymers of styrene and conjugated diene.

Specifically preferable are copolymer resins of ethylene with non-conjugated diene, copolymer resins of propylene, ethylene and non-conjugated dienes, and polypropylene resin obtained by known Kaminsky catalysts These polymers may each be used alone or in combinations of two or more.

In producing epoxy groups via such oxidation, the product may be contaminated with byproducts through the auxiliary reaction, only if the epoxy group is substantially generated even if the yield of the epoxy group is not 100%.

4. Addition polymer of epichlorohydrin and polyhydric alcohol compound

From a structural standpoint, the addition polymer has at least one epoxy group in the branched or linear molecular chains.

Specifically, such polymer has a molecular weight in a range of 200 to 200,000, preferably in a range of 500 to 50,000, with a range of 800 to 10,000 being specifically preferable and being liquid, semi-solid, or solid at normal temperature.

No limitation is imposed onto the method to produce the addition polymer. Polymerization is effected through the addition reaction of epichlorohydrin and polyhydric alcohol, followed by the reaction for removing hydrochloric acid Specifically, the addition polymer can be produced by reacting 1,8-octane diol and epichlorohydrine with sodium hydroxide.

There is no limitation concerning the polyhydric alcohol compound to be used herein, but a diol compound is preferable. Specifically, there are illustrated ethylene glycol, propylene glycol, trimethylene glycol, 1,4-butane diol, 1,5-pentane diol, 1,6-hexane diol, 1,7-heptane diol, 1,8-octane diol, 1,9-nonane diol, 1,10-decane diol, cyclohexane diol, hydroquinone, bisphenol, and 2,2-bis(4'-oxyphenyl)propane and the like. Preferable examples among them are 1,6-hexane diol, 1,8-octane diol, 1,10-decane diol, and 2,2-bis(4'-oxyphenyl)propane. Specifically preferable examples among them are 1,8-octane diol, and 1,10-decane diol. These polyhydric alcohol compounds each may be used in combinations of two or more.

Explanation has been given concerning the polymer containing an epoxy group to be used as the Component C5 of the resin composition of the present invention. Specific preferable examples of the polymer include copolymers of α-olefins with an unsaturated compound containing an epoxy group, and graft polymers of unsaturated compounds containing an epoxy group; specifically preferable examples are copolymers of ethylene and an unsaturated compound containing an epoxy group and graft copolymers of an unsaturated compound containing epoxy group onto olefin polymers Component D: Elastomer The elastomer component to be used in the preferable resin composition of the present invention is a polymer showing rubber elasticity at normal temperature, which is selected from high-molecular natural or synthetic rubbers. Specific examples of synthetic rubbers include styrene elastomers, butadiene rubber, isoprene rubber, olefin elastomers, acrylonitrile/butadiene copolymer rubber, chloroprene rubber, butyl rubber, urethane elastomers, silicone elastomers, fluorine elastomers, acrylic elastomers and the like.

Specifically preferable examples among them are styrene, olefin urethane, silicone and acrylic elastomers; the more preferable ones are styrene elastomers and olefin elastomers. Specific examples are described hereinbelow.

1. Styrene elastomer

The styrene elastomer includes elastomeric random and/or block copolymers of styrene compound such as styrene and α-methyl styrene, with conjugated diene such as 1,3-butadiene, isoprene and the like; and the hydrogenation product of these elastomeric copolymers. Among these styrene elastomers, a block copolymer of styrene compound with conjugated diene and the hydrogenated product thereof are preferable. These block copolymers are in linear or radial form and represented by the following general formula:

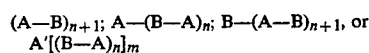

(wherein A represents polymer a block comprising styrene compound; A' represents a chemical species bonded (B—A) blocks; B represents polymer block of conjugated diene or hydrogenated product of conjugated diene polymer block; n is an integer of 1 to 20; m is an integer of 2 or more; A block and A' in total occupy 1 to 50% by weight of the entire molecule.

The average molecular weight of these copolymers is 10,000 to 1,000,000, preferably 50,000 to 250,000.

Examples of styrene elastomers mentioned above are styrene/butadiene random copolymers, styrene/isoprene random copolymers, styrene/butadiene/styrene triblock copolymers, styrene/isoprene/styrene triblock copolymers, styrene/butadiene radial block copolymers with terminal polystyrene block, styrene/isoprene radial block copolymers with terminal polystyrene block, styrene/butadiene multi-block copolymer, and styrene/isoprene multi-block copolymer, and the hydrogenation products thereof.

Among these styrene elastomers, hydrogenated styrene/conjugated diene block copolymers are preferable.

2. Olefin elastomer

The olefin elastomer including a copolymer of an α-olefin such as ethylene, propylene, 1-butene, and 1-hexene with another α-olefin, or copolymer of these olefins with non-conjugated diene, or homopolymer of higher α-olefins such as 1-hexene and the like, is a polymer in the form of an elastomer and has a Mooney viscosity ($M+L_{1+4}$) measured at 100° C., generally in a range of 1 to 200, preferably in a range of 5 to 150, with a range of 7 to 100 being specifically preferable.

Among these olefin elastomers, ethylene elastomer is specifically preferable in terms of quality and stability. Specifically, there are illustrated ethylene/propylene copolymer rubber (EPM), ethylene/1-butene copolymer rubber, ethylene/propylene/non-conjugated diene copolymer rubber (EPDM), ethylene/1-butene/non-conjugatd diene copolymer rubber, ethylene/propylene/1-butene/non-conjugated diene copolymer rubber, and the like.

Specific examples of the non-conjugated diene are dicyclopentadiene, 1,4-hexadiene, cyclooctadiene, dicyclooctadiene, methylene norbornene, 5-ethylidene-2-norbornene, 5-vinyl-2-norbornene, 5-methylene-2-norbornene, 5-methyl-1,4-hexadiene, 7-methyl-1,6-octadiene and the like.

Among these elastomer components, olefin elastomers in particular are preferably used because it is difficult for the molding surface to deteriorate.

Component E: Filler

As the filler to be used in the preferable resin composition of the present invention, there may satisfactorily be used either inorganic or organic fillers, which may be in plate, sphere, fiber or undefined forms.

Specific examples thereof include natural silicas such as quartz, synthetic silica produced by wet or dry methods; natural silicates such as kaolin, mica, talc, asbestos and the like; synthetic silicates such as calcium silicate, aluminum silicate and the like; metal hydroxide such as magnesium hydroxide and aluminum hydroxide and the like; metal oxides such as alumina, titanic and the like; calcium carbonate; powdery metals such as aluminum, bronze and the like; wood flour; carbon black; fiber substances such as glass fiber, carbon fiber, aramido fiber, alumina fiber and the like; high-molecular weight liquid crystal substances; whiskers such as potassium titanate whisker, magnesium sulfate whisker, aluminum borate whisker, calcium carbonate whisker, magnesium borate whisker, zinc oxide whisker, silicon carbide whisker, silicon nitride whisker, sapphire whisker, berrylia whisker and the like.

Preferable ones among them are mica, talc, magnesium hydroxide, calcium carbonate, potassium titanate whisker, magnesium sulfate whisker, aluminum borate whisker, calcium carbonate whisker, and glass fiber; specifically preferable are talc, calcium carbonate, potassium titanate whisker, magnesium sulfate whisker and glass fiber.

These filler components may satisfactorily be ones treated with surfactants or coupling agents or the like. The filler components may each be used alone or in combinations of two or more. Each of the fillers may be selected from those commercially available ones.

Component F:

The component F to be used in the present invention is at least one selected from the group consisting of the following;

F1. organotin compound;
F2. tertiary amine compound; and
F3. phosphorus oxy compound.

Each of the components will now be explained hereinbelow.

Component F1: organotin compound

The organotin compound to be used in the present invention is illustrated by a compound where at least one alkyl chain having 1 to 12 carbon atoms is bonded to tin atom, which is preferably represented by the following formula (II) or (III);

(wherein $R^6$, $R^7$, $R^8$, $R^9$ and $R^{10}$ may or may not be the same, representing independently a saturated hydrocarbon group having 1 to 12 carbon atoms, and preferably a saturated hydrocarbon group having 3 to 12 carbon atoms; $Y^1$, $Y^2$, $Y^3$, $Y^4$ and $Y^5$ represent independently aliphatic acid residue, the residue of maleate derivative, mercaptan residue, mercapto acid residue, alcohol residue and the like, which may or may not be the same, and preferably aliphatic acid residue and the residue of maleate derivative; furthermore, $X^1$ represents oxygen atom, sulfur atom and maleate residue and the like, preferably oxygen atom and maleate residue; m is an integer of 0 to 30, preferably of 0 to 25, more preferably of 0 to 20.)

Specific examples of these organic tin compounds include monobutyltin trimethyl-maleate, monobutyltin trioctyl-maleate, dibutyltin dilaurate, dibutyltin laurate methyl maleate, dibutyltin dioleyl-maleate, dibutyltin dimethyl-maleate, dibutyltin maleate, dibutyltin methoxymethyl-maleate, dibutyltin dioctylmaleate, dibutyltin dioctyl thiogylcolate, dibutyltin lauryl mercaptide, tribenzyltin octyl maleate and the like. Among them, dialkyltin compound is preferably used.

These organotin compounds each may be used alone or in combinations of two or more. Generally, they may be selected from commercially available ones for appropriate use.

Component F2: tertiary amine compound

The tertiary amine compound to be used in the present invention includes low-molecular weight to high-molecular weight compounds having tertiary amine structure.

1. Low-molecular weight compound having tertiary amine structure

The low-molecular weight compound having tertiary amine structure has a molecular weight of 100 to less than about 1,000. Specific examples include triethylene diamine, dimethylaminopropyl amine, diethylaminopropyl amine, tetraguanidine, 1,8-diazabicyclo(5,4,0)-7-undecene, N,N-bis(2-hydroxyethyl)laurylamine, and tetrakis(N-methyl-2,2,6,6-tetramethyl-4-piperidyl)1,2,3,4-butane tetracarboxylate and the like.

These may be selected from commercially available ones for appropriate use.

2. High-molecular weight compound having tertiary amine structure

The high-molecular weight compound having tertiary amine structure includes polymers each of a molecular weight of 1,000 or more to about 100,000 and being liquid, semi-solid or solid at normal temperature.

As such high-molecular weight compound having tertiary amine structure, modified olefin polymers containing a tertiary amino groups preferable is, because it hardly bleeds out during use.

From a structural standpoint, such modified olefin polymers containing a tertiary amino group, which hardly bleed out during use, represents generally those having a structure where an unsaturated compound containing a tertiary amino group is copolymerized regularly or irregularly in branched or linear carbon chains or a structure where the side chain having tertiary amine structure is graft polymerized.

Specifically, the polymer has a content of unsaturated compound containing a tertiary amino group in a range of 0.1 to 50% by weight, preferably in a range of 0.5 to 45% by weight, with a range of 1 to 40% by weight being specifically preferable and has a melt flow rate (MFR) measured according to ASTM-D1238, preferably in a range of 0.1 to 1,000 g/10 min, more preferably in a range of 0.5 to 700 g/10 min.

The modified olefin polymer containing a tertiary amino group can be produced by well-known methods. In the case of production by high-pressure radical polymerization, for example, ethylene, an unsaturated compound containing a tertiary amino group, and a radical polymerization initiator are continuously fed, at a ratio of ethylene to the unsaturated compound containing a teritary amino group of 1:0.0001 to 1:0.1, into a reaction zone maintained at a pressure of 1,000 to 3,000 atm and a temperature of 90° to 300° C. under conditions for achieving a conversion rate of 3 to 20%, to produce an ethylene copolymer, thereafter continuously taking out the copolymer from the reaction zone.

In the case of production by impregnation-graft polymerization pellets of an olefin polymer an unsaturated compound containing a tertiary amino group and a radical polymerization initiator are suspended in water to impregnate the unsaturated compound containing tertiary amine and the initiator into the polymer pellets, followed by heating up to the decomposition temperature of the initiator to induce graft polymerization in the pellets for modification, thereby producing the modified olefin polymer.

In the case of production by kneading-mixing graft polymerization, an unsaturated compound containing a tertiary amine is dry blended with an olefin polymer, an elastomer or a copolymer resin containing non-conjugated dienes using an organic peroxide as the reaction initiator, thereafter melting and kneading under mixing the blend in an extruder set at a temperature of 80° to 250° C.

Such unsaturated compound containing a tertiary amino group is represented by the following formula (IV);

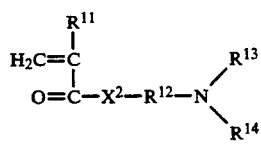

(IV)

(wherein $R^{11}$ is hydrogen atom or a saturated hydrocarbon group having 1 to 4 carbon atoms, preferably hydrogen atom or a saturated hydrocarbon group having 1 to 2 carbon atoms; $R^{12}$ is a saturated hydrocarbon group having 2 to 12 carbon atoms, preferably a saturated hydrocarbon group having 2 to 6 hydrocarbon atoms; $R^{13}$ and $R^{14}$ are independently a saturated hydrocarbon group having 1 to 12 carbon atoms, preferably of 1 to 6 carbon atoms, more preferably of 1 to 3 carbon atoms; $R^{13}$ and $R^{14}$ may or may not be the same; $X^2$ is oxygen atom or $-NR^{15}-$ or sulfur atom, preferably oxygen atom and $-NR^{15}-$; $R^{15}$ is hydrogen atom or a saturated hydrocarbon group having 1 to 12 carbon atoms, and is preferably hydrogen atom or a saturated hydrocarbon group having 1 to 6 carbon atoms).

Specific examples of these unsaturated compounds containing a tertiary amino group are 2-(dimethylamino)ethyl acrylate, 2-(diethylamino)ethyl acrylate, 2-(dimethylamino)ethyl methacrylate, 2-(diethylamino)ethyl methacrylate, 2-[di(t-butyl)amino]ethyl methacrylate, 2-[di(t-butyl)amino]ethyl methacrylate, 3-(dimethylamino)propyl acrylamide, 3-(dimethylamino)propyl methacrylamide and the like.

The component of olefin monomer for the copolymerization with the unsaturated compound containing a tertiary amino group includes α-olefins such as ethylene, propylene, 1-butene and the like; among them, ethylene is specifically preferable.

The component of olefin polymer as the backbone polymer in graft polymerizing the unsaturated compound containing a tertiary amino group includes the olefin resin (Component A), the copolymer resin containing the non-conjugated dienes (Component B), the olefin elastomer (Component D-2) described above and the like, and among them, polyethylene resin, polypropylene resin and ethylene elastomer are preferably used.

In producing the modified olefin polymer containing a tertiary amino group, the monomer component copolymerizable with the unsaturated compound containing the tertiary amino group includes those illustrated for the Component C2. By using them, the resulting olefin polymer may be used in tri-component or multi-component modified polyolefin.

These modified polyolefins each may be used alone or in combinations of two or more.

Among those tertiary amine compounds illustrated above, the high-molecular weight compound in item 2 is preferably to the low-molecular weight compound in item 1.

Component F3: phosphorus oxy compound

1. Low-molecular weight phosphorus oxy compound

The low-molecular weight phosphorus oxy compounds include phosphorous compounds having a molecular weight of 100 to less than about 1,000, for example, which may be represented by the following formula (V) or (VI);

[wherein $R^{16}$ and $R^{18}$ are: hydrogen, substitute comprising hydrocarbon residue which may contain an alkyl chain, aliphatic ring, aromatic ring structures and the like, $R^{20}C(O)S-$, $R^{21}R^{22}N-$, $R^{23}S-$ and the like, $R^{17}$ and $R^{19}$ are: hydrogen, a substitute comprising hydrocarbon residue which may contain alkyl chain, polyalkylene glycol chain, aliphatic ring, aromatic ring structures and the like, $R^{24}C(O)-$ and the like; when $R^{16}$ and $R^{18}$, or ($OR^{17}$) and ($OR^{19}$) are bonded with the plural of phosphorus atoms, $R^{16}$ and $R^{18}$, or $R^{17}$ and $R^{19}$ may or may not be the same; $R^{20}$, $R^{21}$, $R^{22}$, $R^{23}$ and $R^{24}$ are substitutes comprising hydrocarbon residue which may contain alkyl chain, polyalkylene glycol chain, aliphatic ring, to aromatic ring structures and the like; and n is an integer of 0 to 2.]

Among them, phosphorus oxy compounds represented by the above-mentioned formula (VI) are preferable; [wherein $R^{18}$ is hydrogen; substitute comprising hydrocarbon residue which may contain alkyl chain, aliphatic ring, aromatic ring structures and the like; $R^{19}$ is hydrogen; substitute comprising hydrocarbon residue which may contain alkyl chain, polyalkylene glycol chain, aliphatic ring, aromatic ring structures and the like; when $R^{18}$ or $(OR^{19})$ are bonded with the plural of phosphorus atoms, $R^{18}$ or $R^{19}$ may or may not be the same]

and specifically preferable compounds are represented by the following formula (VII):

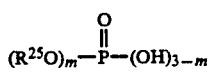  (VII)

[wherein $R^{25}$ is substitute comprising hydrocarbon residue which may contain alkyl chain, aliphatic ring, aromatic ring structures and the like; m is an integer of 1 or 2; when $(OR^{25})$ is bonded with the plural phosphorus atoms, $R^{25}$ may or may not be the same respectively.]

Common examples of them are diaryl phosphinous acid, dialkyl phosphinous acid, aryl phosphonous acid, alkyl phosphonous acid, diaryl phosphonic acid, dialkyl phosphinic acid, aryl phosphonic acid, alkyl phosphonic acid, phosphorous acid, phosphoric acid and compounds having a structure of ester derivatives thereof.

Preferable examples are phosphinic acid, phosphonic acid, phosphoric acid and compounds having a structure of ester derivatives thereof, and specifically preferable examples of them are acidic phosphate ester derivatives.

Specifically preferable examples of the acidic phosphate ester derivatives include monobutyl phosphate, dibutyl phosphate, mono(2-ethyl hexyl) phosphate, di(2-ethyl hexyl) phosphate, mono(isodecyl) phosphate, di(isodecyl) phosphate, mono(lauryl) phosphate, di(lauryl) phosphate, mono(tridecyl) phosphate, di(tridecyl) phosphate, mono(nonylphenol ethylene oxide) phosphate, di(nonylphenol ethylene oxide) phosphate and the like.

Furthermore, phosphorous compounds which cannot be represented by the above-mentioned formulae, but may produce the compounds represented by the above-mentioned formulae when preparing a resin composition of the present invention may also be used.

These phosphorus oxy compounds may each be used alone or in combinations of two or more, and may generally be selected from those commercially available.

2. High-molecular weight phosphorus oxy compound

The high-molecular weight phosphorus oxy compound having the phosphorus oxy structure includes such polymers having a molecular weight of 1,000 or more to about 500,000, being liquid, semi-solid or solid at normal temperatures.

Among such high-molecular weight compounds having the phosphorus oxy structure modified olefin polymers containing the phosphorus oxy structure are preferably used because they hardly bleed out.

In structural standpoint terms, such modified olefin polymers having the phosphorus oxy structure represent generally those having a structure where an unsaturated compound containing the phosphorus oxy structure is copolymerized regularly or irregularly in branched or linear carbon chains or the structure where the side chain having phosphorus oxy structure is graft polymerized.

Specifically, such polymer has a content of in a range of 0.1 to 50% by weight, preferably in a range of 0.5 to 40% by weight, specifically preferably in a range of 1 to 30% by weight, and has a number average molecular weight in a range of 1,000 to 500,000, preferably in a range of 1,500 to 300,000, with a range of 2,000 to 100,000 being specifically preferable.

The modified olefin polymer containing phosphorus oxy structure can be produced by well-known methods, using an unsaturated compound containing phosphorus oxy structure, phosphorous pentooxide, and oxychlorophosphor. In the case of the production according to the high-pressure radical polymerization, for example, ethylene, an unsaturated compound containing phosphorus oxy structure and a radical polymerization initiator are continuously fed, at a ratio of ethylene to the unsaturated compound containing phosphorus oxy structure of 1:0.0001 to 1:0.1, into a reaction zone maintained at a pressure of 1,000 to 3,000 atm and a temperature of 90° to 300° C., thereafter continuously taking out the polymer from the reaction zone.

In the case of production by kneading-mixing graft polymerization, an unsaturated compound containing phosphorus oxy structure is dry blended with an olefin polymer, elastomer or a copolymer containing non-conjugated dienes, using an organic peroxide as the reaction initiator, thereafter melting and kneading under mixing the blend in an extruder set at a temperature of 80° to 250° C.

In the case of production by solution reaction, an excessive amount of phosphorus oxychloride is reacted with a polymer containing a hydroxyl group, for example, partially hydrolyzing the resulting product under alkali conditions, to produce the polymer.

Such unsaturated compound containing the phosphorus oxy structure is represented by the following formula (VIII);

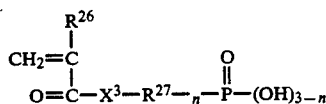  (VIII)

(wherein $R^{26}$ is a hydrogen atom or a saturated hydrocarbon having 1 to 4 carbon atoms, preferably a hydrogen atom or a saturated hydrocarbon group having 1 to 2 carbon atoms; $R^{27}$ is a saturated hydrocarbon group having 2 to 12 carbon atoms, or a saturated alkoxy group having 2 to 12 carbon atoms and containing an oxygen atom bonded to the side of the phosphor atom, preferably a saturated alkoxy group containing an oxygen atom bonded to the side of the phosphor atom and having 2 to 6 carbon atoms; $X^3$ is oxygen atom or $-NR^{28}-$ or sulfur atom, preferably an oxygen atom; $R^{28}$ is a hydrogen atom or a saturated hydrocarbon group having 1 to 12 carbon atoms, and is preferably a hydrogen atom or a saturated hydrocarbon group having 1 to 6 carbon atoms; n is an integer of 1 to 3, preferably 1 to 2).

Specific examples of these unsaturated compounds containing phosphorus oxy structure are mono(2-acroloxyethyl)phosphate, di(2-acroyloxyethyl)phosphate, mono(2-methacroyloxyethyl)phosphate, di(2-methacroyloxy ethyl)phosphate.

The component of olefin monomer to be copolymerized with the unsaturated compound containing phosphorus oxy structure includes α-olefins such as ethylene, propylene, 1-butene and the like. Ethylene is specifically preferable among them.

The component of olefin polymer as the backbone polymer in graft polymerizing the unsaturated compound containing phosphorus oxy structure includes the olefin resin (Component A), the copolymer resin containing the non-conjugated dienes (Component B), the olefin elastomer component (Component D-2) described above and the like; among them, there are preferably used polyethylene resin, polypropylene resin and ethylene elastomer.

In producing the modified olefin polymer containing a phosphorus oxy structure, the monomer component copolymerizable with the unsaturated compound containing phosphorus oxy structure includes those illustrated for the Component C2. By using them, the resulting olefin polymer may be used in tri-component or multi-component modified polyolefins.

Polymers containing a hydroxyl group which can be modified under the action of oxychlorophosphor, include diene polymers having a hydroxyl group, or the hydrogenation product thereof (Component C1), copolymers of α-olefins and the unsaturated compound containing a hydroxyl group, graft polymers of the unsaturated compound containing a hydroxyl group. Specific examples will now be illustrated below.

i. The diene polymers having a hydroxyl group, or the hydrogenation product thereof (Component C1)

ii. Copolymer of α-olefins and the unsaturated compound containing a hydroxyl group In structural standpoint terms, such a copolymer generally represents those having a structure where an unsaturated compound containing a hydroxyl group is copolymerized with an α-olefin regularly or irregularly in branched or linear carbon chains.

Specifically, such polymers have a content of the hydroxyl group-containing unsaturated compound in a range of 0.1 to 50% by weight, preferably in a range of 0.5 to 40% by weight, with a range of 1 to 30% by weight being specifically preferable, and has a number average molecular weight in a range of 1,000 to 500,000, preferably in a range of 1,500 to 300,000, with a range of 2,000 to 100,000 being specifically preferable in being liquid, semi-solid or solid at normal temperatures.

The copolymer of α-olefin with the unsaturated compound containing a hydroxyl group can be produced by well-known methods, for example, high-pressure radical polymerization, slurry polymerization and the like, using α-olefin and the unsaturated compound containing a hydroxyl group as the raw materials.

In the case of production by high-pressure radical polymerization, for example, ethylene, an unsaturated compound containing a hydroxyl group and a radical polymerization initiator are continuously fed, at a ratio of ethylene to the unsaturated compound containing hydroxyl group of 1:0.0001 to 1:0.1 under conditions to achieve a conversion rate of 3 to 20%, into a reaction zone maintained at a pressure of 1,000 to 3,000 atm and a temperature of 90 to 300 to produce an ethylene copolymer, thereafter taking out continuously the copolymer.

In the case of production by slurry polymerization, propylene and an unsaturated compound containing a hydroxyl group are made into a complex with an organic aluminum compound and the like, and the resulting product is polymerized in for example heptane solvent, by using known Ziegler catalysts, at a pressure of normal to 20 atm and a temperature of 30° to 150° C.

Such hydroxyl group-containing unsaturated compounds include those illustrated for the Component C2, including for example 2-hydroxyethyl methacrylate and 2-hydroxyethyl acrylate.

Among them, methacrylates and acrylates, and unsaturated alcohols are preferable; with 2-hydroxyethyl methacrylate, 2-hydroxyethyl acrylate, 10-undecene-1-ol being specifically preferable.

The other copolymer component α-olefin is the one having 2 to 12 carbon atoms, specifically including those illustrated for the Component C2 described above, such as ethylene and propylene. Preferable examples among them are ethylene, propylene, 1-butene, 3-methyl-1-butene, 4-methyl-1-pentene, styrene and the like, and specifically preferable examples are ethylene and propylene. These α-olefins satisfactorily may be used in combinations of two or more.

Other than the α-olefin and the unsaturated compound component containing a hydroxyl group, a third copolymerizable monomer includes those illustrated for the Component C2, such as methyl acrylate and ethyl acrylate.

These graft copolymers each may be used alone or in combinations of two or more.

iii. Graft polymer of the unsaturated compound containing a hydroxyl group.

From a structural standpoint, such graft copolymer generally represents those having the structure where an unsaturated compound containing a hydroxyl group is graft polymerized regularly or irregularly in branched or linear carbon chains.

Such polymer is a liquid, semi-solid or solid state at normal temperatures.

The graft polymer of the unsaturated compound containing a hydroxyl group can be produced by well-known methods, for example, kneading-mixing polymerization, solution polymerization and the like, using the following raw materials; the Component A olefin resin, the Component B copolymer resin containing non-conjugated dienes, and the Component D elastomer, as the backbone polymers; and the unsaturated compound containing a hydroxyl group as the graft component. In the case of production by kneading-mixing graft polymerization, the graft polymer can be produced by melting and kneading the backbone polymers and an unsaturated compound containing a hydroxyl group along with an organic peroxide as the reaction initiator, in an extruder set at a temperature of 80° to 250° C.

In the case of production by solution graft polymerization, a copolymer containing non-conjugated dienes, an unsaturated compound containing a hydroxyl group, and an organic peroxide as a reaction initiator are dissolved in for example xylene for reaction in an autoclave set at a temperature of 80° to 150° C., to produce the graft polymer.

The unsaturated compound containing a hydroxyl group as the graft component to be used herein includes those illustrated for the Component C2, for example, 2-hydroxyethyl methacrylate and 2-hydroxyethyl acrylate.

Among them, methacrylates and acrylates are preferable, and specifically preferable are 2-hydroxyethyl methacrylate, 2-hydroxyethyl acrylate and the like.

The other graft polymerization component backbone polymer includes the Component A olefin resin, the Component B copolymer resin containing non-conjugated dienes and the Component D elastomer described above, and specifically preferable among them are those illustrated for the Component C2 described above, such as ethylene resin and propylene resin.

Other than the unsaturated compound component containing a hydroxyl group, a second graft polymerizable monomer includes those illustrated for the Component C2, such as methyl acrylate and ethyl acrylate.

These graft copolymers each may be used alone or in combinations of two or more.

iv. Hydrolyzed product of polymer containing vinyl esters

The term polymer containing vinyl esters means a homopolymers of vinyl esters, or a copolymer thereof with other polymerizable monomers, and graft polymers thereof onto other backbone polymers.

Specifically, the polymer has a vinyl ester compound content in a range of 0.1 to 100% by weight, preferably in a range of 0.05 to 70% by weight, with a range of 0.1 to 30% by weight being specifically preferable and has a number average molecular weight in a range of 1,000 to 500,000, preferably in a range of 1,500 to 30,000, with 2,000 to 100,000 being specifically preferable, being liquid, semi-solid or solid at normal temperatures.

Such polymer containing vinyl esters can be produced by known methods, for example by high-pressure radical polymerization, solution polymerization, emulsion polymerization, solution graft polymerization, kneading-mixing polymerization and the like.

In the case of production by high-pressure radical polymerization, a vinyl ester compound, ethylene and a radical-polymerization initiator are continuously fed into a reaction zone maintained at a pressure of 1,000 to 3,000 atm and a temperature of 90° to 300° C. under conditions for achieving a conversion rate of 3 to 20%, to produce a copolymer, thereafter continuously taking out the copolymer from the reaction zone.

The vinyl ester compound to be used herein includes vinyl formate, vinyl acetate, vinyl acrylate, vinyl crotonate, vinyl caprylate, vinyl laurate, vinyl chloroacetate, vinyl oleate, vinyl stearate and the like; among them, vinyl acetate is preferable.

If the polymer is a copolymer with other polymerizable monomers, an $\alpha$-olefin having 2 to 12 carbon atoms is preferable for the copolymerizable monomer.

Specifically, there are those illustrated for the Component C2 described above, such as ethylene and propylene. Preferable examples among them are ethylene, propylene, 1-butene, 3-methyl-1-butene, 4-methyl-1-pentene, styrene and the like, and specifically preferable examples among them are ethylene and propylene. These $\alpha$-olefins may be used satisfactorily in combinations of two or more.

If the polymer is a graft polymer, the backbone polymer includes the Component A olefin resin, the Component B copolymer resin containing non-conjugated dienes, and the Component D elastomer; among them, preferable examples include those illustrated for the Component C2, such as ethylene resin and propylene resin.

Besides such a monomer component, another copolymerizable monomer includes those illustrated for the Component C2, such as methyl acrylate and ethyl acrylate, even if the polymer is a copolymer or a graft polymer.

These (co)polymers and graft (co)polymers may be used alone or in combinations of two or more.

The polymer containing vinyl esters can be hydrolyzed into the hydrolyzed product thereof.

The method for hydrolyzing the polymer containing vinyl esters includes a method comprising adding a catalyst such as an alkali or acid, along with alcohol.

The degree of hydrolysis of the polymer containing vinyl esters is 100 to 1%, preferably 100 to 10%, more preferably 100 to 30%, and those entirely or partially hydrolyzed may be used satisfactorily.

The hydrolyzed product of the polymer containing vinyl esters is preferably a hydrolyzed product of the copolymer of vinyl ester compound with an $\alpha$-olefin, and specifically preferable is the hydrolyzed product of the copolymer of vinyl acetate with ethylene.

Among the polymers having a hydroxyl group, preferable are diene polymers having a hydroxyl group or the hydrogenation product thereof, copolymers of $\alpha$-olefins and an unsaturated compound containing a hydroxyl group, and a graft polymer of an unsaturated compound containing a hydroxyl group; specifically preferable are diene polymers having a hydroxyl group or the hydrogenation product thereof, copolymer of ethylene with an unsaturated compound containing hydroxyl group, and a graft polymer of an unsaturated compound containing a hydroxyl group onto a copolymer resin containing non-conjugated dienes.

These phosphorus oxyacid-modified polyolefins may each be used alone or in a mixture in combinations of two or more.

Among the phosphorus oxyacid compounds described hereinabove, the high-molecular compound in item 2 is more preferably used than the low-molecular compound in item 1. It is needless to say that, among the individual components constituting the resin composition of the present invention, i.e. A, B, C, D, E, and F, the preferable combinations of the components, described above, are the most appropriate.

Component G: additional component

In addition to the essential components, A, B and C and the optional components D, E and F which are blended if necessary, the following additional components may be contained in the resin composition of the present invention, within a range which does not distinctively decrease the advantages of the present invention.

For the additional components, there are illustrated additives such as plasticizers such as paraffin oil and fluidity improving agents, antioxidants, neutralizers, light stabilizers, UV absorbing agents, chemical destaticizers, lubricants, dispersion agents, molecular-weight adjusting agents, crosslinking agents, fire retardants and softening agents including liquid rubber components such as olefin liquid rubber, styrene liquid rubber and the like.

2. Quantitative ratio

The compounding ratio in weight of each of the aforementioned individual components constituting the resin composition of the present invention, i.e. Components B to F, is represented by a ratio of each of the components by weight to 100 parts by weight of the Component A olefin resin.

The ratio of the Component B copolymer resin containing non-conjugated dienes is 0.1 to 900 parts, preferably 0.5 to 600 parts, with 1 to 300 being specifically preferable.

Generally, the ratio of the Component C polymer is 0.01 to 500 parts, preferably 0.05 to 350 parts, with 0.1 to 300 parts being specifically preferable. The Component C may be used generally in an excessive amount when the Component D elastomer and/or the Component E filler are used. In case the diene polymer containing hydroxyl group or the hydrogenation product thereof, i.e. C1, is used, the ratio is 0.01 to 200 parts, preferably 0.05 to 125 parts, with 0.1 to 60 parts being specifically preferable, since a greater excess of C1 may cause delamination or bleeding which will not give good results in adhesion of paints, adhesives, printing inks and the like; the ratio, if the Component D and/or E is contained in the composition, is 0.01 to 450 parts, preferably 0.05 to 230 parts, with 0.1 to 120 parts being specifically preferable.

The ratio of the Component D elastomer is 1 to 900 parts, preferably 5 to 300 parts with 10 to 200 parts being specifically preferable.

The ratio of the Component E filler is 0.1 to 300 parts preferably 0.5 to 250 parts with 1 to 200 parts being specifically preferable.

The ratio of the Component F compounds is 0.01 to 450 parts, preferably 0.05 to 250 parts, with 0.1 to 120 parts being specifically preferable.

If the Component B copolymer resin containing non-conjugated dienes is less than the range, the adhesive property for paints, adhesives and printing inks does not show satisfactory reproducibility, or the strength thereof is weak. If the range is exceeded, on the other hand, the cost of the composition of this invention is raised because the consumption of costly copolymer resin is increased. Nevertheless, no effect corresponding in proportion to a large excess of copolymer resin can be observed.

If the amount of the Component C polymers is less than the range, the adhesive property for paints, adhesives and printing inks does not show satisfactory reproducibility, or the strength thereof is weak. If the range is exceeded, alternatively, the cost of the composition is elevated because the consumption of the costly component C polymer increases. Furthermore, the adhesive strength of paints, adhesives and printing inks is lowered due to the delamination or bleeding out of the polymer.

Preferably, the blending of the Component D elastomer and/or the Component E filler not only enables the adjustment of rigidity and impact strength, but also helps achieve stronger adhesive properties. However, if the Component D and the Component E independently exceed the ranges described above, the molding property of the resin composition is deteriorated.

If the amount of the Component F compounds is less than the range, the adhesive strength is extremely lowered, depending on the types of paints, adhesives and printing inks to be coated. If the range is exceeded, alternatively, the cost of the composition is elevated because the consumption of the costly Component F compounds increase. Nevertheless, there cannot be observed any effect corresponding in proportion to the amount of the compound, and the adhesive strength of paints, adhesives and printing inks is lowered, because of the delamination and bleeding of the compounds, etc.

3. Compounding

By mixing together the individual components described above, the resin composition of the present invention can be produced.

There is no limitation on the mixing order of the individual components, so any method may be employed, for example, methods such that the individual components described above are simultaneously mixed together, or that two components among them are preliminarily mixed together followed by mixing the remaining components.

Any conventionally known kneader may be employed for such mixing, such as a Brabender Plastograph, single-screw or twin-screw extruder, high-power screw kneader, Banburry mixer, kneader, roll, and the like.

The resin composition of the present invention described above can be molded into resin moldings according to various molding methods.

The moldings prepared from the resin composition of the present invention may be subjected directly to the application of paints, adhesives and printing inks, without any vapor washing with halogen organic solvents with their attendant concerns over environmental damage, or without surface modification treatment such as primer application or plasma treatment. Thus, the resin composition has characteristics that allow favorable adhesive strength for paints adhesives, printability and the like.

Not only remarkable adhesive strength can be achieved, but also they can be applied to a wide variety of paints, by relatively simple surface treatment of the surface of the moldings prepared from the resin composition with a washing solution without containing halogen organic solvents or with heating.

In order to specifically explain the characteristic properties of the resin composition of the present invention, the following detailed description is concerned with the moldings prepared from the resin composition of the present invention, the surface treatment process and coating method therefor.

[II] Moldings

In order to produce moldings using the resin composition of the present invention, any molding method may be employed, including injection molding, press molding, extrusion molding (sheet molding, blow molding and film molding) and the like.

The present resin composition is very effective for injection-molded moldings in complex forms.

[III] Surface Treatment of Moldings

The moldings prepared from the resin composition of the present invention may be subjected directly to the application of paints. However, a wide variety of paints may be applied more strongly to the moldings, by effecting relatively simple surface treatment.

1. Surface treatment with washing solution without containing halogen organic solvents By the term washing solution without containing halogen organic solvent is meant conventional washing solutions, except the halogen organic solvents such as various, fluorocarbons, 1,1,1-trichloroethane, perchloroethylene, trichlene and the like.

Examples of such washing solution are solvent-type washing solutions, emulsion-type washing solutions, aqueous washing solutions and the like.

Solvent-type washing solutions include aliphatic hydrocarbons such as kerosene and d-limonene, aromatic hydrocarbons such as toluene and xylene, and alcohol such as methanol, ethanol, isopropyl alcohol and the like.

Emulsion-type washing solutions include solvents such as kerosene, d-limonene, silicon, toluene and the like, being in emulsion or dispersion in water, with the aid of surfactants.

Aqueous washing solutions include alkali components such as sodium hydroxide, potassium hydroxide, sodium silicate and sodium carbonate, alkaline washing solution in combination with surfactants, acid washing solution in combination with acid components such as phosphoric acid and surfactants, neutral washing solutions using non-ionic surfactants and the like, water such as pure water and hot water.

Among them, aqueous washing solutions and emulsion-type solutions are preferable, and aqueous washing solutions are specifically preferable.

The washing method using these washing solutions represents the surface treatment method herein described, and there may be selected any washing method including dip washing, shower washing; power wash, sonication dip washing, wiping method and the like. Among them, dip washing, shower washing and power wash are preferable.

The temperature of the washing solution may be in a range of room temperature to 150° C., preferably in a range of 30° to 120° C., with a range of 40° to 100° C. being specifically preferable.

The time period for the process is in a range of 5 seconds to 60 minutes, preferably in a range of 15 seconds to 30 minutes, with a range of 30 seconds to 20 minutes being specifically preferable.

The surface treatment with such washing solutions is generally intended to remove hand dirt or machine oils which are unavoidably adhered to the surface of moldings during molding to coating process of the resin composition. However, the moldings prepared from the resin composition of the present invention can acquire stronger adhesive properties for a wider variety of paints, only through the surface treatment with such washing solutions, without requiring surface modification such as primer coating and plasma treatment.

2. Surface treatment with heating

The term surface treatment with heating means a process comprising placing moldings in heated gas. In the process, gas may flow or stand still; moldings also may move or stand still in the heated gas.

The gas to be used includes those which do not cause enrivonmental pollution, including, for example, inactive gases such as nitrogen and argon, air and carbon dioxide. Among them, air and nitrogen are preferable.

The gas is heated to a temperature in a range of 40° to 200° C., preferably 50° to 160° C., with a range of 60° to 140° C. being specifically preferable.

The time period for the process of placing moldings in heated gas is in a range of 5 seconds to 120 minutes, preferably in a range of 30 seconds to 90 minutes, with a range of 1 to 60 minutes being specifically preferable.

The apparatus for the procedure includes ovens, dryers, super dryers, electric furnaces, and the like.

The moldings prepared from the resin composition of the present invention can acquire stronger adhesive properties for a wider variety of paints only through the surface treatment with such heating, without requiring surface modification such as primer coating and plasma treatment.

[IV] Coating

In coating the moldings prepared from the resin composition of the present invention, processes for surface modification such as primer coating and plasma treatment can be omitted from conventional coating process. In other words, paints may be applied directly to the moldings of the resin composition described above, or may be applied thereto after the surface treatment with a washing solution without containing halogen organic solvents or with heating.

Any coating modes of paints may be employed, including spray coating, brush coating, roller coating and the like.

The paints to be used include organic solvent paints and aqueous paints such as water-soluble resin paints, water-dispersive resin paints, aqueous emulsion paints and the like, which have been employed generally in a wide variety of fields. Specifically, a paint containing a resin component or crosslinking component which comprises acrylic, epoxy, polyester, alkyd, urethane and melamine components may be illustrated. Among them, preference is given to acrylic, epoxy, urethane and melamine paints; with specific preference being given to acrylic, urethane and melamine paints.

[V] Examples of use

As has been described above, the moldings prepared from the resin composition of the present invention can be used for automobile exterior trim such as bumpers, mud guards, side braids, wheel caps, spoilers and the like; automobile interior tri such as instrument panels, levers, knobs, inner linings and the like; electric appliances such as pots, electric vacuum cleaners, washing machines, refrigerators, lighting appliances, audio appliances and the like; packaging materials such as packaging film, synthetic paper, laminate film and the like; various industrial parts such as base materials for printing and the like; and various daily sundries such as color boxes, container cases and the like.

EXAMPLES

Examples and Comparative Examples are shown below in order to explain the present invention in more detail. The term "gpart" means part by weight, unless otherwise stated. The components of the compound used for the preparation of the resin composition are as follows;

Olefin resin: Component A
Block PP (1)
Propylene/ethylene block copolymer, having an ethylene content of 4% by weight, a flexural elasticity modulus measured according to JIS-K7203 of 14,000 kg/cm$^2$, and an MFR measured according to ASTM-D1238 of 60 g/10 min.

Block PP (2)
Propylene/ethylene block copolymer, having an ethylene content of 13% by weight, a flexural elasticity modulus measured according to JIS-K7203, of 6,000 kg/cm$^2$, an MFR measured according to ASTM-D1238 of 30 g/10 min.

Random PP
Propylene/ethylene random copolymer, having an ethylene content of 3.4% by weight, a flexural elasticity modulus measured according to JIS-K7203, of 10,500 kg/cm$^2$, and an MFR measured according to ASTM-D1238 of 15 g/10 min.

HOMO PP
Propylene homopolymer, having a flexural elasticity modulus measured according to JIS-K7203 of 13,000 kg/cm$^2$, and an MFR measured according to ASTM-D1238 of 25 g/10 min.

HDPE
Low-pressure polyethylene (high-density polyethylene), having a flexural elasticity modulus measured according to ASTM-D747 of 10,500 kg/cm², and an measured according to JIS-K6760 of 20 g/10 min.

Copolymer resin containing non-conjugated dienes:
Component B Copolymer 1

Propylene/7-methyl-1,6-octadiene random copolymer, having a 7-methyl-1,6-octadiene content of 7.3% by weight, a flexural elasticity modulus of 6,250 kg/cm², and an MFR of 3.5 g/10 min.

Copolymer 2

Propylene/4-methyl-1,4-hexadiene/5-methyl-1,4-hexadiene random copolymer, having a 4-methyl-1,4-hexadiene content of 13.6% by weight, a 5-methyl-1,4-hexadiene of 3.4% by weight, a flexural elasticity modulus of 9,000 kg/cm², and an MFR of 17.5 g/10 min.

Copolymer 3

Propylene/ethylene/7-methyl-1,6-octadiene random copolymer, having a 7-methyl-1,6-octadiene content of 6.8% by weight and an ethylene content of 1.2% by weight, a flexural elasticity modulus of 4,700 kg/cm², and an MFR of 2.8 g/10 min.

Copolymer 4

Propylene/(ethylene-4-methyl-1,4-hexadiene/5-methyl-1,4-hexadiene) block copolymer, having a 4-methyl-1,4-hexadiene content of 5.3% by weight, a 5-methyl-1,4-hexadiene content of 1.3% by weight, an ethylene content of 1.6% by weight, a flexural elasticity modulus of 6,400 kg/cm², and an MFR of 1.5 g/10 min.

Diene polymer having a hydroxyl group or hydrogenated product thereof: Component C1

Synthesis of diene polymer having a hydroxyl group

In a 500-ml autoclave were placed 100 g of 1,3-butadiene, 70 g of isopropyl alcohol, and 10 g of aqueous 60% hydrogen peroxide, followed by polymerization in an argon atmosphere at 90° C. for 5 hours. After the completion of the reaction, unreacted monomers were removed followed by drying of the resulting diene polymer.

The polymer obtained had a molecular weight of about 2,900 and a hydroxyl value of about 88 KOH mg/g.

Synthesis of the hydrogenation product

In a 200-ml autoclave were charged 50 g of the resulting diene polymer, 50 g of cyclohexane, and 5 g of a ruthenium catalyst immobilizing 5% by weight on carbon. After substitution of the inside of the autoclave with argon gas, hydrogen gas was introduced therein up to a level of 50 kg/cm². The temperature of the whole system was raised to 100° C. and reacted for 10 hours while introducing hydrogen gas so as to maintain the total pressure of the system at 50 kg/cm². After completion of the reaction, the hydrogen gas was removed. Subsequently, the resulting hydrogenation product was deposited in methanol after the removal of the catalyst through filtration, followed by filtration and drying to obtain the objective substance. The resulting hydrogenation product of the diene polymer had an iodine value of 1.5 g/100 g, and a hydroxyl value of 87.8 KOH mg/g.

Diene polymer:

Diene polymer containing a hydroxyl group as obtained hereinabove

Hydrogenation product of diene polymer (1):

Hydrogenation product of the diene polymer containing a hydroxyl group as obtained hereinabove.

Hydrogenation product of diene polymer (2):

Hydrogenation product of the diene polymer containing a hydroxyl group, synthesized by the procedure mentioned above and having an iodine value of 0.5 g/100 g, and a hydroxyl value of 46.9 KOH mg/g.

Polymer containing a hydroxyl group: Component C2

EHM (1):

Ethylene/2-hydroxyethyl methacrylate/methyl acrylate terpolymer obtained by high-pressure radical polymerization, having a 2-hydroxyethyl methacrylate content of 10% by weight, a methyl acrylate content of 10% by weight, and an MFR of 100 g/10 minutes.

EHM (2):

Ethylene/2-hydroxyethyl methacrylate/methyl acrylate terpolymer obtained by high-pressure radical polymerization, having a 2-hydroxyethyl methacrylate content of 10% by weight, a methyl acrylate content of 10% by weight, and an MFR of 13 g/10 minutes.

EHM (3):

Ethylene/2-hydroxyethyl methacrylate copolymer obtained by high-pressure radical polymerization, having a 2-hydroxyethyl methacrylate content of 10% by weight and an MFR of 7 g/10 minutes.

HMEPM:

2-Hydroxyethyl methacrylate graft/propylene/ethylene/7-methyl-1,6-octadiene copolymer resin:

Method of production

In a 3-liter autoclave were charged 50 g of propylene/ethylene/7-methyl-1,6-octadiene copolymer (copolymer (3) described above), 40 g of 2-hydroxymethyl methacrylate and 1,000 ml of chlorobenzene, followed by heating to 130° C. under agitation for dissolution. To the solution was added dropwise 1.5 g of benzoyl peroxide dissolved in 200 ml of chlorobenzene over 2 hours, and this was reacted at 130° C. for 3 hours. After completion of the reaction, the product was deposited in acetone, followed by filtration and drying to obtain the objective substance. The resulting polymer had a content of 2 hydroxyethyl methacrylate of 1.7% by weight.

PUD:

Propylene/10-undecene-1-ol copolymer produced by a process described below:

Method for production

After charging 100 ml of heptane in a glass flask having a capacity of 500 ml, 6.8 g of 10-undecene-1-ol and 34 ml of 20 wt %-heptane solution of diethyl aluminum chloride were added and elevated to 70° C. and stirred for one hour. Heptane was added to the resulting solution so as to form 250 ml of solution. 14.4 ml of solution of diethyl aluminum chloride in heptane preliminarily prepared and 0.7 g of titanium trichloride supplied by Marubeni-Solvey were charged into a stainless steel autoclave having a capacity of 1 liter with a stirrer and a temperature controller, 110 ml of hydrogen was fed and then propylene was added so as to make 0.5 kg/cm²G of propylene pressure, and polymerization was carried out at a temperature of 65° C. for two hours.

After termination of the reaction, 50 ml of butanol and 800 ml of methanol were added to the polymerizing solution and a resin was obtained by filtration. The resulting resin was charged into a glass flask having a capacity of 500 ml with a stirrer, 280 ml of isopropanol and 20 ml of 36%-HCl were added and stirred at 55° C. for 2 hours. The resulting product was removed by filtration, Washed by isopropanol and dried under vacuum to obtain 95.1 g of copolymer. 3340 cm$^{-1}$ of absorption depending on a hydroxyl group was found according to a measuring method of infrared spectroscopic analysis.

The resin had a MFR of 1.7 g/10 min. and a content of 2.97 mol % 10-undecene according to $^1$H-NMR.

Polymer containing carboxyl group (including an acid anhydride group): Component C3

EAA (1):
Ethylene/acrylic acid copolymer obtained by high-pressure radical polymerization, having an acrylic acid content of 13% by weight, and an MFR of 7 g/10 minutes.

EAA (2)
Ethylene/acrylic acid copolymer obtained by high-pressure radical polymerization, having an acrylic acid content of 15% by weight, and a mean molecular weight of 3,000.

MEPR:
Maleic anhydride graft/ethylene/propylene copolymer rubber obtained by kneading-mixing graft polymerization, having a maleic anhydride content of 2% by weight, and an MFR of 0.1 g/10 minutes.

MPEM:
Maleic anhydride graft/propylene/ethylene/7-methyl-1,6-octadiene copolymer resin, produced as follows.

Method for production 500 g of maleic anhydride was dry blended with 5 kg of propylene/ethylene/7-methyl-1,6-octadiene copolymer resin (Copolymer 3 described above), followed by kneading and mixing in a twin-screw extruder set at a temperature of 230° C., a rotation of 300 rpm, and a discharge of 10 kg/h, without using a reaction initiator. The resulting product was dissolved in xylene, deposited in methanol, followed by filtration and drying to yield the objective substance. The resulting graft polymer had a maleic anhydride content of 4.1% by weight.

MDPH:
Hydrogenation product of diene polymer having carboxyl group, produced as follows.

Method for Production

In a 500-ml autoclave were placed 100 g of 1,3-butadiene, 70 g of isopropyl alcohol, and 5 g of aqueous 60% hydrogen peroxide, followed by polymerization in an argon atmosphere at 90° C. for 5 hours. After completion of the reaction, unreacted monomers were removed, followed by drying of the resulting diene polymer.

In a 200-ml autoclave were charged 50 g of the resulting diene polymer, 50 g of cyclohexane and 5 g of a ruthenium catalyst immobilizing 5% by weight on carbon, and reacted for 10 hours while introducing hydrogen gas so as to maintain the pressure of hydrogen gas to a level of 50 kg/cm$^2$. After the completion of the reaction, hydrogen gas was removed, followed by filtration to remove the catalyst. The resulting hydrogenation product was deposited in methanol, followed by filtration. The iodine value of the hydrogenation product of the resulting diene polymer was 0.5 g/10 minutes, and the hydroxyl value thereof was 46.9 KOH mg/g.

In a 1,000-ml autoclave were charged 100 g of the hydrogenation product of the diene polymer having a hydroxyl group as produced by the method described above, 300 ml of dry toluene, and 12 g of maleic anhydride, for reaction at 90° C. for 6 hours in nitrogen atmosphere. After the completion of the reaction, the resulting product was deposited in methanol, followed by drying to obtain the objective substance. The resulting polymer had a maleic anhydride content of 5.4% by weight.

Polymer containing amino group/or imino group: Component C4

AMAEPM:
2-Aminoethyl methacrylate graft/propylene/ethylene/7-methyl-1,6-octadiene copolymer resin was produced as follows 500 g of 2-aminoethyl methacrylate and 10.8 g of t-butylcumyl peroxide were dry blended with 5 kg of propylene/ethylene/7-methyl-1,6-octadiene copolymer (copolymer (3); Component B), and melted and kneaded in a twin-screw extruder set at a temperature of a rotation of 250 rpm, and a discharge of 10 kg/h. The resulting product was dissolved in xylene, deposited in methanol, filtered and dried to obtain the objective substance.

The graft polymer had a 2-aminoethyl methacrylate content of 2.1% by weight and an MFR of 2.5 g/10 minutes.

ADPH:
Hydrogenation product of diene polymer having a cyano group, produced as follows.

Method for production

In a 500-ml autoclave were placed 100 g of 1,3-butadiene, 90 g of isopropyl alcohol, and 14 g of azoisobutyronitrile, followed by polymerization in argon atmosphere at 100° C. for 6 hours. After the completion of the reaction, unreacted monomers were removed, followed by drying the resulting diene polymer having a cyano group.

In a 200-ml autoclave were charged 50 g of the resulting diene polymer, 50 g of dioxane and 5 g of Raney cobalt. After the substitution of the inside of the autoclave with argon gas, the mixture was reacted at 100° C. for 10 hours while introducing hydrogen gas so as to maintain the pressure of hydrogen gas to a level of 50 kg/cm$^2$. After the completion of the reaction, hydrogen gas was removed, followed by filtration to remove the catalyst. The resulting hydrogenation product was deposited in methanol, followed by filtration.

The hydrogenation product of the resulting diene polymer had an iodine value of 0.4 g/10 minutes, a concentration of amino group of 0.46 meq/g, an amino-group number of 2.8, and a number average molecular weight of 6,100.

APEH:
Hydrogenation product of ethylene polymer having cyano group, produced as follows.

Method for production

Ethylene was polymerized by high-pressure polymerization using as the initiator azoisobutyronitrile, under the condition such that the concentration of the initiator was 7,000 ppm at a temperature of 190° C. and a pressure of 2,000 atom. Thus, there was produced polyethylene having a cyano group. The number average molecular weight of the polyethylene was 6,000.

In a 200-ml autoclave were charged 50 g of the resulting polyethylene having a cyano group, 50 g of dioxane and 5 g of Raney-cobalt, and after the substitution of the inside of the autoclave with argon gas, the mixture was reacted at 100° C. for 10 hours while introducing hydrogen gas so as to maintain the pressure of hydrogen gas to a level of 50 kg/cm$^2$. After the completion of the reaction, hydrogen gas was removed, followed by filtration to remove the catalyst. Then, the resulting hydrogenation product was deposited in methanol, followed by filtration.

The resulting polymer had an amino group concentration of 0.2 meq/g, an amino-group number of 1.2, and a number average molecular weight of 6,000.

Polymer having epoxy group: Component C5

EGMA (1):

Ethylene/glycidyl methacrylate copolymer of a glycidyl methacrylate content of 7% by weight and an MFR of 10 g/10 minutes, produced by high-pressure radical polymerization.

EGMA (2):

Ethylene/glycidyl methacrylate/ethyl acrylate terpolymer having a glycidyl methacrylate content of 15% by weight, an ethyl acrylate content of 6% by weight and an MFR of 3 g/10 minutes, produced by high-pressure radical polymerization.

GMEPM:

Glycidyl methacrylate graft/propylene/ethylene/7-methyl-1,6-octadiene copolymer resin was produced as follows.

Method of Production

In a 3-liter autoclave were charged 50 g of propylene/ethylene/7-methyl-1,6-octadiene copolymer (copolymer (3) mentioned above), 40 g of glycidyl methacrylate and 1000 ml of chlorobenzene, and heated to 100° C. under agitation. To the solution was added dropwise 1.5 g of benzoyl peroxide dissolved in 200 ml of chlorobenzene over 2 hours, and reacted at 100° C. for 3 hours. After the completion of the reaction, the resulting product was deposited in methanol, filtered and dried to obtain the objective substance. The resulting polymer had a glycidyl methacrylate content of 3.2% by weight.

Elastomer component: Component D

EPM (1):

Ethylene/propylene copolymer rubber, having a Mooney viscosity $ML_{1+4}$ at 100° C. of 70, and a density of 0.86.

EPM (2):

Ethylene/propylene copolymer rubber, having a Mooney viscosity $ML_{1+4}$ at 100° C. of 24, and a density of 0.86.

EPDM:

Ethylene/propylene/ethylidene norbornene copolymer rubber, having a Mooney viscosity $ML_{1+4}$ at 100° C. of 47, and a density of 0.86.

SEBS:

Hydrogenation product of styrene/butadiene block copolymer rubber, having a number average molecular weight of 70,000 and a density of 0.91.

Filler component: Component E

Talc:

Talc of a specific surface area of 39,000 cm²/g and an average particle size of 1.8 to 2.2 μm.

Potassium titanate whisker:

Potassium titanate whisker ($K_2O \cdot 6TiO_2$) of an average diameter of 0.2 to 0.5 μm and an average aspect ratio of 20 or more.

Mica:

Mica of an average flake size of 90 μm.

Calcium carbonate:

Calcium carbonate of a specific surface area of 33,000 to 39,000 cm²/g and an average particle size of 0.1 to 0.5 μm.

Barium sulfate:

Barium sulfate of an average particle size of 0.5 to 0.8 μm.

Glass fiber:

Glass fiber of an average diameter of 12 to 14 μm and a cutting length of 6 mm.

Organotin compound: Component F1

DBTDL:

Dibutyltin dilaurate

DOTDL:

Dioctyltin dilaurate

Tertiary amine compound: Component F2

EDMA (1):

Ethylene/2-(dimethylamino)ethyl methacrylate copolymer, produced by high-pressure radical polymerization, having a 2-(dimethylamino)ethyl methacrylate content of 30% by weight, and an MFR measured according to JIS-K6760 of 2 g/10 minutes.

EDMA (2):

Graft copolymer obtained by graft polymerizing 2-dimethylamino)ethyl methacrylate and styrene onto the polyethylene was produced as follows:

Method for production

In a 10-liter autoclave containing 4 liters of water were added and suspended 1080 g of a linear low-density polyethylene in pellets having an MFR measured according to JIS-K6760 of 100 g/10 minutes, 270 g of 2-(dimethylamino)ethyl methacrylate, 450 g of styrene, 6.5 g of benzoyl peroxide, and 21 g of calcium phosphate ($Ca_3(PO_4)_2$) as the dispersant.

The suspension was then kept at a temperature of 50° C. for 3 hours, so as to impregnate the polyethylene in pellets with 2-(dimethylamino)ethyl methacrylate, styrene, and benzoyl peroxide.

Subsequently, the temperature was gradually raised up to 94° C. over 8 hours, for effecting reaction.

After the completion of the reaction, the pellets were retrieved and washed in water. The water was removed from the pellets with a centrifuge, followed by drying under reduced pressure at 80° C. for 12 hours.

The polymer had a 2-(dimethylamino)ethyl methacrylate content of 15% by weight, a styrene content of 25% by weight, an MFR of 2 g/10 minutes.

DMAPEM:

Graft polymer obtained by graft polymerization of 2-(dimethylamino)ethyl methacrylate onto the propylene/ethylene/7-methyl-1,6-octadiene random copolymer resin, was produced as follows:

Method for production 500 g of 2-(dimethylamino)ethyl methacrylate, and 7.2 g of t-butylcumyl peroxide were dry blended with 5 kg of propylene/ethylene/7-methyl-1,6-octadiene copolymer (copolymer (3): Component B), and melted and kneaded in a twin-screw extruder set at a temperature of 200° C., a rotation of 250 rpm, and a discharge of 10 kg/h. The resulting product was dissolved in xylene, deposited in methanol, filtered and dried to obtain the objective substance.

The graft polymer had a 2-(dimethylamino)ethyl methacrylate content of 5.2% by weight and an MFR of 2.2 g/10 minutes.

Low-molecular compound (1):

Light stabilizer "Mark LA62" manufactured by Adeca Argus, Co., Ltd., having the structure of the following formula:

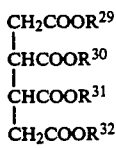

wherein $R^{29}$, $R^{30}$, $R^{31}$, and $R^{32}$ independently represent the following formula:

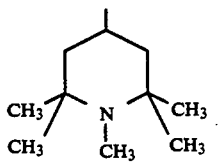

or $-C_{13}H_{27}$; at least one of $R^{29}$, $R^{30}$, $R^{31}$ and $R^{32}$ is N-methyl-2,2,6,6-tetramethyl-4-piperidyl group, while the remaining ones represent a saturated hydrocarbon group with 13 carbon atoms).

Phosphorus oxy compound: Component F3

PAMOE:

A mixture of mono(2-ethylhexyl)phosphate and di(2-ethylhexyl)phosphate (1:1)

EPAMOE (1):

Graft copolymer obtained by graft polymerizing mono(2-methacroyloxyethyl)phosphate, di(2-methacroyloxyethyl)phosphate and styrene onto the polyethylene was produced as follows:

Method for production

In a 10-liter autoclave containing 4 liters of water were added and suspended 1080 g of a linear, low-molecular, low-density polyethylene pellets having a number average molecular weight of 2,500, 360 g of a mixture of mono(2-methacroyloxyethyl)phosphate and di(2-methacroyloxyethyl)phosphate (1:1), 360 g of styrene, 6.5 g of benzoyl peroxide, and 21 g of calcium phosphate ($Ca_3(PO_4)_2$) as the dispersant.

The suspension was then kept at a temperature of 50° C. for 3 hours, so as to impregnate the polyethylene pellets with mono(2-methacroyloxyethyl)phosphate, di(2-methacroyloxyethyl)phosphate, styrene, and benzoyl peroxide.

Subsequently, the temperature was gradually raised up to 94° C. over 8 hours, for effecting reaction.

After completion of the reaction, the pellets were collected and washed in water. The water was removed from the pellets with a centrifuge, followed by drying under reduced pressure at 80° C. for 12 hours to obtain the objective graft polymer.

EPAMOE (2):

Ethylene/mono(2-methacroyloxyethyl)phosphate/di(2-methacroyloxyethyl)phosphate copolymer, produced by high-pressure radical polymerization, having a total content of mono(2-methacroyloxyethyl)phosphate and di(2-methacroyloxyethyl)phosphate of 15% by weight, and an MFR measured according to JIS-K6760 of 12 g/10 minutes.

PAPTE:

Hydrogenation product of phosphate-modified diene polymer, produced as follows.

Method for production

In a 1-liter autoclave were placed 100 g of the hydrogenation product of the diene polymer (2) and 300 g of dry toluene, and kept in nitrogen atmosphere at 40° C. To the resulting mixture was added dropwise a solution of 16.7 g of phosphorus oxychloride dissolved in 50 ml of dry toluene over 20 minutes, followed by agitation for 2 hours.

After cooling down to ambient temperature, a mixed solution of 22 g of pyridine, 10 g of water and 30 g of isopropanol was added to the resulting mixture and stirred for 2 hours. After completion of the reaction, the resulting product was deposited in methanol, filtered and dried to obtain the objective substance. The phosphor atom content was 1.5% by weight.

PANPEOE:

A mixture of mono(nonylphenyloxyethyl)phosphate and di(nonylphenyloxyethyl)phosphate (1:1)

1. Resin composition and preparation of moldings

Pellets of the resin composition were prepared by dry blending the individual components shown in the table, kneading and mixing the resulting mixture at 200° C. with a twin-screw extruder and pelletizing. The pellets were injection molded into articles for measuring various properties.

The molding conditions shown hereinbelow were for obtaining such test pieces from the resin compositions prepared in each of the Examples.

Molding conditions

Molding machine:

Injection molding machine M40A-SJ, manufactured by Meiki Seisakusho.

Molding temperature

230° C.

Molded article

Plate (65 mm×65 mm×2 mm)

Test pieces for measuring three-point flexural elasticity modulus (90 mm×10 mm×4 mm)

Flexural elasticity modulus:

Measured according to JIS K-7203.

MFR:

Measured according to ASTM D-1238

2. Coating of resin moldings and evaluation thereof

In order to evaluate the coating property of the resin moldings obtained above, surface treatment was effected individually on the moldings which were then subjected to coating with paint by air gun. After the completion of baking and drying, the coated moldings were left to stand at room temperature for 48 hours, and were then subjected to the peeling strength and/or cross cut tests. The surface treatment and coating processes and the items for the evaluation of paint adhesion are shown hereinbelow.

The flexural elasticity modulus and paint adhesive properly of the produced moldings were tested, and the results are shown in the table.

Surface treatment

Non-treatment:

Molded test pieces were directly coated, without any treatment.

Alkali treatment:

Test pieces were dipped in hot water at 60° C. for 30 seconds, followed by dipping in a bath containing an aqueous 5% solution of an alkaline washing solution (CL5513, manufactured by Daiichi Kogyo Seiyakusha), and heated at 60° C., further followed by the dipping again in hot water at 60° C. The surface of the test pieces thus treated was washed in tap water for 30 seconds, followed by washing in pure water for 30 seconds. The water was removed from the surface of the test pieces by an air blower, followed by drying in an oven at 80° C. for 10 minutes.

Acid treatment:

Test pieces were dipped in hot water at 60° C. for 30 seconds, followed by the dipping in a bath containing an aqueous 5% solution of an acid washing solution (ISW332, manufactured by DUBOIS, Co. Ltd.), and heated at 60° C., further followed by dipping in hot water at 60° C. The surfaces of the test pieces thus treated was washed in tap water for 30 seconds, followed by washing in pure water for 30 seconds. The water was removed from the surface of the test pieces by an air blower, followed by drying in an oven at 80° C. for 10 minutes.

Heat treatment

Molded test pieces were treated with heating in an oven at 80° C. for 30 minutes, while flowing nitrogen into the oven.

Coating

Coating was effected, using one-can acrylic paint in organic solvent, one-can urethane paint in organic solvent, two-can urethane paint in organic solvent and one-can acrylic metallic base paint in organic solvent, and two-pack urethane clear paint in organic solvent.

Coating method:

Using air spray guns, individually prepared paints were spray coated to a film thickness of 40 μm for the cross-cut adhesion test or at a film thickness of 100 μm for the peel strength test. In the case of metallic base paint, spray coating was effected in wet-on-wet state, so that metallic base paint might be of a thickness of 15 μm and clear paint might be of a thickness of 25 μm for the cross-cut adhesion test or of 85 μm for the peeling strength test. Subsequently, baking and drying was effected, at/100° C. for 60 minutes for one-can acrylic paint in organic solvent, at 120° C. for 60 minutes for one-can urethane paint, at 80° C. for 60 minutes for two-can urethane paint, at 80° C. for 30 minutes for one-can acrylic metallic base paint and two-pack urethane clear paint.

Evaluation of paint adhesion

Peel strength (g/cm):

After treatment to prevent adhesion of the paint onto the upper half of the test pieces, individual paints were coated at a thickness of 100 μm, followed by baking and drying. The whole surface of the test pieces were covered with cellophane adhesive tape (e.g. 24-mm width manufactured by Nichiban). Subsequently, cuts were drawn to the base in the longitudinal direction at a width of 1 cm. The side with no film adhesion was peeled off by hand, to be applied to a tensile tester. Load was measured and recorded when peeling was done at a rate of 50 mm/minutes at a 180° angle. When the coating film was broken, the term "broken" was entered in the Table.

Cross Cut Test (JIS D0202):

Eleven parallel cut were drawn at intervals of 2 mm in both the longitudinal direction and the lateral direction on the surface of the test piece by a single-edged razor blade to form 100 squares. A cellophane adhesive tape (JIS Z-1522) was sufficiently pressed to the cut surface. The cellophane tape was peeled at a stroke while maintaining an angle of about 30° to the coated surface. The state of the square-cut surface was examined, and the number of squares not peeled but left was recorded.

TABLE 1

| | | | | | Example No. | | | | | | |
|---|---|---|---|---|---|---|---|---|---|---|---|
| | | 1 | 2 | 3 | 4 | 5 | 6 | 7 | 8 | 9 | 10 |
| Composition (component) | | | | | | | | | | | |
| (A) Olefin resin | | | | | | | | | | | |
| block PP(1) | | 100 | 100 | 100 | 100 | 100 | 100 | 100 | 100 | 100 | |
| block PP(2) | | | | | | | | | | | |
| random PP | | | | | | | | | | | |
| homo PP | | | | | | | | | | | |
| HDPE | | | | | | | | | | | |
| (B) Non-conjugated diene copoly. | | | | | | | | | | | |
| copolymer(1) | | 50 | 50 | 50 | 50 | 50 | | | | | |
| copolymer(2) | | | | | | | 50 | | | | |
| copolymer(3) | | | | | | | | | 200 | 50 | 9 |
| copolymer(4) | | | | | | | | 50 | | | |
| (C1) OH-Diene Polymer | | | | | | | | | | | |
| diene polymer | | 5 | | | | | | | | | |
| hydrogenated DP(1) | | | 5 | | | | | | | | |
| hydrogenated DP(2) | | | | 35 | 5 | 2.5 | 5 | 5 | 70 | 5 | 3.6 |
| (D) Elastomer | | | | | | | | | | | |
| EPM(1) | | 100 | 100 | 100 | 100 | 100 | 100 | 100 | 200 | 100 | 73 |
| EPM(2) | | | | | | | | | | | |
| EPDM | | | | | | | | | | | |
| SEBS | | | | | | | | | | | |
| (E) Filler | | | | | | | | | | | |
| talc | | | | | | | | | | | |
| potassium titanate whisker | | | | | | | | | | | |
| barium sulfate | | | | | | | | | | | |
| glass fiber | | | | | | | | | | | |
| mica | | | | | | | | | | | |
| calcium carbonate | | | | | | | | | | | |
| Flexural elasticity modulus (kg/cm$^2$) | | 5300 | 5300 | 3900 | 5500 | 5300 | 6000 | 5000 | 3200 | 4500 | 6600 |
| Coating properties | | | | | | | | | | | |
| urethane paint A(*1) | | | | | | | | | | | |
| (test 1) | cross cut test | | | | | | | | | | |
| | peel strength | | 1190 | 1620 | | 980 | 1220 | | | 1020 | |
| (test 2) | cross cut test | | | | | | | | | | |
| | peel strength | | 1880 | 1680 | | 1300 | 1440 | | | 1500 | |

TABLE 1-continued

| | | | | | | | | | | | |
|---|---|---|---|---|---|---|---|---|---|---|---|
| acrylic paint A(*2) | | | | | | | | | | | |
| (test 2) | cross cut test peel strength | 980 | 1900 | 1200 | 1700 | 1000 | 1500 | 1580 | 980 | 1520 | 780 |
| (test 3) | cross cut test peel strength | 900 | 1320 | 920 | 1200 | 990 | 1040 | 1150 | 920 | 1240 | 700 |
| urethane paint B(*3) | | | | | | | | | | | |
| (test 1) | cross cut test peel strength | 920 | 1520 | 980 | 1000 | 890 | 900 | 880 | 1500 | 980 | |
| (test 4) | cross cut test peel strength | 880 | 1400 | 890 | 1380 | 820 | 880 | 800 | 1320 | 950 | |

| | Example No. | | | | | | | | | |
|---|---|---|---|---|---|---|---|---|---|---|
| | 11 | 12 | 13 | 14 | 15 | 16 | 17 | 18 | 19 | 20 |
| Composition (component) | | | | | | | | | | |
| (A) Olefin resin | | | | | | | | | | |
| block PP(1) | | | | | | 100 | 100 | 100 | 100 | |
| block PP(2) | 100 | 100 | | | | | | | | 100 |
| random PP | | | 100 | | | | | | | |
| homo PP | | | | 100 | | | | | | |
| HDPE | | | | | 100 | | | | | |
| (B) Non-conjugated diene copoly. | | | | | | | | | | |
| copolymer(1) | | | | | | | | | 67 | |
| copolymer(2) | | | | | | | | | | |
| copolymer(3) | 40 | 25 | 50 | 50 | 50 | 50 | 50 | 50 | | 28.6 |
| copolymer(4) | | | | | | | | | | |
| (C1) OH-Diene Polymer | | | | | | | | | | |
| diene polymer | | | | | | | | | | |
| hydrogenated DP(1) | | | | | | | | | | |
| hydrogenated DP(2) | 4 | 2.5 | 5 | 5 | 5 | 5 | 5 | 5 | 6.7 | 2.9 |
| (D) Elastomer | | | | | | | | | | |
| EPM(1) | 60 | | 100 | 100 | 100 | | | | 133 | |
| EPM(2) | | | | | | 100 | | | | |
| EPDM | | | | | | | 100 | | | |
| SEBS | | | | | | | | 100 | | |
| (E) Filler | | | | | | | | | | |
| talc | | | | | | | | | 33 | 14.3 |
| potassium titanate whisker | | | | | | | | | | |
| barium sulfate | | | | | | | | | | |
| glass fiber | | | | | | | | | | |
| mica | | | | | | | | | | |
| calcium carbonate | | | | | | | | | | |
| Flexural elasticity modulus (kg/cm$^2$) | 2800 | 5300 | 2800 | 4000 | 2600 | 5500 | 5400 | 5600 | 5600 | 5700 |
| Coating properties | | | | | | | | | | |
| urethane paint A(*1) | | | | | | | | | | |
| (test 1) cross cut test | | | | | | | | | 100/100 | 100/100 |
| peel strength | 1250 | 890 | — | — | — | 990 | 1100 | 970 | 1280 | 1220 |
| (test 2) cross cut test | | | | | | | | | 100/100 | 100/100 |
| peel strength | 1500 | 1150 | — | — | — | 1200 | 1540 | 1400 | 1400 | 1300 |
| acrylic paint A(*2) | | | | | | | | | | |
| (test 2) cross cut test | | | | | | | | | 100/100 | 100/100 |
| peel strength | 1440 | 1200 | 1800 | 1050 | 1300 | 1250 | 1600 | 1430 | 1540 | 1350 |
| (test 3) cross cut test | | | | | | | | | 100/100 | 100/100 |
| peel strength | 1090 | 1100 | 1740 | 900 | 1240 | 1090 | 1340 | 1100 | 1400 | 1270 |
| urethane paint B(*3) | | | | | | | | | | |
| (test 2) cross cut test | | | | | | | | | 100/100 | 100/100 |
| peel strength | 1200 | 1030 | 1820 | 890 | 1300 | 900 | 1000 | 980 | 2050 | 1080 |
| (test 4) cross cut test | | | | | | | | | 100/100 | 100/100 |
| peel strength | 1210 | 960 | 1700 | 870 | 1310 | 1100 | 1290 | 1150 | 1620 | 1200 |

TABLE 1-continued

|  | 21 | 22 | 23 | 24 | 25 | 26 | 27 |
|---|---|---|---|---|---|---|---|
| Composition (component) | | | | | | | |
| (A) Olefin resin | | | | | | | |
| block PP(1) | 100 | 100 | 100 | 100 | 100 | 100 | 100 |
| block PP(2) | | | | | | | |
| random PP | | | | | | | |
| homo PP | | | | | | | |
| HDPE | | | | | | | |
| (B) Non-conjugated diene copoly. | | | | | | | |
| copolymer(1) | | | | | | | |
| copolymer(2) | | | | | | | |
| copolymer(3) | 200 | 57 | 67 | 67 | 67 | 67 | 67 |
| copolymer(4) | | | | | | | |
| (C1) OH-Diene Polymer | | | | | | | |
| diene polymer | | | | | | | |
| hydrogenated DP(1) | | | | | | | |
| hydrogenated DP(2) | 100 | 5.7 | 6.7 | 6.7 | 6.7 | 6.7 | 6.7 |
| (D) Elastomer | | | | | | | |
| EPM(1) | 200 | 114 | 133 | 133 | 133 | 133 | 133 |
| EPM(2) | | | | | | | |
| EPDM | | | | | | | |
| SEBS | | | | | | | |
| (E) Filler | | | | | | | |
| talc | 200 | 14.3 | | | | | |
| potassium titanate whisker | | | 33 | | | | |
| barium sulfate | | | | 33 | | | |
| glass fiber | | | | | | 33 | |
| mica | | | | | 33 | | |
| calcium carbonate | | | | | | | 33 |
| Flexural elasticity modulus (kg/cm²) | 5000 | 4500 | 7200 | 4700 | 6000 | 7200 | 4600 |
| Coating properties | | | | | | | |
| urethane paint A(*1) | | | | | | | |
| (test 1) cross cut test | — | — | 100/100 | 100/100 | 100/100 | 100/100 | 100/100 |
| peel strength | — | — | 1310 | 1250 | 1510 | 1420 | 1240 |
| (test 2) cross cut test | — | — | 100/100 | 100/100 | 100/100 | 100/100 | 100/100 |
| peel strength | — | — | 1630 | 1600 | 2000 | 1730 | 1770 |
| acrylic paint A(*2) | | | | | | | |
| (test 2) cross cut test | — | — | 100/100 | 100/100 | 100/100 | 100/100 | 100/100 |
| peel strength | 1180 | 1750 | 1730 | 1640 | 1910 | 1460 | 1620 |
| (test 3) cross cut test | — | — | 100/100 | 100/100 | 100/100 | 100/100 | 100/100 |
| peel strength | 1300 | 1420 | 1690 | 1330 | 1600 | 1600 | 1210 |
| urethane paint B(*3) | | | | | | | |
| (test 2) cross cut test | — | — | 100/100 | 100/100 | 100/100 | 100/100 | 100/100 |
| peel strength | 1850 | 1500 | 2200 | 2050 | 2300 | 2350 | 1700 |
| (test 4) cross cut test | — | — | 100/100 | 100/100 | 100/100 | 100/100 | 100/100 |
| peel strength | 1660 | 1090 | 2000 | 1900 | 1750 | 2300 | 1750 |

|  | Comparative ex. No. | | | | | | | | |
|---|---|---|---|---|---|---|---|---|---|
|  | 1 | 2 | 3 | 4 | 5 | 6 | 7 | 8 | 9 |
| Composition (component) | | | | | | | | | |
| (A) Olefin resin | | | | | | | | | |
| block PP(1) | 100 | 100 | 100 | 100 | 100 | 100 | 100 | 100 | 100 |
| block PP(2) | | | | | | | | | |
| random PP | | | | | | | | | |
| homo PP | | | | | | | | | |
| HDPE | | | | | | | | | |
| (B) Non-conjugated | | | | | | | | | |

TABLE 1-continued

| diene copoly. | | | | | | | | | |
|---|---|---|---|---|---|---|---|---|---|
| copolymer(1) | | | | | 50 | 67 | | | |
| copolymer(2) | | | | | | | | | |
| copolymer(3) | | | | | | | | | |
| copolymer(4) | | | | | | | | | |
| (C1) OH-Diene Polymer | | | | | | | | | |
| diene polymer | | | | | | | | | |
| hydrogenated DP(1) | | | | | | | | | |
| hydrogenated DP(2) | | | | | 2 | 3.3 | 4 | | |
| (D) Elastomer | | | | | | | | | |
| EPM(1) | | 67 | | 80 | 100 | 133 | | 67 | 80 |
| EPM(2) | | | | | | | | | |
| EPDM | | | | | | | | | |
| SEBS | | | | | | | | | |
| (E) Filler | | | | | | | | | |
| talc | | | 11 | 20 | | 33 | | | 20 |
| potassium titanate whisker | | | | | | | | | |
| barium sulfate | | | | | | | | | |
| glass fiber | | | | | | | | | |
| mica | | | | | | | | | |
| calcium carbonate | | | | | | | | | |
| Flexural elasticity modulus (kg/cm²) | 15300 | 5900 | 16900 | 6600 | 5500 | 5900 | 13500 | 5600 | 6500 |
| Coating properties | | | | | | | | | |
| urethane paint A(*1) | | | | | | | | | |
| (test 1) cross cut test | | | | | | | | | |
| peel strength | | | | | | | | | |
| (test 2) cross cut test | | | | | | | | | |
| peel strength | | | | | | | | | |
| acrylic paint A(*2) | | | | | | | | | |
| (test 2) cross cut test | — | — | — | — | 0/100 | 0/100 | — | — | — |
| peel strength | 10 | 10 | 40 | 30 | 200 | 350 | 40 | 40 | 80 |
| (test 3) cross cut test | — | — | — | — | 0/100 | 11/100 | — | — | — |
| peel strength | 0 | 40 | 20 | 40 | 220 | 310 | 20 | 30 | 70 |
| urethane paint B(*3) | | | | | | | | | |
| (test 2) cross cut test | — | — | — | — | 4/100 | 28/100 | — | — | — |
| peel strength | 0 | 0 | 10 | 20 | 270 | 270 | 10 | 20 | 20 |
| (test 4) cross cut test | — | — | — | — | 0/100 | 0/100 | — | — | — |
| peel strength | 0 | 20 | 10 | 20 | 170 | 280 | 20 | 20 | 20 |

(*1): one can paint, (*2): one can paint, (*3): two pack paint
(test 1): non-treatment of a surface of molding, (test 2): alkali treatment, (test 3): heating treatment (test 4): acid treatment

TABLE 2

| | | Example No. | | | | | | | | | | | | Comparative ex. No. | |
|---|---|---|---|---|---|---|---|---|---|---|---|---|---|---|---|
| | | 28 | 29 | 30 | 31 | 32 | 33 | 34 | 35 | 36 | 37 | 38 | 39 | 10 | 11 |
| Composition (component) | | | | | | | | | | | | | | | |
| (A) Olefin resin | | | | | | | | | | | | | | | |
| | block PP (1) | 100 | 100 | 100 | 100 | 100 | 100 | 100 | | 100 | 100 | 100 | | 100 | 100 |
| | block PP (2) | | | | | | | | 100 | | | | 100 | | |
| | random PP | | | | | | | | | | | | | | |
| | homo PP | | | | | | | | | | | | | | |
| | HDPE | | | | | | | | | | | | | | |
| (B) Non-conjugated diene copoly. | | | | | | | | | | | | | | | |
| | copolymer (1) | | | | | | | | | | | | | | |
| | copolymer (2) | | | | | | | | | | | | | | |
| | copolymer (3) | 50 | 50 | 50 | 50 | 50 | 50 | 50 | 25 | 67 | 50 | 67 | 28 | 50 | 67 |
| | copolymer (4) | | | | | | | | | | | | | | |
| (C1) OH-Diene polymer | | | | | | | | | | | | | | | |
| | diene polymer | | | | | | | | | | | | | | |
| | hydrogenated DP (1) | | | | | | | | | | | | | | |
| | hydrogenated DP (2) | 5 | 5 | 5 | 5 | 5 | 5 | 5 | 2.5 | 6.7 | 5 | 6.7 | 3 | 5 | 6.7 |
| (C3) COOH-Polymer | | | | | | | | | | | | | | | |

TABLE 2-continued

|  |  | Example No. | | | | | | | | | | | | Comparative ex. No. | |
|---|---|---|---|---|---|---|---|---|---|---|---|---|---|---|---|
|  |  | 28 | 29 | 30 | 31 | 32 | 33 | 34 | 35 | 36 | 37 | 38 | 39 | 10 | 11 |
|  | EAA (1) | 2.5 |  |  |  |  | 40 | 1.3 | 1.3 | 3.3 | 2.5 | 3.3 | 1.5 |  |  |
|  | EAA (2) |  | 2.5 |  |  |  |  |  |  |  |  |  |  |  |  |
|  | MEPR |  |  | 2.5 |  |  |  |  |  |  |  |  |  |  |  |
|  | MDPH |  |  |  | 2.5 |  |  |  |  |  |  |  |  |  |  |
|  | MPEM |  |  |  |  | 2.5 |  |  |  |  |  |  |  |  |  |
| (D) | Elastomer |  |  |  |  |  |  |  |  |  |  |  |  |  |  |
|  | EPM (1) | 100 | 100 | 100 | 100 | 100 | 100 | 100 |  | 133 | 100 | 133 |  | 100 | 133 |
|  | EPM (2) |  |  |  |  |  |  |  |  |  |  |  |  |  |  |
|  | EPDM |  |  |  |  |  |  |  |  |  |  |  |  |  |  |
|  | SEBS |  |  |  |  |  |  |  |  |  |  |  |  |  |  |
| (E) | Filler |  |  |  |  |  |  |  |  |  |  |  |  |  |  |
|  | talc |  |  |  |  |  |  |  |  | 33 |  | 33 | 14 |  | 33 |
|  | potassium titanate whisker |  |  |  |  |  |  |  |  |  |  |  |  |  |  |
|  | mica |  |  |  |  |  |  |  |  |  |  |  |  |  |  |
|  | calcium carbonate |  |  |  |  |  |  |  |  |  |  |  |  |  |  |
|  | barium sulfate |  |  |  |  |  |  |  |  |  |  |  |  |  |  |
|  | glass fiber |  |  |  |  |  |  |  |  |  |  |  |  |  |  |
| (G) | Additives |  |  |  |  |  |  |  |  |  |  |  |  |  |  |
|  | HALS |  |  |  |  |  |  |  |  |  | 0.75 |  |  | 0.8 |  |
|  | lubricant |  |  |  |  |  |  |  |  |  | 1 |  |  |  | 1 |
| Flexural elasticity modulus (kg/cm$^2$) |  | 4600 | 4800 | 4600 | 4200 | 4300 | 3200 | 4600 | 5000 | 4300 | 4600 | 4200 | 7600 | 4500 | 4700 |
| Coating properties |  |  |  |  |  |  |  |  |  |  |  |  |  |  |  |
| urethane paint A(*1) |  |  |  |  |  |  |  |  |  |  |  |  |  |  |  |
| (test 1) peel strength |  | 1090 | — | — | — | — | — | — | 990 | 1170 | — | — | 950 |  |  |
| (test 2) peel strength |  | 1400 | — | — | — | — | — | — | 1210 | 1420 | — | — | 1130 |  |  |
| acrylic paint A(*2) |  |  |  |  |  |  |  |  |  |  |  |  |  |  |  |
| (test 2) peel strength |  | 1690 | 1600 | 1300 | 1700 | 1450 | 900 | 1200 | 1190 | 1400 | 1330 | 1330 | 1030 | 420 | 280 |
| (test 3) peel strength |  | 1380 | 1420 | 1310 | 1400 | 1410 | 820 | 1220 | 1030 | 1130 | 1110 | 1210 | 1120 | 330 | 180 |
| urethane paint B(*3) |  |  |  |  |  |  |  |  |  |  |  |  |  |  |  |
| (test 2) peel strength |  | 1020 | 1300 | 1090 | 1120 | 1240 | 800 | 990 | 1090 | 1290 | 1220 | 1380 | 990 |  |  |
| (test 4) peel strength |  | 1200 | 1290 | 1070 | 1290 | 1220 | 1050 | 1170 | 1000 | 1050 | 1350 | 1310 | 970 |  |  |

(*1) one can paint,
(*2) one can paint,
(*3) two pack paint
(test 1): non-treatment of a surface of molding,
(test 2): alkali treatment,
(test 3): heating treatment
(test 4): acid treatment

TABLE 3

|  |  | Example No. | | | | | | | | | | | | | |
|---|---|---|---|---|---|---|---|---|---|---|---|---|---|---|
|  |  | 40 | 41 | 42 | 43 | 44 | 45 | 46 | 47 | 48 | 49 | 50 | 51 | 52 | 53 |
| Composition (component) |  |  |  |  |  |  |  |  |  |  |  |  |  |  |  |
| (A) | Olefin resin |  |  |  |  |  |  |  |  |  |  |  |  |  |  |
|  | block PP (1) | 100 | 100 | 100 | 100 | 100 | 100 | 100 | 100 | 100 | 100 | 100 |  | 100 |  |
|  | block PP (2) |  |  |  |  |  |  |  |  |  |  |  | 100 |  | 100 |
|  | random PP |  |  |  |  |  |  |  |  |  |  |  |  |  |  |
|  | homo PP |  |  |  |  |  |  |  |  |  |  |  |  |  |  |
|  | HDPE |  |  |  |  |  |  |  |  |  |  |  |  |  |  |
| (B) | Non-conjugated diene copoly. |  |  |  |  |  |  |  |  |  |  |  |  |  |  |
|  | copolymer (1) |  |  |  |  |  |  |  |  |  |  |  |  |  |  |
|  | copolymer (2) |  |  |  |  |  |  |  |  |  |  |  |  |  |  |
|  | copolymer (3) | 50 | 50 | 50 | 50 | 50 | 50 | 50 | 50 | 50 | 50 | 50 | 25 | 67 | 28 |
|  | copolymer (4) |  |  |  |  |  |  |  |  |  |  |  |  |  |  |
| (C1) | OH-Diene polymer |  |  |  |  |  |  |  |  |  |  |  |  |  |  |
|  | diene polymer |  |  |  |  |  |  |  |  |  |  |  |  |  |  |
|  | hydrogenated DP (1) |  |  |  |  |  |  |  |  |  |  |  |  |  |  |
|  | hydrogenated DP (2) | 5 | 5 | 5 | 5 | 5 | 5 | 5 | 5 | 5 | 5 | 5 | 2.5 | 6.7 | 3 |
| (D) | Elastomer |  |  |  |  |  |  |  |  |  |  |  |  |  |  |
|  | EPM (1) | 100 | 100 | 100 | 100 | 100 | 100 | 100 | 100 | 100 | 100 | 100 |  | 133 |  |
|  | EPM (2) |  |  |  |  |  |  |  |  |  |  |  |  |  |  |
|  | EPDM |  |  |  |  |  |  |  |  |  |  |  |  |  |  |
|  | SEBS |  |  |  |  |  |  |  |  |  |  |  |  |  |  |
| (E) | Filler |  |  |  |  |  |  |  |  |  |  |  |  |  |  |
|  | talc |  |  |  |  |  |  |  |  |  |  |  |  | 33 | 14 |
|  | potassium titanate whisker |  |  |  |  |  |  |  |  |  |  |  |  |  |  |
|  | barium sulfate |  |  |  |  |  |  |  |  |  |  |  |  |  |  |
|  | glass fiber |  |  |  |  |  |  |  |  |  |  |  |  |  |  |
|  | mica |  |  |  |  |  |  |  |  |  |  |  |  |  |  |

TABLE 3-continued

| | | Example No. | | | | | | | | | | | | | |
|---|---|---|---|---|---|---|---|---|---|---|---|---|---|---|
| | | 40 | 41 | 42 | 43 | 44 | 45 | 46 | 47 | 48 | 49 | 50 | 51 | 52 | 53 |
| | calcium carbonate | | | | | | | | | | | | | | |
| (F1) | Organic Sn compd. | | | | | | | | | | | | | | |
| | DBTDL | 0.8 | | 5 | 0.3 | | 0.8 | 0.8 | 0.8 | 0.8 | 0.8 | 0.8 | 0.4 | 1 | 0.4 |
| | DOTBL | | 0.8 | | | | | | | | | | | | |
| (F2) | t-amine compd. | | | | | | | | | | | | | | |
| | EDMA (a) | 5 | 5 | 5 | 5 | 5 | | | | 35 | 10 | | 2.5 | 6.7 | 3 |
| | EDMA (2) | | | | | | 5 | | | | | | | | |
| | DMAPEM | | | | | | | | 5 | | | | | | |
| | Low molecular compd. | | | | | | | 5 | | | | | | | |
| Flexural elasticity modulus (kg/cm²) | | 4700 | 4700 | 4700 | 4700 | 4700 | 4500 | 4600 | 4500 | 3400 | 4000 | 4500 | 4900 | 4700 | 7500 |
| Coating properties | | | | | | | | | | | | | | | |
| urethane paint A(*1) | | | | | | | | | | | | | | | |
| (test 1) peel strength | | 990 | — | — | — | — | — | — | — | — | — | — | 920 | 1150 | 900 |
| (test 2) peel strength | | 1320 | — | — | — | — | — | — | — | — | — | — | 1030 | 1290 | 1030 |
| urethane paint B(*2) | | | | | | | | | | | | | | | |
| (test 2) peel strength | | 1380 | 1350 | 1370 | 1290 | 1070 | 1310 | 1220 | 1120 | 1100 | 1350 | 1300 | 1160 | 1410 | 1120 |
| (test 4) peel strength | | 1290 | 1220 | 1250 | 1210 | 1030 | 1300 | 1110 | 1090 | 1070 | 1290 | 1200 | 1090 | 1380 | 1090 |
| (test 3) peel strength | | 1210 | 1200 | 1170 | 1200 | 990 | 1180 | 1010 | 1050 | 990 | 1190 | 1140 | 1030 | 1260 | 1080 |

(*1) one can paint,
(*2) two pack paint
(test 1): non-treatment of a surface of molding,
(test 2): alkali treatment,
(test 3): heating treatment,
(test 4): acid treatment

TABLE 4

| | | Example No. | | | | | | | | | | | Comparative ex. No. | | |
|---|---|---|---|---|---|---|---|---|---|---|---|---|---|---|---|
| | | 54 | 55 | 56 | 57 | 58 | 59 | 60 | 61 | 62 | 63 | 64 | 12 | 13 | 14 |
| Composition (component) | | | | | | | | | | | | | | | |
| (A) | Olefin resin | | | | | | | | | | | | | | |
| | block PP (1) | 100 | 100 | 100 | 100 | 100 | 100 | | 100 | 100 | 100 | | 100 | 100 | 100 |
| | block PP (2) | | | | | | | 100 | | | | 100 | | | |
| | random PP | | | | | | | | | | | | | | |
| | homo PP | | | | | | | | | | | | | | |
| | HDPE | | | | | | | | | | | | | | |
| (B) | Non-conjugated diene copoly. | | | | | | | | | | | | | | |
| | copolymer (1) | | | | | | | | | | | | | | |
| | copolymer (2) | | | | | | | | | | | | | | |
| | copolymer (3) | 50 | 50 | 50 | 50 | 50 | 50 | 25 | 67 | 50 | 67 | 28 | 50 | 67 | |
| | copolymer (4) | | | | | | | | | | | | | | |
| (C1) | OH-Diene polymer | | | | | | | | | | | | | | |
| | diene polymer | | | | | | | | | | | | | | |
| | hydrogenated DP (1) | | | | | | | | | | | | | | |
| | hydrogenated DP (2) | 5 | 5 | 5 | 5 | 5 | 5 | 2.5 | 6.7 | 5 | 6.7 | 3 | 5 | 6.7 | |
| (D) | Elastomer | | | | | | | | | | | | | | |
| | EPM (1) | 100 | 100 | 100 | 100 | 100 | 100 | | 133 | 100 | 133 | | 100 | 133 | 50 |
| | EPM (2) | | | | | | | | | | | | | | |
| | EPDM | | | | | | | | | | | | | | |
| | SEBS | | | | | | | | | | | | | | |
| (E) | Filler | | | | | | | | | | | | | | |
| | talc | | | | | | | | | 33 | | 33 | 14 | | 33 | 14.3 |
| | potassium titanate whisker | | | | | | | | | | | | | | |
| | mica | | | | | | | | | | | | | | |
| | calcium carbonate | | | | | | | | | | | | | | |
| | barium sulfate | | | | | | | | | | | | | | |
| | glass fiber | | | | | | | | | | | | | | |
| (F3) | P oxyacid compd. | | | | | | | | | | | | | | |
| | PAMOE | 5 | | | | 15 | 2.5 | 2.5 | 6.7 | 5 | 6.7 | 3 | | | |
| | EPAMOE (1) | | 5 | | | | | | | | | | | | |
| | EPAMOE (2) | | | 5 | | | | | | | | | | | |
| | PAPTE | | | | 5 | | | | | | | | | | |
| | PANPEOE | | | | | | | | | | | | | | 5 |
| (G) | Additives | | | | | | | | | | | | | | |
| | HALS | | | | | | | | | | 1 | | | 1 | |
| | lubricant (OA) | | | | | | | | | 0.8 | | | 0.8 | | |
| Flexural elasticity modulus (kg/cm²) | | 4100 | 4300 | 4300 | 3900 | 3200 | 4300 | 4800 | 4000 | 4300 | 4000 | 6900 | 4500 | 4800 | 7700 |
| Coating properties | | | | | | | | | | | | | | | |
| urethane paint A(*1) | | | | | | | | | | | | | | | |
| (test 1) peel strength | | 990 | — | — | — | — | — | 920 | — | — | — | — | | | |
| (test 2) peel strength | | 1290 | — | — | — | — | — | 1120 | — | — | — | — | | | |

TABLE 4-continued

|  | Example No. | | | | | | | | | | | Comparative ex. No. | | |
|---|---|---|---|---|---|---|---|---|---|---|---|---|---|---|
|  | 54 | 55 | 56 | 57 | 58 | 59 | 60 | 61 | 62 | 63 | 64 | 12 | 13 | 14 |
| acrylic metallic paint(*2) | | | | | | | | | | | | | | |
| (test 1) peel strength | 970 | 1000 | 960 | 1060 | 1000 | 870 | 720 | 1240 | 890 | 910 | 890 | | | |
| (test 2) peel strength | 1360 | 1410 | 1260 | 1240 | 1160 | 840 | 850 | 1270 | 1100 | 1170 | 1020 | 380 | 510 | 50 |
| (test 3) peel strength | 1210 | 990 | 1230 | 1220 | 1220 | 840 | 890 | 1200 | 1030 | 1200 | 1150 | 400 | 470 | 50 |
| urethane paint B(*3) | | | | | | | | | | | | | | |
| (test 2) peel strength | 1200 | 1200 | 1180 | 1090 | 810 | 1190 | 1000 | 1100 | 1080 | 1230 | 940 | | | |
| (test 4) peel strength | 1120 | 1190 | 1240 | 1140 | 1140 | 1070 | 990 | 1020 | 1110 | 1240 | 900 | | | |

(*1)one can paint,
(*2)one can paint,
(*3)two pack paint
(test 1): non-treatment of a surface of molding,
(test 2): alkali treatment,
(test 3): heating treatment
(test 4): acid treatment
: breaking of film

TABLE 5

|  | Example No. | | | | | | | | | |
|---|---|---|---|---|---|---|---|---|---|---|
|  | 65 | 66 | 67 | 68 | 69 | 70 | 71 | 72 | 73 | 74 |
| Composition (component) | | | | | | | | | | |
| (A) Olefin resin | | | | | | | | | | |
| block PP (1) | 100 | 100 | 100 | 100 | 100 | 100 | | 100 | 100 | |
| block PP (2) | | | | | | | 100 | | | 100 |
| random PP | | | | | | | | | | |
| homo PP | | | | | | | | | | |
| HDPE | | | | | | | | | | |
| (B) Non-conjugated diene copoly. | | | | | | | | | | |
| copolymer (1) | | | | | | | | | | |
| copolymer (2) | | | | | | | | | | |
| copolymer (3) | 50 | 50 | 50 | 50 | 50 | 50 | 25 | 50 | 67 | 28 |
| copolymer (4) | | | | | | | | | | |
| (C1) OH-Diene polymer | | | | | | | | | | |
| diene polymer | | | | | | | | | | |
| hydrogenated DP (1) | | | | | | | | | | |
| hydrogenated DP (2) | 5 | 5 | 5 | 5 | 5 | 5 | 2.5 | 5 | 6.7 | 3 |
| (D) Elastomer | | | | | | | | | | |
| EPM (1) | 100 | 100 | 100 | 100 | 100 | 100 | | 50 | 133 | |
| EPM (2) | | | | | | | | | | |
| EPDM | | | | | | | | | | |
| SEBS | | | | | | | | | | |
| (E) Filler | | | | | | | | | | |
| talc | | | | | | | | 50 | 33 | 14 |
| potassium titanate | | | | | | | | | | |
| whisker | | | | | | | | | | |
| mica | | | | | | | | | | |
| calcium carbonate | | | | | | | | | | |
| barium sulfate | | | | | | | | | | |
| glass fiber | | | | | | | | | | |
| (F2) t-amine compd. | | | | | | | | | | |
| EDMA (1) | | 5 | | | | | | | | |
| EDMA (2) | 5 | | | | 35 | 2.5 | 2.5 | 5 | 6.7 | 3 |
| DMAPEM | | | 5 | | | | | | | |
| low molecular compd. | | | | 5 | | | | | | |
| (F3) P oxyacid compd. | | | | | | | | | | |
| PAMOE | 5 | 5 | 5 | 5 | 5 | 5 | 2.5 | 5 | 6.7 | 3 |
| EPAMOE (1) | | | | | | | | | | |
| EPAMOE (2) | | | | | | | | | | |
| PAPTE | | | | | | | | | | |
| Flexural elasticity modulus (kg/cm$^2$) | 3900 | 3900 | 3700 | 4900 | 3100 | 4000 | 4600 | 9500 | 4100 | 6200 |
| Coating properties | | | | | | | | | | |
| acrylic paint A(*1) | | | | | | | | | | |
| (test 1) peel strength | 1020 | 700 | 820 | 590 | — | — | — | 700 | 1060 | — |
| (test 2) peel strength | 1660 | 1030 | 1000 | 920 | — | — | — | 1050 | 1700 | — |
| acrylic metallic paint(*2) | | | | | | | | | | |
| (test 1) peel strength | 1080 | 940 | 890 | 780 | — | — | 720 | 1500 | 1670 | 820 |
| (test 2) peel strength | 1280 | 1140 | 1090 | 1110 | 1040 | 1200 | 890 | 1520 | 1820 | 1240 |
| (test 3) peel strength | 1350 | 1030 | 990 | 820 | 920 | 1040 | 850 | 1490 | 1750 | 940 |

TABLE 5-continued

| | Example No. | | | | | | | | | |
|---|---|---|---|---|---|---|---|---|---|---|
| | 65 | 66 | 67 | 68 | 69 | 70 | 71 | 72 | 73 | 74 |
| urethane paint B(*3) | | | | | | | | | | |
| (test 2) peel strength | 1820 | 1320 | 1200 | 1100 | 1010 | 1190 | 1030 | 1400 | 1650 | 1180 |
| (test 4) peel strength | 1530 | 1240 | 1020 | 1000 | 990 | 1150 | 890 | 1470 | 1620 | 920 |

(*1) one can paint,
(*2) one can paint,
(*3) two pack paint
(test 1): nontreatment of a surface of molding,
(test 3): heating treatment
(test 2): alkali treatment,
(test 4): acid treatment
 : breaking of film

TABLE 6

| | | Example No. | | | | | | | | | | | | | | | |
|---|---|---|---|---|---|---|---|---|---|---|---|---|---|---|---|---|---|
| | | 75 | 76 | 77 | 78 | 79 | 80 | 81 | 82 | 83 | 84 | 85 | 86 | 87 | 88 | 89 | 90 |
| Composition (component) | | | | | | | | | | | | | | | | | |
| (A) | Olefin resin | | | | | | | | | | | | | | | | |
| | block PP (1) | 100 | 100 | 100 | 100 | 100 | 100 | 100 | 100 | 100 | 100 | 100 | 100 | 100 | 100 | | |
| | block PP (2) | | | | | | | | | | | | | | | 100 | 100 |
| | random PP | | | | | | | | | | | | | | | | |
| | homo PP | | | | | | | | | | | | | | | | |
| | HDPE | | | | | | | | | | | | | | | | |
| (B) | Non-conjugated diene copoly. | | | | | | | | | | | | | | | | |
| | copolymer (1) | 50 | | | | | | | | | | 50 | 50 | 50 | 50 | 67 | 25 |
| | copolymer (2) | | 50 | | | | | | | | | | | | | | |
| | copolymer (3) | | | 50 | | 200 | 9 | 50 | 50 | 50 | 50 | | | | | | |
| | copolymer (4) | | | | 50 | | | | | | | | | | | | |
| (C2) | OH-polymer | | | | | | | | | | | | | | | | |
| | EHM (1) | 12.5 | 12.5 | 12.5 | 12.5 | 25 | 9 | | | | 45 | 6.3 | 12.5 | 12.5 | 12.5 | 16.7 | 6.3 |
| | EHM (2) | | | | | | | 12.5 | | | | | | | | | |
| | EHM (3) | | | | | | | | 12.5 | | | | | | | | |
| | HMEPM | | | | | | | | | 12.5 | | | | | | | |
| (D) | Elastomer | | | | | | | | | | | | | | | | |
| | EPM (1) | 100 | 100 | 100 | 100 | 200 | 73 | 100 | 100 | 100 | 100 | 100 | | | | 167 | |
| | EPM (2) | | | | | | | | | | | | 100 | | | | |
| | EPDM | | | | | | | | | | | | | 100 | | | |
| | SEBS | | | | | | | | | | | | | | 100 | | |
| (E) | Filler | | | | | | | | | | | | | | | | |
| | talc | | | | | | | | | | | | | | | | |
| | potassium titanate whisker | | | | | | | | | | | | | | | | |
| | mica | | | | | | | | | | | | | | | | |
| | calcium carbonate | | | | | | | | | | | | | | | | |
| | barium sulfate | | | | | | | | | | | | | | | | |
| | glass fiber | | | | | | | | | | | | | | | | |
| Flexural elasticity modulus (kg/cm²) | | 4900 | 5400 | 4400 | 5000 | 3200 | 6300 | 4200 | 4200 | 5200 | 3100 | 4900 | 4700 | 5100 | 4700 | 2100 | 4900 |
| Coating properties | | | | | | | | | | | | | | | | | |
| urethane paint A(*1) | | | | | | | | | | | | | | | | | |
| (test 1) peel strength | | — | 1020 | 950 | 900 | — | — | — | — | — | — | — | — | 810 | 1040 | 900 | 1490 | 920 |
| (test 2) peel strength | | — | 1220 | 1150 | 1200 | — | — | — | — | — | — | — | — | 1050 | 1280 | 1190 | 1650 | 1110 |
| acrylic paint A(*2) | | | | | | | | | | | | | | | | | |
| (test 2) peel strength | | 980 | 1050 | 1200 | 1130 | 1320 | 860 | 1190 | 1170 | 920 | 1240 | 960 | 1090 | 1310 | 1230 | 1610 | 1090 |
| (test 4) peel strength | | 940 | 990 | 1170 | 1250 | 1240 | 810 | 1090 | 1120 | 870 | 1180 | 900 | 1020 | 1140 | 1090 | 1530 | 1010 |
| (test 3) peel strength | | 1080 | 1110 | 1210 | 1190 | 1300 | 820 | 1200 | 1190 | 890 | 1210 | 940 | 1110 | 1250 | 1210 | 1590 | 1120 |

| | | Example No. | | | | | | | | | | | | Comparative ex. No. | | |
|---|---|---|---|---|---|---|---|---|---|---|---|---|---|---|---|---|
| | | 91 | 92 | 93 | 94 | 95 | 96 | 97 | 98 | 99 | 100 | 101 | 102 | 15 | 16 | 17 |
| Composition (component) | | | | | | | | | | | | | | | | |
| (A) | Olefin resin | | | | | | | | | | | | | | | | |
| | block PP (1) | | | | 100 | 100 | 100 | 100 | 100 | 100 | 100 | 100 | | 100 | 100 | 100 |
| | block PP (2) | | | | | | | | | | | | 100 | | | |
| | random PP | 100 | | | | | | | | | | | | | | |
| | homo PP | | 100 | | | | | | | | | | | | | |
| | HDPE | | | 100 | | | | | | | | | | | | |
| (B) | Non-conjugated diene copoly. | | | | | | | | | | | | | | | |
| | copolymer (1) | 50 | 50 | 50 | 16.7 | 67 | 57 | 67 | 67 | 67 | 67 | 67 | 28 | | | |
| | copolymer (2) | | | | | | | | | | | | | | | |
| | copolymer (3) | | | | | | | | | | | | | | | |
| | copolymer (4) | | | | | | | | | | | | | | | |
| (C2) | OH-polymer | | | | | | | | | | | | | | | |

TABLE 6-continued

|  |  |  |  |  |  |  |  |  |  |  |  |  |  |  |  |
|---|---|---|---|---|---|---|---|---|---|---|---|---|---|---|---|
|  | EHM (1) | 12.5 | 12.5 | 12.5 | 33.3 | 16.7 | 14.3 | 16.7 | 16.7 | 16.7 | 16.7 | 16.7 | 7 | 5 | 8.3 | 10 |
|  | EHM (2) |  |  |  |  |  |  |  |  |  |  |  |  |  |  |  |
|  | EHM (3) |  |  |  |  |  |  |  |  |  |  |  |  |  |  |  |
|  | HMEPM |  |  |  |  |  |  |  |  |  |  |  |  |  |  |  |
| (D) | Elastomer |  |  |  |  |  |  |  |  |  |  |  |  |  |  |  |
|  | EPM (1) | 100 | 100 | 100 | 200 | 133 | 114 | 133 | 133 | 133 | 133 | 133 |  |  | 67 | 80 |
|  | EPM (2) |  |  |  |  |  |  |  |  |  |  |  |  |  |  |  |
|  | EPDM |  |  |  |  |  |  |  |  |  |  |  |  |  |  |  |
|  | SEBS |  |  |  |  |  |  |  |  |  |  |  |  |  |  |  |
| (E) | Filler |  |  |  |  |  |  |  |  |  |  |  |  |  |  |  |
|  | talc |  |  |  | 200 | 33 | 14.3 |  |  |  |  |  |  | 14 |  | 20 |
|  | potassium titanate whisker |  |  |  |  |  |  | 33 |  |  |  |  |  |  |  |  |
|  | mica |  |  |  |  |  |  |  | 33 |  |  |  |  |  |  |  |
|  | calcium carbonate |  |  |  |  |  |  |  |  | 33 |  |  |  |  |  |  |
|  | barium sulfate |  |  |  |  |  |  |  |  |  | 33 |  |  |  |  |  |
|  | glass fiber |  |  |  |  |  |  |  |  |  |  | 33 |  |  |  |  |
| Flexural elasticity modulus (kg/cm²) |  | 2600 | 4000 | 2600 | 6600 | 5100 | 4200 | 6700 | 5000 | 4400 | 4500 | 6900 | 7100 | 12600 | 4700 | 5500 |
| Coating properties |  |  |  |  |  |  |  |  |  |  |  |  |  |  |  |  |
| urethane paint A(*1) |  |  |  |  |  |  |  |  |  |  |  |  |  |  |  |  |
| (test 1) peel strength |  | — | — | — | — | — | — | 1110 | 1090 | 1130 | 1050 | 1220 | 970 |  |  |  |
| (test 2) peel strength |  | — | — | — | — | — | — | 1300 | 1240 | 1510 | 1320 | 1310 | 1290 |  |  |  |
| acrylic paint A(*2) |  |  |  |  |  |  |  |  |  |  |  |  |  |  |  |  |
| (test 2) peel strength |  | 1620 | 910 | 1050 | 1020 | 1030 | 1050 | 1320 | 1230 | 1610 | 1190 | 1390 | 1150 | 20 | 30 | 60 |
| (test 4) peel strength |  | 1320 | 880 | 910 | 990 | 950 | 920 | 1140 | 1020 | 1290 | 1120 | 1070 | 1090 |  |  |  |
| (test 3) peel strength |  | 1500 | 930 | 1100 | 1240 | 960 | 890 | 1290 | 1180 | 1600 | 1220 | 1100 | 1130 | 20 | 10 | 40 |

(*1) one can paint,
(*2) one can paint,
(test 1): non-treatment of a surface of molding,
(test 3): heating treatment
(test 2): alkali treatment,
(test 4): acid treatment

TABLE 7

|  |  | Example No. |  |  |  |  |  |  |  |  |  |  |  | Comparative ex. No. |  |
|---|---|---|---|---|---|---|---|---|---|---|---|---|---|---|---|
|  |  | 103 | 104 | 105 | 106 | 107 | 108 | 109 | 110 | 111 | 112 | 113 | 114 | 18 | 19 |
| Composition (component) |  |  |  |  |  |  |  |  |  |  |  |  |  |  |  |
| (A) | Olefin resin |  |  |  |  |  |  |  |  |  |  |  |  |  |  |
|  | block PP (1) | 100 | 100 | 100 | 100 | 100 | 100 | 100 |  |  | 100 | 100 | 100 | 100 | 100 |
|  | block PP (2) |  |  |  |  |  |  |  | 100 | 100 |  |  |  |  |  |
|  | random PP |  |  |  |  |  |  |  |  |  |  |  |  |  |  |
|  | homo PP |  |  |  |  |  |  |  |  |  |  |  |  |  |  |
|  | HDPE |  |  |  |  |  |  |  |  |  |  |  |  |  |  |
| (B) | Non-conjugated diene copoly. |  |  |  |  |  |  |  |  |  |  |  |  |  |  |
|  | copolymer (1) |  |  |  |  |  |  |  |  |  |  |  |  |  |  |
|  | copolymer (2) |  |  |  |  |  |  |  |  |  |  |  |  |  |  |
|  | copolymer (3) | 50 | 50 | 50 | 50 | 50 | 50 | 50 | 25 | 28 | 67 | 50 | 67 | 50 | 67 |
|  | copolymer (4) |  |  |  |  |  |  |  |  |  |  |  |  |  |  |
| (C2) | OH-polymer |  |  |  |  |  |  |  |  |  |  |  |  |  |  |
|  | EHM (1) | 12.5 | 12.5 | 12.5 | 12.5 | 12.5 | 12.5 | 12.5 | 6.3 | 7 | 16.7 | 12.5 | 16.7 | 12.5 | 16.7 |
|  | EHM (2) |  |  |  |  |  |  |  |  |  |  |  |  |  |  |
|  | EHM (3) |  |  |  |  |  |  |  |  |  |  |  |  |  |  |
|  | HMEPM |  |  |  |  |  |  |  |  |  |  |  |  |  |  |
| (C3) | COOH-polymer |  |  |  |  |  |  |  |  |  |  |  |  |  |  |
|  | EAA (1) | 2.5 |  |  |  |  | 40 | 1.3 | 1.3 | 1.4 | 3.3 | 2.5 | 3.3 |  |  |
|  | EAA (2) |  | 2.5 |  |  |  |  |  |  |  |  |  |  |  |  |
|  | MEPR |  |  | 2.5 |  |  |  |  |  |  |  |  |  |  |  |
|  | MDPH |  |  |  | 2.5 |  |  |  |  |  |  |  |  |  |  |
|  | MPEM |  |  |  |  | 2.5 |  |  |  |  |  |  |  |  |  |
| (D) | Elastomer |  |  |  |  |  |  |  |  |  |  |  |  |  |  |
|  | EPM (1) | 100 | 100 | 100 | 100 | 100 | 100 | 100 |  |  | 133 | 100 | 133 | 100 | 133 |
|  | EPM (2) |  |  |  |  |  |  |  |  |  |  |  |  |  |  |
|  | EPDM |  |  |  |  |  |  |  |  |  |  |  |  |  |  |
|  | SEBS |  |  |  |  |  |  |  |  |  |  |  |  |  |  |
| (E) | Filler |  |  |  |  |  |  |  |  |  |  |  |  |  |  |
|  | talc |  |  |  |  |  |  |  |  | 14 | 33 |  | 33 |  | 33 |
|  | potassium titanate whisker |  |  |  |  |  |  |  |  |  |  |  |  |  |  |
|  | mica |  |  |  |  |  |  |  |  |  |  |  |  |  |  |
|  | calcium carbonate |  |  |  |  |  |  |  |  |  |  |  |  |  |  |
|  | barium sulfate |  |  |  |  |  |  |  |  |  |  |  |  |  |  |
|  | glass fiber |  |  |  |  |  |  |  |  |  |  |  |  |  |  |
| (G) | Additives |  |  |  |  |  |  |  |  |  |  |  |  |  |  |
|  | HALS |  |  |  |  |  |  |  |  |  |  | 1 |  | 1 |  |

TABLE 7-continued

| | Example No. | | | | | | | | | | | | Comparative ex. No. | |
|---|---|---|---|---|---|---|---|---|---|---|---|---|---|---|
| | 103 | 104 | 105 | 106 | 107 | 108 | 109 | 110 | 111 | 112 | 113 | 114 | 18 | 19 |
| lubricant | | | | | | | | | | | 0.8 | | 0.8 | |
| Flexural elasticity modulus (kg/cm²) | 4200 | 4500 | 4500 | 4300 | 4000 | 3300 | 4700 | 5200 | 6600 | 4400 | 4200 | 4500 | 4400 | 5100 |
| Coating properties | | | | | | | | | | | | | | |
| urethane paint A(*1) | | | | | | | | | | | | | | |
| (test 1) peel strength | 950 | — | — | — | — | — | — | 910 | 950 | — | — | — | | |
| (test 2) peel strength | 1210 | — | — | — | — | — | — | 1190 | 1080 | — | — | — | | |
| acrylic paint A(*2) | | | | | | | | | | | | | | |
| (test 2) peel strength | 1320 | 1260 | 1070 | 1210 | 1010 | 920 | 1290 | 1030 | 980 | 1200 | 1350 | 1210 | 220 | 240 |
| (test 3) peel strength | 1260 | 1130 | 990 | 1090 | 920 | 800 | 1190 | 1010 | 1030 | 1010 | 1290 | 1070 | 170 | 190 |
| (test 4) peel strength | 1300 | 1240 | 1050 | 1240 | 1070 | 860 | 1320 | 1160 | 990 | 1100 | 1310 | 1190 | | |

(*1)one can paint,
(*2)one can paint,
(test 1): non-treatment of a surface of molding,
(test 2): alkali treatment,
(test 3): heating treatment
(test 4): acid treatment

TABLE 8

| | Example No. | | | | | | | | | | | | | |
|---|---|---|---|---|---|---|---|---|---|---|---|---|---|---|
| | 115 | 116 | 117 | 118 | 119 | 120 | 121 | 122 | 123 | 124 | 125 | 126 | 127 | 128 |
| Composition (component) | | | | | | | | | | | | | | |
| (A) Olefin resin | | | | | | | | | | | | | | |
| block PP (1) | 100 | 100 | 100 | 100 | 100 | 100 | 100 | 100 | 100 | 100 | 100 | | | 100 |
| block PP (2) | | | | | | | | | | | | 100 | 100 | |
| random PP | | | | | | | | | | | | | | |
| homo PP | | | | | | | | | | | | | | |
| HDPE | | | | | | | | | | | | | | |
| (B) Non-conjugated diene copoly. | | | | | | | | | | | | | | |
| copolymer (1) | | | | | | | | | | | | | | |
| copolymer (2) | | | | | | | | | | | | | | |
| copolymer (3) | 50 | 50 | 50 | 50 | 50 | 50 | 50 | 50 | 50 | 50 | 50 | 25 | 28 | 67 |
| copolymer (4) | | | | | | | | | | | | | | |
| (C2) OH-polymer | | | | | | | | | | | | | | |
| EHM (1) | 12.5 | 12.5 | 12.5 | 12.5 | 12.5 | 12.5 | 12.5 | 12.5 | 12.5 | 12.5 | 12.5 | 6.3 | 7 | 16.7 |
| EHM (2) | | | | | | | | | | | | | | |
| EHM (3) | | | | | | | | | | | | | | |
| HMEPM | | | | | | | | | | | | | | |
| (D) Elastomer | | | | | | | | | | | | | | |
| EPM (1) | 100 | 100 | 100 | 100 | 100 | 100 | 100 | 100 | 100 | 100 | 100 | | | 133 |
| EPM (2) | | | | | | | | | | | | | | |
| EPDM | | | | | | | | | | | | | | |
| SEBS | | | | | | | | | | | | | | |
| (E) Filler | | | | | | | | | | | | | | |
| talc | | | | | | | | | | | | | 14 | 33 |
| potassium titanate whisker | | | | | | | | | | | | | | |
| mica | | | | | | | | | | | | | | |
| calcium carbonate | | | | | | | | | | | | | | |
| barium sulfate | | | | | | | | | | | | | | |
| glass fiber | | | | | | | | | | | | | | |
| (F1) Organic Sn compd. | | | | | | | | | | | | | | |
| DBTDL | 0.8 | | 5 | 0.3 | | 0.8 | 0.8 | 0.8 | 0.8 | 0.8 | 0.8 | 0.4 | 0.4 | 1 |
| DOTBL | | 0.8 | | | | | | | | | | | | |
| (F2) t-amine compd. | | | | | | | | | | | | | | |
| EDMA (1) | 5 | 5 | 5 | 5 | 5 | | | | 35 | 10 | | 2.5 | 3 | 6.7 |
| EDMA (2) | | | | | | 5 | | | | | | | | |
| DMAPEM | | | | | | | 5 | | | | | | | |
| low molecular compd. | | | | | | | | 5 | | | | | | |
| Flexural elasticity modulus (kg/cm²) | 4400 | 4600 | 4400 | 4500 | 4500 | 4500 | 4400 | 4300 | 3200 | 4100 | 4700 | 4800 | 7300 | 4300 |
| Coating properties | | | | | | | | | | | | | | |
| urethane paint A(*1) | | | | | | | | | | | | | | |
| (test 1) peel strength$^a$ | 850 | — | — | — | — | — | — | — | — | | | | | |
| (test 2) peel strength$^a$ | 1120 | — | — | — | — | — | — | — | — | | | | | |
| (test 1) peel strength | | | | | | | | | | | | — | 890 | 870 | 1110 |
| (test 2) peel strength | | | | | | | | | | | | — | 990 | 1010 | 1290 |
| urethane paint B(*2) | | | | | | | | | | | | | | |
| (test 2) peel strength$^a$ | 1350 | 1320 | 1330 | 1240 | 980 | 1350 | 1060 | 1140 | 950 | 1190 | | | | |
| (test 4) peel strength$^a$ | 1280 | 1300 | 1220 | 1200 | 1000 | 1250 | 1010 | 1030 | 920 | 1160 | | | | |
| (test 3) peel strength$^a$ | 1250 | 1210 | 1270 | 1190 | 930 | 1270 | 990 | 1050 | 890 | 1200 | | | | |
| urethane paint A(*2) | | | | | | | | | | | | | | |

TABLE 8-continued

|  | Example No. | | | | | | | | | | | | | |
|---|---|---|---|---|---|---|---|---|---|---|---|---|---|---|
|  | 115 | 116 | 117 | 118 | 119 | 120 | 121 | 122 | 123 | 124 | 125 | 126 | 127 | 128 |
| (test 2) peel strength |  |  |  |  |  |  |  |  |  |  | 1220 | 1060 | 1030 | 1290 |
| (test 4) peel strength |  |  |  |  |  |  |  |  |  |  | 1200 | 1000 | 960 | 1220 |
| (test 3) peel strength |  |  |  |  |  |  |  |  |  |  | 1090 | 970 | 990 | 1280 |

(*1) one can paint,
(*2) two pack paint,
g/cm
(test 1): non-treatment of a surface of molding,
(test 2): alkali treatment,
(test 3): heating treatment
(test 4): acid treatment

TABLE 9

|  |  | Example No. | | | | | | | | | |
|---|---|---|---|---|---|---|---|---|---|---|---|
|  |  | 129 | 130 | 131 | 132 | 133 | 134 | 135 | 136 | 137 | 138 |
| Composition (component) | | | | | | | | | | | |
| (A) | Olefin resin | | | | | | | | | | |
|  | block PP (1) | 100 | 100 | 100 | 100 | 100 | 100 | 100 | 100 | 100 | 100 |
|  | block PP (2) | | | | | | | | | | |
|  | random PP | | | | | | | | | | |
|  | homo PP | | | | | | | | | | |
|  | HDPE | | | | | | | | | | |
| (B) | Non-conjugated diene copoly. | | | | | | | | | | |
|  | copolymer (1) | | | | | | | | | | |
|  | copolymer (2) | | | | | | | | | | |
|  | copolymer (3) | 50 | 50 | 50 | 50 | 50 | 50 | 50 | 50 | 50 | 50 |
|  | copolymer (4) | | | | | | | | | | |
| (C2) | OH polymer | | | | | | | | | | |
|  | EHM (1) | | | | | | | | | | |
|  | EHM (2) | | | | | | | | | | |
|  | PUD | 15 | 15 | 15 | 15 | 15 | 15 | 15 | 15 | 15 | 15 |
|  | HMEPM | | | | | | | | | | |
| (D) | Elastomer | | | | | | | | | | |
|  | EPM (1) | 100 | 100 | 100 | 100 | 100 | 100 | 100 | 100 | 100 | 100 |
|  | EPM (2) | | | | | | | | | | |
|  | EPDM | | | | | | | | | | |
|  | SEBS | | | | | | | | | | |
| (E) | Filler | | | | | | | | | | |
|  | talc | | | | | | | | | | |
|  | potassium titanate whisker | | | | | | | | | | |
|  | mica | | | | | | | | | | |
|  | calcium carbonate | | | | | | | | | | |
|  | barium sulfate | | | | | | | | | | |
|  | glass fiber | | | | | | | | | | |
| (F2) | t-amine compd. | | | | | | | | | | |
|  | EDMA (1) | | | | | | | 5 | | | |
|  | EDMA (2) | | | | | | | | 5 | | |
|  | DMAPEM | | | | | | | | | 5 | |
|  | low molecular compd. | | | | | | | | | | 5 |
| (F3) | P oxyacid compd. | | | | | | | | | | |
|  | PAMOE | 5 | | | | 15 | 2.5 | 5 | 5 | 5 | 5 |
|  | EPAMOE (1) | | 5 | | | | | | | | |
|  | EPAMOE (2) | | | 5 | | | | | | | |
|  | PAPTE | | | | 5 | | | | | | |
| Flexural elasticity modulus (kg/cm²) | | 5500 | 6000 | 6100 | 4900 | 2700 | 4500 | 4100 | 4200 | 4000 | 3900 |
| Coating properties | | | | | | | | | | | |
| acrylic paint A(*1) | | | | | | | | | | | |
| (test 1) peel strength | | — | — | — | — | — | — | 720 | 840 | 590 | 700 |
| (test 2) peel strength | | — | — | — | — | — | — | 1030 | 1150 | 1100 | 950 |
| acrylic metallic paint(*2) | | | | | | | | | | | |
| (test 1) peel strength | | 1720 | 1600 | 1820 | 1090 | 820 | 1700 | 1650 | 1660 | 1240 | 1190 |
| (test 2) peel strength | | 1760 | 1590 | 1430 | 1430 | 1670 | 1660 | 1390 | 1620 | 1420 | 1540 |
| (test 3) peel strength | | 1450 | 1490 | 1290 | 1490 | 900 | 1540 | 1510 | 1470 | 1530 | 1050 |
| urethane paint B(*3) | | | | | | | | | | | |
| (test 2) peel strength | | 1500 | 1440 | 1520 | 1540 | 1450 | 1490 | 1400 | 1800 | 1550 | 1200 |
| (test 4) peel strength | | 1530 | 1400 | 1500 | 1390 | 1450 | 1550 | 1310 | 1740 | 1430 | 1180 |

|  | Example No. | | | | | | | | |
|---|---|---|---|---|---|---|---|---|---|
|  | 139 | 140 | 141 | 142 | 143 | 144 | 145 | 146 | 147 |

TABLE 9-continued

| Composition (component) | | | | | | | | | |
|---|---|---|---|---|---|---|---|---|---|
| (A) Olefin resin | | | | | | | | | |
| block PP (1) | 100 | 100 | | | 100 | 100 | 100 | | |
| block PP (2) | | | 100 | 100 | | | | 100 | 100 |
| random PP | | | | | | | | | |
| homo PP | | | | | | | | | |
| HDPE | | | | | | | | | |
| (B) Non-conjugated diene copoly. | | | | | | | | | |
| copolymer (1) | | | | | | | | | |
| copolymer (2) | | | | | | | | | |
| copolymer (3) | 50 | 50 | 25 | 25 | 50 | 67 | 67 | 28 | 28 |
| copolymer (4) | | | | | | | | | |
| (C1) OH polymer | | | | | | | | | |
| EHM (1) | | | | | | | | | |
| EHM (2) | | | | | | | | | |
| PUD | 15 | 15 | 7.5 | 7.5 | 15 | 20 | 20 | 9 | 9 |
| HMEPM | | | | | | | | | |
| (D) Elastomer | | | | | | | | | |
| EPM (1) | 100 | 100 | | | 50 | 133 | 133 | | |
| EPM (2) | | | | | | | | | |
| EPDM | | | | | | | | | |
| SEBS | | | | | | | | | |
| (E) Filler | | | | | | | | | |
| talc | | | | | 50 | 33 | 33 | 14 | 14 |
| potassium titanate whisker | | | | | | | | | |
| mica | | | | | | | | | |
| calcium carbonate | | | | | | | | | |
| barium sulfate | | | | | | | | | |
| glass fiber | | | | | | | | | |
| (F2) t-amine compd. | | | | | | | | | |
| EDMA (1) | | | | | | | | | |
| EDMA (2) | 35 | 2.5 | | 2.5 | | | 6.7 | | 3 |
| DMAPEM | | | | | | | | | |
| low molecular compd. | | | | | | | | | |
| (F3) P oxyacid compd. | | | | | | | | | |
| PAMOE | 5 | 5 | 2.5 | 2.5 | 5 | 6.7 | 6.7 | 3 | 3 |
| EPAMOE (1) | | | | | | | | | |
| EPAMOE (2) | | | | | | | | | |
| PAPTE | | | | | | | | | |
| Flexural elasticity modulus (kg/cm$^2$) | 2900 | 4300 | 5200 | 4600 | 11000 | 7000 | 6700 | 7100 | 6900 |
| Coating properties | | | | | | | | | |
| acrylic paint A(*1) | | | | | | | | | |
| (test 1) peel strength | 630 | 800 | — | 710 | — | — | 1180 | — | 560 |
| (test 2) peel strength | 820 | 1200 | — | 890 | — | — | 1470 | — | 920 |
| acrylic metallic paint(*2) | | | | | | | | | |
| (test 1) peel strength | 1310 | 1540 | 1010 | 1240 | 1200 | 1670 | 1640 | 1080 | 1220 |
| (test 2) peel strength | 1100 | 1490 | 970 | 1190 | 1440 | 1820 | 1900 | 1300 | 1240 |
| (test 3) peel strength | 980 | 1320 | 960 | 1300 | 1360 | 1750 | 1620 | 1080 | 970 |
| urethane paint B(*3) | | | | | | | | | |
| (test 2) peel strength | 1050 | 1690 | 940 | 1200 | 1180 | 1650 | 1460 | 900 | 880 |
| (test 4) peel strength | 1090 | 1740 | 920 | 1320 | 1050 | 1400 | 1460 | 850 | 920 |

(*1)one can paint,
(*2)one can paint,
(*3)two pack paint
(test 1): non-treatment of a surface of molding,
(test 2): alkali treatment,
(test 3): heating treatment
(test 4): acid treatment
: breaking of film

TABLE 10

| | Example No. | | | | | | | | | Comparative Ex. No. |
|---|---|---|---|---|---|---|---|---|---|---|
| | 148 | 149 | 150 | 151 | 152 | 153 | 154 | 155 | 156 | 20 |
| Composition (component) | | | | | | | | | | |
| (A) Olefin resin | | | | | | | | | | |
| block PP(1) | 100 | 100 | 100 | 100 | 100 | 100 | 100 | | 100 | 100 |
| block PP(2) | | | | | | | | 100 | | |
| random PP | | | | | | | | | | |
| homo PP | | | | | | | | | | |
| HDPE | | | | | | | | | | |

TABLE 10-continued

| | Example No. | | | | | | | | | Comparative Ex. No. |
|---|---|---|---|---|---|---|---|---|---|---|
| | 148 | 149 | 150 | 151 | 152 | 153 | 154 | 155 | 156 | 20 |
| (B) Non-conjugated diene copoly. | | | | | | | | | | |
| copolymer(1) | | | | | | | | | | |
| copolymer(2) | | | | | | | | | | |
| copolymer(3) | 50 | 50 | 50 | 50 | 50 | 50 | 33 | 67 | | |
| copolymer(4) | | | | | | | | | | |
| (C3) COOH-polymer | | | | | | | | | | |
| EAA(1) | | 12.5 | | | | | | | | |
| EAA(2) | | | 12.5 | | | | | | | |
| MEPR | 50 | | | | | 100 | 12.5 | 16.7 | 67 | 33 |
| MDPH | | | | 5 | | | | | | |
| MPEM | | | | | 12.5 | | | | | |
| (D) Elastomer | | | | | | | | | | |
| EPM(1) | 50 | 100 | 100 | 100 | 100 | | 87.5 | | 67 | 33 |
| EPM(2) | | | | | | | | | | |
| EPDM | | | | | | | | | | |
| SEBS | | | | | | | | | | |
| (E) Filler | | | | | | | | | | |
| talc | | | | | | | | 16.7 | 33 | |
| potassium titanate whisker | | | | | | | | | | |
| mica | | | | | | | | | | |
| calcium carbonate | | | | | | | | | | |
| barium sulfate | | | | | | | | | | |
| glass fiber | | | | | | | | | | |
| Flexural elasticity modulus (kg/cm$^2$) | 4100 | 4500 | 4800 | 4500 | 4300 | 4000 | 4400 | 4900 | 5400 | 4400 |
| Coating properties cross cut test | | | | | | | | | | |
| urethane paint A(*1) | | | | | | | | | | |
| (test 1) | 100/100 | 100/100 | 100/100 | 100/100 | 100/100 | 100/100 | 98/100 | 100/100 | 100/100 | |
| (test 2) | 100/100 | 100/100 | 100/100 | 100/100 | 100/100 | 100/100 | 100/100 | 100/100 | 100/100 | |
| acrylic paint A(*2) | | | | | | | | | | |
| (test 2) | 100/100 | — | — | — | — | 100/100 | — | 100/100 | 100/100 | 0/100 |
| (test 4) | 100/100 | — | — | — | — | 100/100 | — | 100/100 | 100/100 | |
| (test 3) | 100/100 | — | — | — | — | 100/100 | — | 100/100 | 100/100 | 0/100 |

(*1): one can paint, (*2): one can paint,
(test 1): non-treatment of a surface of molding, (test 2): alkali treatment, (test 3): heating treatment (test 4): acid treatment

TABLE 11

| | Example No. | | | | | | | | | |
|---|---|---|---|---|---|---|---|---|---|---|
| | 157 | 158 | 159 | 160 | 161 | 162 | 163 | 164 | 165 | 166 |
| Composition (component) | | | | | | | | | | |
| (A) Olefin resin | | | | | | | | | | |
| block PP(1) | 100 | 100 | 100 | 100 | 100 | 100 | 100 | 100 | 100 | 100 |
| block PP(2) | | | | | | | | | | |
| random PP | | | | | | | | | | |
| homo PP | | | | | | | | | | |
| HDPE | | | | | | | | | | |
| (B) Non-conjugated diene copoly. | | | | | | | | | | |
| copolymer(1) | 50 | | | | | | | | | 50 |
| copolymer(2) | | 50 | | | | | | | | |
| copolymer(3) | | | 50 | | 200 | 9 | 50 | 50 | 50 | |
| copolymer(4) | | | | 50 | | | | | | |
| (C4) NH-polymer | | | | | | | | | | |
| AMAEPM | 12.5 | 12.5 | 12.5 | 12.5 | 25 | 9 | | | 45 | 6.3 |
| ADPH | | | | | | | 12.5 | | | |
| APEH | | | | | | | | 12.5 | | |
| (D) Elastomer | | | | | | | | | | |
| EPM(1) | 100 | 100 | 100 | 100 | 200 | 73 | 100 | 100 | 100 | 100 |
| EPM(2) | | | | | | | | | | |

TABLE 11-continued

| | | | | | | | | | | |
|---|---|---|---|---|---|---|---|---|---|---|
| EPDM | | | | | | | | | | |
| SEBS | | | | | | | | | | |
| (E) Filler | | | | | | | | | | |
| talc | | | | | | | | | | |
| potassium titanate whisker | | | | | | | | | | |
| mica | | | | | | | | | | |
| calcium carbonate | | | | | | | | | | |
| barium sulfate | | | | | | | | | | |
| glass fiber | | | | | | | | | | |
| Flexural elasticity modulus (kg/cm²) | 5000 | 5400 | 4600 | 5000 | 2900 | 6500 | 4400 | 4400 | 2500 | 4900 |
| Coating properties cross cut test | | | | | | | | | | |
| urethane paint A(*1) | | | | | | | | | | |
| (test 1) | — | 100/100 | 100/100 | 99/100 | — | 98/100 | — | — | 100/100 | 100/100 |
| (test 2) | — | 100/100 | 100/100 | 100/100 | — | 100/100 | — | — | 100/100 | 100/100 |
| urethane paint B(*2) | | | | | | | | | | |
| (test 2) | 100/100 | 100/100 | 100/100 | 100/100 | 100/100 | 100/100 | 100/100 | 100/100 | 100/100 | 100/100 |
| (test 4) | 100/100 | 100/100 | 100/100 | 100/100 | 100/100 | 100/100 | 100/100 | 100/100 | 100/100 | 100/100 |
| (test 3) | 100/100 | 100/100 | 100/100 | 100/100 | 100/100 | 100/100 | 100/100 | 100/100 | 100/100 | 100/100 |

| | Example No. | | | | | | | | | |
|---|---|---|---|---|---|---|---|---|---|---|
| | 167 | 168 | 169 | 170 | 171 | 172 | 173 | 174 | 175 | 176 |
| Composition (component) | | | | | | | | | | |
| (A) Olefin resin | | | | | | | | | | |
| block PP(1) | 100 | 100 | 100 | | | | | | 100 | 100 |
| block PP(2) | | | | 100 | 100 | | | | | |
| random PP | | | | | | 100 | | | | |
| homo PP | | | | | | | 100 | | | |
| HDPE | | | | | | | | 100 | | |
| (B) Non-conjugated diene copoly. | | | | | | | | | | |
| copolymer(1) | 50 | 50 | 50 | 67 | 25 | 50 | 50 | 50 | 16.7 | 67 |
| copolymer(2) | | | | | | | | | | |
| copolymer(3) | | | | | | | | | | |
| copolymer(4) | | | | | | | | | | |
| (C4) NH-polymer | | | | | | | | | | |
| AMAEPM | 12.5 | 12.5 | 12.5 | 16.7 | 6.3 | 12.5 | 12.5 | 12.5 | 33.3 | 16.7 |
| ADPH | | | | | | | | | | |
| APEH | | | | | | | | | | |
| (D) Elastomer | | | | | | | | | | |
| EPM(1) | | | | 167 | | 100 | 100 | 100 | 200 | 133 |
| EPM(2) | 100 | | | | | | | | | |
| EPDM | | 100 | | | | | | | | |
| SEBS | | | 100 | | | | | | | |
| (E) Filler | | | | | | | | | | |
| talc | | | | | | | | | 200 | 33 |
| potassium titanate whisker | | | | | | | | | | |
| mica | | | | | | | | | | |
| calcium carbonate | | | | | | | | | | |
| barium sulfate | | | | | | | | | | |
| glass fiber | | | | | | | | | | |
| Flexural elasticity modulus (kg/cm²) | 4700 | 5400 | 4900 | 2200 | 4800 | 2500 | 4200 | 2700 | 6700 | 5700 |
| Coating properties cross cut test | | | | | | | | | | |
| urethane paint A(*1) | | | | | | | | | | |
| (test 1) | — | — | — | 100/100 | 100/100 | — | — | — | — | 100/100 |
| (test 2) | — | — | — | 100/100 | 100/100 | — | — | — | — | 100/100 |
| urethane paint B(*2) | | | | | | | | | | |

TABLE 11-continued

|  | | | | | | | | | | |
|---|---|---|---|---|---|---|---|---|---|---|
| (test 2) | 100/100 | 100/100 | 100/100 | 100/100 | 100/100 | 100/100 | 100/100 | 100/100 | 100/100 | 100/100 |
| (test 4) | 100/100 | 100/100 | 100/100 | 100/100 | 100/100 | 100/100 | 100/100 | 100/100 | 100/100 | 100/100 |
| (test 3) | 100/100 | 100/100 | 100/100 | 100/100 | 100/100 | 100/100 | 100/100 | 100/100 | 100/100 | 100/100 |

|  | Example No. | | | | | | | Comparative ex. No. |
|---|---|---|---|---|---|---|---|---|
|  | 177 | 178 | 179 | 180 | 181 | 182 | 183 | 21 |
| Composition (component) | | | | | | | | |
| (A) Olefin resin | | | | | | | | |
| block PP(1) | 100 | 100 | 100 | 100 | 100 | 100 | | 100 |
| block PP(2) | | | | | | | 100 | |
| random PP | | | | | | | | |
| homo PP | | | | | | | | |
| HDPE | | | | | | | | |
| (B) Non-conjugated diene copoly. | | | | | | | | |
| copolymer(1) | 57 | 67 | 67 | 67 | 67 | 67 | 28 | |
| copolymer(2) | | | | | | | | |
| copolymer(3) | | | | | | | | |
| copolymer(4) | | | | | | | | |
| (C4) NH-polymer | | | | | | | | |
| AMAEPM | 4.3 | 16.7 | 16.7 | 16.7 | 16.7 | 16.7 | 7 | 8.3 |
| ADPH | | | | | | | | |
| APEH | | | | | | | | |
| (D) Elastomer | | | | | | | | |
| EPM(1) | 114 | 133 | 133 | 133 | 133 | 133 | | 67 |
| EPM(2) | | | | | | | | |
| EPDM | | | | | | | | |
| SEBS | | | | | | | | |
| (E) Filler | | | | | | | | |
| talc | 14.3 | | | | | | 14 | |
| potassium titanate whisker | | 33 | | | | | | |
| mica | | | 33 | | | | | |
| calcium carbonate | | | | 33 | | | | |
| barium sulfate | | | | | 33 | | | |
| glass fiber | | | | | | 33 | | |
| Flexural elasticity modulus (kg/cm²) | 4500 | 6900 | 5200 | 4700 | 4500 | 7000 | 7400 | 4500 |
| Coating properties cross cut test | | | | | | | | |
| urethane paint A(*1) | | | | | | | | |
| (test 1) | — | 100/100 | 100/100 | 100/100 | 100/100 | 100/100 | 100/100 | |
| (test 2) | — | 100/100 | 100/100 | 100/100 | 100/100 | 100/100 | 100/100 | |
| urethane paint B(*2) | | | | | | | | |
| (test 2) | 100/100 | 100/100 | 100/100 | 100/100 | 100/100 | 100/100 | 100/100 | 0/100 |
| (test 4) | 100/100 | 100/100 | 100/100 | 100/100 | 100/100 | 100/100 | 100/100 | |
| (test 3) | 100/100 | 100/100 | 100/100 | 100/100 | 100/100 | 100/100 | 100/100 | 0/100 |

(*1): one can paint, (*2): two pack paint,
(test 1): non-treatment of a surface of molding, (test 2): alkali treatment, (test 3): heating treatment (test 4): acid treatment

TABLE 12

|  | Example No. | | | | | | | | Comparative ex. No. |
|---|---|---|---|---|---|---|---|---|---|
|  | 184 | 185 | 186 | 187 | 188 | 189 | 190 | 191 | 22 |
| Composition (component) | | | | | | | | | |
| (A) Olefin resin | | | | | | | | | |
| block PP(1) | 100 | 100 | 100 | 100 | 100 | | 100 | | 100 |
| block PP(2) | | | | | | 100 | | 100 | |
| random PP | | | | | | | | | |
| homo PP | | | | | | | | | |
| HDPE | | | | | | | | | |

TABLE 12-continued

| | Example No. | | | | | | | | Comparative ex. No. |
|---|---|---|---|---|---|---|---|---|---|
| | 184 | 185 | 186 | 187 | 188 | 189 | 190 | 191 | 22 |
| (B) Non-conjugated diene copoly. | | | | | | | | | |
| copolymer(1) | | | | | 50 | 25 | 67 | 28 | |
| copolymer(2) | | | | | | | | | |
| copolymer(3) | 50 | 50 | 50 | 50 | | | | | |
| copolymer(4) | | | | | | | | | |
| (C5) Epoxy-polymer | | | | | | | | | |
| EGMA(1) | 12.5 | | | 45 | 6.3 | 6.3 | 16.7 | 7 | 8.3 |
| EGMA(2) | | 12.5 | | | | | | | |
| GMEPM | | | 12.5 | | | | | | |
| (D) Elastomer | | | | | | | | | |
| EPM(1) | 100 | 100 | 100 | 100 | 100 | | 133 | | 67 |
| EPM(2) | | | | | | | | | |
| EPDM | | | | | | | | | |
| SEBS | | | | | | | | | |
| (E) Filler | | | | | | | | | |
| talc | | | | | | | 33 | 14 | |
| potassium titanate whisker | | | | | | | | | |
| mica | | | | | | | | | |
| calcium carbonate | | | | | | | | | |
| barium sulfate | | | | | | | | | |
| glass fiber | | | | | | | | | |
| Flexural elasticity modulus (kg/cm²) | 4500 | 4200 | 4200 | 3000 | 5000 | 5200 | 5100 | 7200 | 4500 |
| Coating properties cross cut test | | | | | | | | | |
| urethane paint A(*1) | | | | | | | | | |
| (test 1) | 100/100 | 100/100 | 99/100 | 100/100 | 100/100 | — | 100/100 | — | |
| (test 2) | 100/100 | 100/100 | 100/100 | 100/100 | 100/100 | — | 100/100 | — | |
| urethane paint B(*2) | | | | | | | | | |
| (test 2) | 100/100 | 100/100 | 100/100 | 100/100 | 100/100 | 100/100 | 100/100 | 100/100 | 0/100 |
| (test 4) | 100/100 | 100/100 | 100/100 | 100/100 | 100/100 | 100/100 | 100/100 | 100/100 | |
| (test 3) | 100/100 | 100/100 | 100/100 | 100/100 | 100/100 | 100/100 | 100/100 | 100/100 | 0/100 |

(*1): one can paint, (*2): two pack paint,
(test 1): non-treatment of a surface of molding, (test 2): alkali treatment, (test 3): heating treatment (test 4): acid treatment

We claim:

1. A resin composition containing the following components A, B and C, wherein the contents of the components B and C are 0.1 to 900 parts by weight and 0.01 to 500 parts by weight respectively, to 100 parts by weight of component A, wherein Component A is an olefin resin having a flexural elasticity modulus of 1,000–30,000 kg/cm² and a MFR of 0.01–200 g/10 min;

Component B is a block and/or random copolymer resin which is at least one member selected from the group consisting of α-olefins having 2–12 carbon atoms and at least one member selected from the group consisting non-conjugated dienes of formula (I):

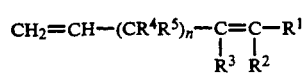

wherein $R^1$, $R^2$, $R^3$, $R^4$, and $R^5$, independently represent hydrogen or an alkyl group of 1–8 carbon atoms; n is an integer of 1 to 10, said copolymer having an MFR of 0.05–500 g/10 min and a flexural elasticity modulus of 500–30,000 kg/cm², said copolymer having a diene content within the range of 0.1–30% by weight; and Component C which is at least one polymer selected from the group consisting of the following polymers:

C1: a diene polymer containing a hydroxyl group having a molecular weight of 200–100,000, with the content of the hydroxyl group ranging from 5–250 KOH mg/g or a hydrogenation product thereof, and C2: an olefin polymer containing a hydroxyl group, said polymer having an MFR of 1–500 g/10 min with the content of unsaturated compound containing hydroxyl groups being in the range of 0.1–50% by weight.

2. The resin composition claimed in claim 1, additionally containing 1 to 900 parts by weight of the following Component D and/or 0.1 to 300 parts by weight of the following Component to 100 parts by weight of the Component A;

Component D:

elastomer;
Component E:
filler.

3. The resin composition, claimed in claims 1 or 2, additionally containing 0.01 to 450 parts by weight of the following Component F to 100 parts by weight of the Component A;
Component F;
at least one compound selected from the group consisting of the following compounds;
F1: organotin compound,
F2: tertiary amine compound, and
F3: phosphorus oxy compound.

4. The resin composition of claim 1, wherein the content of component C ranges from 0.01–400 parts by weight.

5. The resin composition, claimed in claim 4, additionally containing 1 to 900 parts by weight of the following Component D and/or 0.1 to 300 parts by weight of the following Component E to 100 parts by weight of the Component A;
Component D:
elastomer;
Component E:
filler.

6. The resin composition of claim 1, wherein said component C is C1.

7. The resin composition, claimed in claim 6, additionally containing 1 to 90.0 parts by weight of the following Component D and/or 0.1 to 300 parts by weight of the following Component E to 100 parts by weight of the Component A;
Component D:
elastomer;
Component E:
filler.

8. The resin composition of claim 3, wherein the component C is C1.

9. The resin composition, claimed in claim 8, additionally containing 1 to 900 parts by weight of the following Component D and/or 0.1 to 300 parts by weight of the following Component E to 100 parts by weight of the Component A;
Component D:
elastomer;
Component E:
filler.

10. The resin composition containing the following Components A, B, C, and F, claimed in claim 3, wherein the contents of the Components B, C and F are 0.1 to 900 parts by weight, 0.01 to 400 parts by weight, and 0.01 to 300 parts by weight, respectively, to 100 parts by weight of the Component A;
Component A:
olefin resin;
Component B:
block and/or random copolymer resin of at least one member selected from α-olefins having 2 to 12 carbon atoms and at least one member selected from non-conjugated dienes represented by the following general formula (I);

$$CH_2=CH-(CR^4R^5)_n-C=C-R^1 \quad (I)$$
$$\phantom{CH_2=CH-(CR^4R^5)_n-}\underset{R^3}{|}\ \underset{R^2}{|}$$

(wherein $R^1$, $R^2$, $R^3$, $R^4$ and $R^5$ independently represent a hydrogen atom or an alkyl group having 1 to 8 carbon atoms; n represents an integer of 1 to 10);
Component C:
C1: diene polymer containing a hydroxyl group or the hydrogenation product thereof;
Component F:
F3: phosphorus oxy compound.

11. The resin composition, claimed in claim 10, additionally containing 1 to 900 parts by weight of the following Component D and/or 0.1 to 300 parts by weight of the following Component E to 100 parts by weight of the Component A;
Component D:
elastomer;
Component E:
filler.

12. The resin composition containing the following Components A, B, C, and F, claimed in claim 3, wherein the contents of the Components B, C and F are 0.1 to 900 parts by weight, 0.01 to 400 parts by weight, and 0.01 to 450 parts by weight, respectively, to 100 parts by weight of the Component A;
Component A:
olefin resin;
Component B:
block and/or random copolymer resin of at least one member selected from α-olefins having 2 to 12 carbon atoms and at least one member selected from non-conjugated dienes represented by the following general formula (I);

$$CH_2=CH-(CR^4R^5)_n-C=C-R^1 \quad (I)$$
$$\phantom{CH_2=CH-(CR^4R^5)_n-}\underset{R^3}{|}\ \underset{R^2}{|}$$

(wherein $R^1$, $R^2$, $R^3$, $R^4$ and $R^5$ independently represent a hydrogen atom or an alkyl group having 1 to 8 carbon atoms; n represents an integer of 1 to 10);
Component C:
C1: diene polymer containing a hydroxyl group or the hydrogenation product thereof;
Component F:
F2: tertiary amine compound, and
F3: phosphorus oxy compound.

13. The resin composition, claimed in claim 12, additionally containing 1 to 900 parts by weight of the following Component D and/or 0.1 to 300 parts by weight of the following Component E to 100 parts by weight of the Component A;
Component D:
elastomer;
Component E:
filler.

14. The resin composition containing the following Components A, B, and C, claimed in claim 1, wherein the contents of the Components B and C are 0.1 to 900 parts by weight and 0.01 to 500 parts by weight, respectively, to 100 parts by weight of the Component A;
Component A:
olefin resin;
Component B:
block and/or random copolymer resin of at least one member selected from α-olefins having 2 to 12 carbon atoms and at least one member selected from non-conjugated dienes represented by the following general formula (I);

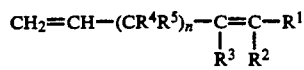

(wherein $R^1$, $R^2$, $R^3$, $R^4$ and $R^5$ independently represent a hydrogen atom or an alkyl group having 1 to 8 carbon atoms; n represents an integer of 1 to 10);
Component C:
C2: olefin polymer containing a hydroxyl group.

15. The resin composition, claimed in claim 14, additionally containing 1 to 900 parts by weight of the following Component D and/or 0.1 to 300 parts by weight of the following Component E to 100 parts by weight of the Component A;
Component D:
elastomer;
Component E:
filler.

16. The resin composition containing the following Components A, B, C, and F, claimed in claim 3, wherein the contents of the Components B, C and F are 0.1 to 900 parts by weight, 0.01 to 400 parts by weight, and 0.01 to 450 parts by weight, respectively, to 100 parts by weight of the Component A;
Component A:
olefin resin;
Component B:
block and/or random copolymer resin of at least one member selected from α-olefins having 2 to 12 carbon atoms and at least one member selected from non-conjugated dienes represented by the following general formula (I);

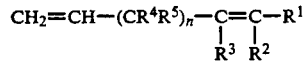

(wherein $R^1$, $R^2$, $R^3$, $R^4$ and $R^5$ independently represent a hydrogen atom or an alkyl group having 1 to 8 carbon atoms; n represents an integer of 1 to 10);
Component C:
C2: olefin polymer containing a hydroxyl group
Component F:
F1: organotin compound, and
F2: tertiary amine compound.

17. The resin composition, claimed in claim 16, additionally containing 1 to 900 parts by weight of the following Component D and/or 0.1 to 300 parts by weight of the following Component E to 100 parts by weight of the Component A;
Component D:
elastomer;
Component E:
filler.

18. The resin composition containing the following Components A, B, C, and F, claimed in claim 3, wherein the contents of the Components B, C and F are 0.1 to 900 parts by weight, 0.01 to 400 parts by weight, and 0.01 to 450 parts by weight, respectively, to 100 parts by weight of the Component A;
Component A:
olefin resin;
Component B:
block and/or random copolymer resin of at least one member selected from α-olefins having 2 to 12 carbon atoms and at least one member selected from non-conjugated dienes represented by the following general formula (I);

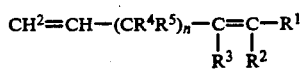

(wherein $R^1$, $R^2$, $R^3$, $R^4$ and $R^5$ independently represent a hydrogen atom or an alkyl group having 1 to 8 carbon atoms; n represents an integer of 1 to 10);
Component C:
C2: olefin polymer containing a hydroxyl group
Component F:
F3: phosphorus oxy compound.

19. The resin composition, claimed in claim 18, additionally containing 1 to 900 parts by weight of the following Component D and/or 0.1 to 300 parts by weight of the following Component E to 100 parts by weight of the Component A;
Component D:
elastomer;
Component E:
filler.

20. The resin composition containing the following Components A, B, C, and F, claimed in claim 3, wherein the contents of the Components B, C and F are 0.1 to 900 parts by weight, 0.01 to 400 parts by weight, and 0.01 to 450 parts by weight, respectively, to 100 parts by weight of the Component A;
Component A:
olefin resin;
Component B:
block and/or random copolymer resin of at least one member selected from α-olefins having 2 to 12 carbon atoms and at least one member selected from non-conjugated dienes represented by the following general formula (I);

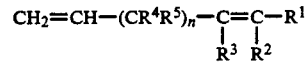

(wherein $R^1$, $R^2$, $R^3$, $R^4$ and $R^5$ independently represent a hydrogen atom or an alkyl group having 1 to 8 carbon atoms; n represents an integer of 1 to 10);
Component C:
C2: olefin polymer containing a hydroxyl group;
Component F:
F2: tertiary amine compound, and
F3: phosphorus oxy compound.

21. The resin composition, claimed in claim 20, additionally containing 1 to 900 parts by weight of the following Component D and/or 0.1 to 300 parts by weight of the following Component E to 100 parts by weight of the Component A;
Component D
elastomer;
Component E:
filler.

* * * * *